United States Patent
Norden et al.

(10) Patent No.: US 10,188,941 B2
(45) Date of Patent: Jan. 29, 2019

(54) SYSTEM AND METHOD FOR PLAYING GAMES THAT REQUIRE SKILL

(71) Applicant: KING.COM LIMITED, St. Julians (MT)

(72) Inventors: Klas Norden, Stockholm (SE); Daniel Frostberg, Stockholm (SE)

(73) Assignee: KING.COM LTD., St. Julians (MT)

( * ) Notice: Subject to any disclaimer, the term of this patent is extended or adjusted under 35 U.S.C. 154(b) by 22 days.

(21) Appl. No.: 15/191,649

(22) Filed: Jun. 24, 2016

(65) Prior Publication Data

US 2016/0303475 A1 Oct. 20, 2016

Related U.S. Application Data

(63) Continuation of application No. 14/029,218, filed on Sep. 17, 2013, now Pat. No. 9,387,400.
(Continued)

(30) Foreign Application Priority Data

Feb. 6, 2013 (GB) .................................. 1302121.7
Feb. 19, 2013 (GB) .................................. 1302910.3
(Continued)

(51) Int. Cl.
*A63F 13/00* (2014.01)
*A63F 13/25* (2014.01)
(Continued)

(52) U.S. Cl.
CPC .............. *A63F 13/25* (2014.09); *A63B 71/06* (2013.01); *A63F 13/00* (2013.01); *A63F 13/005* (2013.01);
(Continued)

(58) Field of Classification Search
CPC .......... A63F 13/45; A63F 13/46; A63F 13/47; A63F 13/52; A63F 13/54
See application file for complete search history.

(56) References Cited

U.S. PATENT DOCUMENTS

| 5,488,496 A | 1/1996 | Pine |
| 6,068,552 A | 5/2000 | Walker et al. |

(Continued)

FOREIGN PATENT DOCUMENTS

| DE | 10304725 A1 | 9/2004 |
| EP | 1564698 A2 | 8/2005 |

(Continued)

OTHER PUBLICATIONS

Candy Crush Saga video game published by King on Apr. 12, 2012. Supporting evidence available online: https://www.youtube.com/watch?v=8TleNDnJiN8.*

(Continued)

*Primary Examiner* — James S McCellan
(74) *Attorney, Agent, or Firm* — Saul Ewing Arnstein & Lehr LLP

(57) ABSTRACT

A method, implemented as computer code being executed by one or more processors, in which a computing device displays computer game graphics for a computer game, and in which one or more of the processors are programmed to implement the game with: (a) a first game mode where the player is prompted to find items on a list within a picture; and (b) a second game mode where the player is prompted to compare two nearly identical images and find the differences; (c) a third game mode where the player is promoted to find items on a list within a certain picture, wherein the picture is darkened and only a select section is lit up, the lit section being dependent on input given by a pointing device.

18 Claims, 63 Drawing Sheets

Related U.S. Application Data

(60) Provisional application No. 61/701,907, filed on Sep. 17, 2012, provisional application No. 61/811,019, filed on Apr. 11, 2013, provisional application No. 61/818,702, filed on May 2, 2013, provisional application No. 61/827,298, filed on May 24, 2013, provisional application No. 61/832,348, filed on Jun. 7, 2013, provisional application No. 61/832,355, filed on Jun. 7, 2013, provisional application No. 61/832,359, filed on Jun. 7, 2013, provisional application No. 61/832,362, filed on Jun. 7, 2013, provisional application No. 61/832,364, filed on Jun. 7, 2013, provisional application No. 61/832,369, filed on Jun. 7, 2013.

(30) Foreign Application Priority Data

| Date | | No. |
|---|---|---|
| Mar. 12, 2013 | (GB) | 1304442.5 |
| Mar. 12, 2013 | (GB) | 1304444.1 |
| Mar. 13, 2013 | (GB) | 1304545.5 |
| Apr. 4, 2013 | (GB) | 1306117.1 |
| Apr. 4, 2013 | (GB) | 1306118.9 |
| Jun. 13, 2013 | (GB) | 1310589.5 |
| Jun. 13, 2013 | (GB) | 1310592.9 |
| Jun. 21, 2013 | (GB) | 1311119.0 |
| Aug. 7, 2013 | (GB) | 1314147.8 |
| Sep. 10, 2013 | (GB) | 1316045.2 |

(51) Int. Cl.

| | | |
|---|---|---|
| *G07F 17/32* | (2006.01) | |
| *A63B 71/06* | (2006.01) | |
| *A63F 13/30* | (2014.01) | |
| *A63F 13/40* | (2014.01) | |
| *G06F 9/44* | (2018.01) | |
| *A63F 13/428* | (2014.01) | |
| *A63F 13/75* | (2014.01) | |
| *A63F 13/537* | (2014.01) | |
| *A63F 13/63* | (2014.01) | |
| *A63F 13/46* | (2014.01) | |
| *A63F 13/2145* | (2014.01) | |
| *A63F 13/335* | (2014.01) | |
| *A63F 13/822* | (2014.01) | |
| *A63F 13/92* | (2014.01) | |
| *A63F 13/80* | (2014.01) | |
| *A63F 13/35* | (2014.01) | |
| *A63F 13/79* | (2014.01) | |

(52) U.S. Cl.
CPC .............. *A63F 13/10* (2013.01); *A63F 13/12* (2013.01); *A63F 13/2145* (2014.09); *A63F 13/30* (2014.09); *A63F 13/335* (2014.09); *A63F 13/35* (2014.09); *A63F 13/40* (2014.09); *A63F 13/428* (2014.09); *A63F 13/46* (2014.09); *A63F 13/537* (2014.09); *A63F 13/63* (2014.09); *A63F 13/75* (2014.09); *A63F 13/79* (2014.09); *A63F 13/80* (2014.09); *A63F 13/822* (2014.09); *A63F 13/92* (2014.09); *G06F 9/44* (2013.01); *G07F 17/32* (2013.01); *G07F 17/3274* (2013.01)

(56) References Cited

U.S. PATENT DOCUMENTS

| | | | |
|---|---|---|---|
| 6,117,013 | A | 9/2000 | Eiba |
| 7,073,792 | B2 | 7/2006 | Esposito et al. |
| 7,749,060 | B1 | 7/2010 | Olmes et al. |
| 8,002,633 | B2 | 8/2011 | Shimizu et al. |
| 8,075,404 | B2 | 12/2011 | Stamper et al. |
| 8,088,010 | B1 | 1/2012 | Hill et al. |
| 8,237,743 | B2 | 8/2012 | Csurka et al. |
| 8,277,320 | B1 | 10/2012 | Hart et al. |
| 8,369,873 | B2 | 2/2013 | Krasner et al. |
| 8,388,446 | B1 | 3/2013 | Craine et al. |
| 8,526,490 | B2 | 9/2013 | Buckley et al. |
| 8,672,744 | B1 | 3/2014 | Steere et al. |
| 8,711,923 | B2 | 4/2014 | Buckley et al. |
| 8,727,893 | B2 | 5/2014 | Otremba et al. |
| 8,784,181 | B2 | 7/2014 | Frank et al. |
| 8,964,830 | B2 | 2/2015 | Perlman et al. |
| 9,033,803 | B1 | 5/2015 | Etter et al. |
| 9,446,313 | B2 | 9/2016 | Norden |
| 2002/0068632 | A1 | 6/2002 | Dunlap et al. |
| 2002/0082068 | A1 | 6/2002 | Singhal et al. |
| 2002/0094870 | A1 | 7/2002 | Murray et al. |
| 2003/0049592 | A1 | 3/2003 | Park et al. |
| 2003/0050118 | A1 | 3/2003 | Suzuki et al. |
| 2003/0074416 | A1 | 4/2003 | Bates et al. |
| 2003/0119581 | A1 | 6/2003 | Cannon et al. |
| 2004/0053688 | A1 | 3/2004 | Hosaka et al. |
| 2004/0137987 | A1 | 7/2004 | Nguyen et al. |
| 2004/0224772 | A1 | 11/2004 | Canessa et al. |
| 2005/0256985 | A1 | 11/2005 | Shea et al. |
| 2006/0068876 | A1 | 3/2006 | Kane et al. |
| 2006/0160620 | A1 | 7/2006 | Matthews et al. |
| 2006/0223635 | A1 | 10/2006 | Rosenberg et al. |
| 2006/0277474 | A1 | 12/2006 | Robarts et al. |
| 2006/0281541 | A1 | 12/2006 | Nguyen et al. |
| 2006/0287098 | A1 | 12/2006 | Morrow et al. |
| 2007/0077993 | A1 | 4/2007 | Midgley et al. |
| 2007/0259709 | A1 | 11/2007 | Kelly et al. |
| 2008/0005353 | A1 | 1/2008 | Panabaker et al. |
| 2009/0170608 | A1 | 7/2009 | Herrmann et al. |
| 2009/0203415 | A1 | 8/2009 | Falciglia et al. |
| 2009/0209311 | A1 | 8/2009 | Bennett et al. |
| 2010/0144426 | A1 | 6/2010 | Winner et al. |
| 2010/0151934 | A1 | 6/2010 | Kniberg et al. |
| 2010/0218135 | A1 | 8/2010 | Brugler et al. |
| 2010/0227675 | A1 | 9/2010 | Luxton et al. |
| 2010/0271367 | A1 | 10/2010 | Vaden et al. |
| 2010/0317437 | A1 | 12/2010 | Berry et al. |
| 2011/0014977 | A1 | 1/2011 | Yamazaki et al. |
| 2011/0053681 | A1 | 3/2011 | Goldman et al. |
| 2011/0111835 | A1 | 5/2011 | Cohen et al. |
| 2011/0136561 | A1 | 6/2011 | Acres et al. |
| 2011/0136572 | A1 | 6/2011 | Karn et al. |
| 2011/0230246 | A1 | 9/2011 | Brook et al. |
| 2011/0269532 | A1 | 11/2011 | Shuster et al. |
| 2012/0030094 | A1 | 2/2012 | Khalil et al. |
| 2012/0040752 | A1 | 2/2012 | Koo et al. |
| 2012/0064969 | A1 | 3/2012 | Uchibori et al. |
| 2012/0077580 | A1 | 3/2012 | Mahajan et al. |
| 2012/0079126 | A1 | 3/2012 | Evans et al. |
| 2012/0122552 | A1 | 5/2012 | Youm et al. |
| 2012/0191606 | A1 | 7/2012 | Milne et al. |
| 2012/0198417 | A1 | 8/2012 | Haviv et al. |
| 2012/0311036 | A1 | 12/2012 | Huhn et al. |
| 2013/0035164 | A1 | 2/2013 | Osvald et al. |
| 2013/0109469 | A1 | 5/2013 | Hill et al. |
| 2013/0172061 | A1 | 7/2013 | Iosilevsky et al. |
| 2013/0267285 | A1 | 10/2013 | Kelley et al. |
| 2013/0316832 | A1 | 11/2013 | Olofsson et al. |
| 2013/0323697 | A1 | 12/2013 | Shadduck et al. |
| 2013/0331162 | A1 | 12/2013 | Krivicich et al. |
| 2014/0024450 | A1 | 1/2014 | Ramachandran et al. |
| 2014/0080600 | A1 | 3/2014 | Knutsson et al. |
| 2014/0235338 | A1 | 8/2014 | Hansson et al. |
| 2014/0252987 | A1 | 9/2014 | Hinrichs et al. |
| 2014/0342791 | A1 | 11/2014 | Valeriano et al. |
| 2014/0357367 | A1 | 12/2014 | Lee |
| 2014/0370950 | A1 | 12/2014 | Jaksch et al. |

(56) References Cited

U.S. PATENT DOCUMENTS

| | | |
|---|---|---|
| 2015/0050997 A1 | 2/2015 | Suzman et al. |
| 2015/0174489 A1 | 6/2015 | Evald et al. |

FOREIGN PATENT DOCUMENTS

| | | |
|---|---|---|
| EP | 1870143 A1 | 12/2007 |
| EP | 2211299 A2 | 7/2010 |
| JP | 2005-228086 | 8/2005 |
| JP | 2012-61060 A | 3/2012 |
| WO | WO01146790 A2 | 6/2001 |
| WO | 2006039366 A2 | 4/2006 |
| WO | 2006/052212 A1 | 5/2006 |
| WO | 2007/078533 A2 | 7/2007 |
| WO | WO 2007/078533 | 7/2007 |
| WO | WO 2008/109685 A2 | 9/2008 |
| WO | 2009/029108 A1 | 3/2009 |
| WO | 2010/002897 | 1/2010 |
| WO | 2010/045716 A1 | 4/2010 |
| WO | 2010/083346 A1 | 7/2010 |
| WO | WO 2010/096784 A1 | 8/2010 |
| WO | 2011/011466 | 1/2011 |
| WO | WO 2011/041467 A2 | 4/2011 |
| WO | WO 2012/013198 A1 | 2/2012 |
| WO | WO 2003/174933 | 11/2013 |

OTHER PUBLICATIONS

Adbang, "[How to block Anipang heart] HOw to block Anipang heart at i-phone", Internet blog, Internet: URL:http://blog.naver.com/cyco5202/110147101106, Sep. 11, 2012.

Goad, "'Why King.com's Candy Crush is crushing it on Facebook'", Games.com [online], Internet: URL:http://blog.games.com/2012/05/01/why-king-comes-candy-crush-is-crushing-it-onfacebook/, May 1, 2012.

Kangbelief, "'Kakao talk, how to reject the undesired invitation message of Anipang and receive the heart quietly'", Internet blog, Internet: URL:http://kangbelief.tistory.com/312, Sep. 16, 2012.

Anonymous, "Amazon Survival YouTube video, Uploaded to YouTube on Mar. 13, 2009, video length 6:06", https://www.youtube.com/watch?v=8S2gM5POUUk, Mar. 13, 2009, 1.

Anonymous, "Bejeweled 2 Wikipedia Article", Sep. 30, 2015, 1-3.

Anonymous, "Bejeweled article", Wikipedia, Sep. 30, 2015.

Anonymous, "Best iOS/Androoid cross-platform mobiledevelopment SDKs", retrieved from the Internet: URL:http://webification.com/best-iosandroid-cross-platform-mobile-development-sdks [retrieved on Jul. 2, 2013] XP055069062, Sep. 26, 2011, p. 1.

Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.

Anonymous, "Buck Rodgers Turn Based Strategy Game Design and Planning Document", https://cs.nyu.edu/courses/spring07/V22.0474.001/groups/tbsgame/tbsgame_des.pdf, Feb. 21, 2007.

Anonymous, "Candy Crush Saga Facebook Game levels 1-10 video on YouTube, YouTube screen shorts figures 1-7", https://www.youtube.com/watch?v=8TleNDnJiN8, Apr. 15, 2012.

Anonymous, "Candy Crush Saga for Facebook, YouTube video demonstrating levels 1-10, video length 15:23", https://www.youtube.com/watch?v=cfqHVkWX5yE, Apr. 12, 2012, 1 page.

Anonymous, "Candy Crush Saga on Facebook Review on YouTube video, Screen shots of YouTube video, figures 1-13", https://www.youtube.com/watch?v=AbH8Givg6XM, Sep. 7, 2012.

Anonymous, "Cross-platform", retrieved from the Internet: URL:http://en.widipedia.org/w/index.php?title=Cross-platform&oldid=487867404 [retrieved on Jul. 1, 2013] XP055068984, Apr. 17, 2012, pp. 1-16.

Anonymous, "Daily Bonus Level Oct. 17, 2012: Bubble Witch Saga Fan Site", retrieved from the InternetURL:http://bubble-witch-saga.se/daily-bonus-level-17-oct-2012/ [retrieved on Mar. 21, 2014] XP055109244, Oct. 17, 2012, pp. 1-2.

Anonymous, "Dig Dug article", Wikipedia, Sep. 30, 2015.

Anonymous, "Facebook Platform—Wikipedia, the free encyclopedia", Retrieved from the Internet: URL:http://en.wikipedia.org/w/index/php?title=Facebook_Platofrm&oldid=533105338 [retrieved on Mar. 21, 2014] XP055109249, pp. 1-2.

Anonymous, "Facebook Spiel Candy Crush Saga: Cheats, Tipps, News and Videos BILDspielt", URL: http://www.bildspielt.de/social-games/3-gewinnt/candy-crush-saga-180643/ [retrieved on Oct. 25, 2013] XP055085339, Apr. 12, 2012, pp. 1-10.

Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.

Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012] XP055092347, Apr. 10, 2012, pp. 1-2.

Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.

Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] XP055109246, Jan. 24, 2012, pp. 1-2.

Anonymous, "King.com Skill Games for iPhone and Facebook: http://www.ubergizmo.com/2009/07/king-com-skill-games-for-iphone-and-facebook/", retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgrefurl=http://www.ubergizmo.com/2009/07/king-com-skill-games-for-iphone-and-faceboo, Jul. 13, 2009, pp. 1-2.

Anonymous, "Minecraft", retrieved from the Internet: URL:http://en.widipedia.org/w/index?title=Minecraft&oldid=409326251 [retrieved on Jul. 1, 2013] XP055068987, May 2, 2014.

Anonymous, "Model-view-controller", retrieved from the Internet: URL:http://en.widipedia.org/w/index/php?title=Model%E2%80%93view%E2%80%93controller&oldid=511810952 'retrieved on Oct. 8, 2013] XP055083072, Sep. 11, 2012, pp. 1-2.

Anonymous, "OpenOffice, Creating Charts and Graphs", Dec. 2004, 1-17.

Anonymous, "Pygame", retrieved from the Internet: URL:http://web.archive/org/web/20120413123244/http://www.pygame.org/wiki/tut_design [retrieved on Oct. 8, 2013 XP055083074, Apr. 13, 2012, pp. 1-5.

Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.

Anonymous, "Why King.com's Candy Crush is crushing it on Facebook", retrieved from the Internet: URL: http://blog.games.com/2012/05/01/why-king-coms-candy-crush-is-crushing-it-on-facebook/ [retrieved on Oct. 25, 2013] XP055085338, May 1, 2012, pp. 1-4.

Collins, "Will Collins Game Spotlight: Candy Crush Saga", retrieved from the Internet: URL:https//developers.facebook.com/blog/post/2012/06/15/game-spotlight--candy-crush-saga/ [retrieved on Oct. 25, 2013] XP055085345, Jun. 15, 2012, pp. 1-2.

Demeter, "Trism: Upcoming iPhone Game by Demiforce", retrieved from the Internet: URL: https://www.youtube.com/watch?v=hy0pgisr70, [retrieved on Apr. 16, 2015] XP054975820, Feb. 26, 2008.

Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.

(56) References Cited

OTHER PUBLICATIONS

Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.

Josef, "Bloxley Tutorial #1—Sokoban", http://bloxley.net/2010/10/tutorial-1-sokoban, Oct. 13, 2010.

Murphy, "Bejeweled 2 Strategy Guide", www.bigfishgames.com, Aug. 15, 2010.

NAMCO, "Dig Dug Video Game (copy unavailable)", 1982.

POPCAP, "Bejeweled Video Game (copy unavailable)", 2001.

Rua, "Candy Crush Saga Gameplay First Look (Episode 1-10 levels)", retrieved from the Internet: URL: https://www.youtube.com/watch?v=8TleNDnJiN8 [retrieved on Apr. 16, 2015] XP054975821, Apr. 16, 2012.

Schoenau-Fog, "The Player Engagement Process—An Exploration of Continuation Desire in Digital Games", http://www.digra.org/wp—content/uploads/digital-library/11307.06025.pdf, 2011.

Squires, "Bubble Witch Saga is going mobile—Gamezebo", retrieved from the Internet: URL:http://www.gamezebo.com/news/2012/06/27/bubble-witch-saga-going-mobile [retrieved on Dec. 9, 2013] XP055092339, Jun. 27, 2012, pp. 1-2.

Anonymous, "Salesforce Tutorial—Model View Controller (MVC)", [online] Retrieves from the Internet: <https://web.archive.org/web/20130814042919/http://www.salesforcetutorial.com/model-view-controller-mvc/> [retrieved Jul. 1, 2016], Apr. 10, 2013.

Bejeweled 3 Video Review, retrieved from the Internet: URL: https://www.youtube.com/watch?v=Nnb4z-BpQA8; dated Dec. 7, 2010.

Classic Game Room—Bejeweled 3 review for Nintendo DS, screen shot 1 page, video length 4:22; retrieved from the Internet; URL: https://www.youtube.com/watch?v=pxVGdIJTVxQ, Dec. 16, 2011.

Match-3 in Construct 2: part one, Retrieved from the Internet; URL: http://weconstruct.blogspot.com/2011/12/match-3-in-construct-2-part-one.html; posed on Dec. 16, 2011.

Sutek's Tomb on YouTube, Screen shot 2 pages, video length 6:59, retrieved from the Internet: URL: https://www.youtube.com/watch?v=D0Z1FN7OSwE ,Aug. 12, 2007.

Bejeweled Blitz 878,550 Points "elite Technique" Legit No Boosts Facebook, YouTube Video, 2 page screen shot; retrieved from the Internet: URL: https://www.youtube.com/watch?v=eusZMBjSD5E.

Lee, Xah et al., Bejeweled Blitz Strategy as Math, 4 pages, Sep. 22, 2011.

* cited by examiner

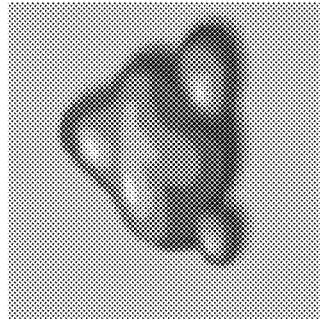
Figure 29
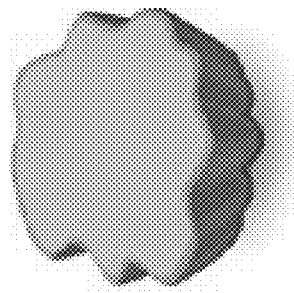
Figure 30
Figure 27
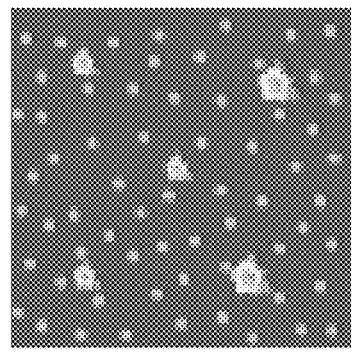
Figure 28

DETAILED WORD STATISTICS

| ROUND | WORD | ACCEPTED | 2X LETTER | 3X LETTER | 2X WORD | SCORE |
|---|---|---|---|---|---|---|
| 1 | STEED | yes | | | | 750 |
| 1 | WINK | yes | | | | 1040 |
| 1 | SAL | yes | | | | 180 |
| 2 | SHARE | yes | R | | | 1125 |
| 2 | RUNE | yes | | | | 480 |
| 2 | CAW | yes | | | | 450 |
| 3 | SQUARES | yes | | | | 2160 |
| 3 | SUN | yes | | | | 315 |
| 3 | RANT | yes | T | | | 480 |
| 4 | SEX | yes | | | | 450 |
| 4 | BEATS | yes | | | S | 1750 |
| 4 | AIL | yes | | I | | 360 |
| 5 | BOOKS | yes | | | | 1375 |
| 5 | VET | yes | | | | 315 |
| 5 | TIN | yes | | | | 180 |
| 6 | HAY | yes | | H | | 810 |
| 6 | SEXES | yes | | | X | 3000 |
| 6 | KEY | yes | Y | | | 645 |
| Total word score | | | | | | 16165 |
| Time Bonus | | | | | | 254 |
| Total score | | | | | | 16419 |

Figure 50

SYSTEM AND METHOD FOR PLAYING GAMES THAT REQUIRE SKILL

CROSS-REFERENCE TO RELATED APPLICATIONS

This application is a continuation of U.S. application Ser. No. 14/029,218, filed Sep. 17, 2013, which is based on, and claims priority to U.S. Provisional Application No. 61/701,907, filed Sep. 17, 2012; UK Application No. 1302121.7, filed Feb. 6, 2013; UK Application No. 1302910.3, filed Feb. 19, 2013; UK Application No. 1304442.5, filed Mar. 12, 2013; UK Application No. 1304444.1, filed Mar. 12, 2013; UK Application No. 1304545.5, filed Mar. 13, 2013; UK Application No. 1306117.1, filed Apr. 4, 2013; UK Application No. 1306118.9, filed Apr. 4, 2013; U.S. Provisional Application No. 61/811,019, filed Apr. 11, 2013; U.S. Provisional Application No. 61/818,702, filed May 2, 2013; U.S. Provisional Application No. 61/827,298, filed May 24, 2013; U.S. Provisional Application No. 61/832,348, filed Jun. 7, 2013; U.S. Provisional Application No. 61/832,355, filed Jun. 7, 2013; U.S. Provisional Application No. 61/832,359, filed Jun. 7, 2013; U.S. Provisional Application No. 61/832,362, filed Jun. 7, 2013; U.S. Provisional Application No. 61/832,364, filed Jun. 7, 2013; U.S. Provisional Application No. 61/832,369, filed Jun. 7, 2013; UK Application No. 1310589.5, filed Jun. 13, 2013; UK Application No. 1310592.9, filed Jun. 13, 2013; UK Application No. 1311119.0, filed Jun. 21, 2013; UK Application No. 1314147.8, filed Aug. 7, 2013; and UK Application No. 1316045.2, filed Sep. 10, 2013, the entire contents of each of which being fully incorporated herein by reference.

BACKGROUND OF THE INVENTION

Field of the Invention

The inventions relate to casual social games.

Technical Background

There are multiple technical challenges facing the designer of computer-implemented games to create a fun and compelling game. Three of these challenges can be broadly categorised into the following areas: 'engagement', 'viralisation' and 'monetisation'. See other edited copy We will look first at 'engagement', which involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment. Effective engagement can be greatly magnified if the game has as social aspect—for example if it is linked to a social network so that game players can interact with their friends in the social network. The game can then transform into something that goes far beyond a solo game experience and become more like a shared journey.

'Viralisation' requires a game to include various techniques that encourage players to share the game with others, encouraging them to play the game. It is a key technique in enabling mass-scale distribution or penetration of games. Viralisation can be especially effective when the game is integrated into or connected to a social network environment in some manner, so that the game can then propagate through the network of player's friends, and their friends and so on.

'Monetisation' covers those techniques that enable revenue to be generated from a game; this involves many challenges, because the monetisation techniques need to be acceptable to players and in no way undermine engagement.

A successful and original game will require a team of game designers to solve complex problems of engagement, viralisation and monetisation; this can take many months of skilled work and, not infrequently, a great deal of trial-and-error testing of new ideas, functions and game mechanics before a game successfully combines all these elements into a new experience.

A 'match-3 game' is a type of casual puzzle game where the player is required to find patterns on a seemingly chaotic board. The player then has to match three or more of the same type of game element on the game board and those matched elements will then disappear.

One variant of casual games are the so called 'clicker' games where the player can click on a group of adjacent game elements of a certain type and those will then be removed. Some clicker games only require two adjacent objects to remove those elements if clicked by the user.

Another type of match-3 games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects from the top of the board with the physics of the game board being that the game pieces are falling downwards on the board.

Another type of match-3 game are the so called 'shooter' games where the player launches for instance a ball or bubble on to the game board tying to aim at groups of similar game elements already on the game board. If the launched ball hits or forms a group of more than 3 similar game elements then that group of game elements are removed from the game board. In a typical shooter game the physics of the game board being that the game pieces are falling downwards on the board.

There are also other types of games where groups of certain game elements are combined together and removed when they have reached a certain size. The user can connect the groups with a swiping movement touching each of the connecting elements in one implementation and in another implementation the groups are formed to one group when the elements of the same type are adjacent, the player then removes the group for instance by clicking on that group.

This patent specification describes not only various ideas and functions, but also their creative expression. A portion of the disclosure of this patent document therefore contains material to which a claim for copyright is made and notice is hereby given: Copyright King.com Limited 2012 and 2013 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

Discussion of Related Art

Casual social games have been implemented before and are known. However previous inventions have not successfully devised effective solutions to one or more of engagement, viralisation and monetisation in the same way as the present invention does.

SUMMARY OF THE INVENTION

A first aspect is:

A method, implemented as computer code being executed by one or more processors, in which a computing device displays computer game graphics for a computer game, and in which one or more of the processors are programmed to implement the game with:
  (a) a first game mode where the player is prompted to find items on a list within a picture; and
  (b) a second game mode where the player is prompted to compare two nearly identical images and find the differences;
  (c) a third game mode where the player is promoted to find items on a list within a certain picture, wherein the picture is darkened and only a select section is lit up, the lit section being dependent on input given by a pointing device.

Any one or more of the following optional features may be included, resulting in a method:
  in which a processor is programmed so that the player is rewarded points for each found item.
  in which a processor is programmed so that points are subtracted from the players score for each wrongly identified item.
  in which a processor is programmed so that one or more of the game modes are mini-games playable only after completing a main game mode.
  in which a processor is programmed so that the mini-game following the main game is randomly selected from a number of different mini-games.
  in which a processor is programmed so that the mini-game following the main game is selected by the player from a list of different mini-games.
  in which a processor is programmed so that the player has access to a number of hints
  in which a processor is programmed so that the hints show the general area of a random object.
  in which a processor is programmed so that the player is prompted to find 10 items in the main game mode.
  in which a processor is programmed so that the player is awarded bonus points for each unused hint.
  in which a processor is programmed so that the multiple players can compete against each other.
  in which a processor is programmed so that multiple players play the same level at the same time and can see other's progress in real time.
    in which some or all game levels are untimed, eliminating any time pressure
    in which the game is a casual, social game and some or all levels have a true fail, to enable monetization through purchasing extra moves;
    in which there is a continuous musical soundtrack plays during gameplay
    in which the game generates and displays congratulatory messages when the player scores more than a predefined amount, or matches more than a predefined number of game elements, in a single move
    in which a processor is programmed so that the player can ask his friends for other help
    in which social network friends are prompted to assist another player if that other player has played, but not completed, a level meeting a certain criteria
  in which a processor is programmed so that the player can send gifts to friends
  in which a processor is programmed so that the game can be synchronized between different devices
  in which a processor is programmed so that a player can seamlessly stop and re-start playing the game at any time since game state information is stored, e.g. remotely and/or on the playing device
  in which every change in the game state, such as every move of a game piece by the user, and every consequential change in every game piece on the game board, is accompanied by sound and visual feedback to provide immediate, positive gratification to the player
  in which game state information is preserved, enabling a remote server system to identify a player and all aspects of the state of the game they are playing, so that the player can end game play on one device and resume from a different device at a later time at exactly the same state
  in which the different device can be a different type of device, so that the player can move seamlessly between playing the game on a smartphone and on a tablet
  in which a remote server system can identify a player because that player has accessed the game through a social network
  in which the game is a casual, social game, namely a game that can be downloaded as an app to a smartphone and/or tablet computer and which can be accessed or played using a social network application or environment
  in which the processor is programmed to show a virtual path or other virtual world that indicates the level reached by the player and that player's social network friends
  in which the design of the game is optimised through a process including the step of: using data analytics to understand the impact of changes to the game design in terms of player engagement and/or monetisation and/or viralisation and; implementing changes to the game design, including frequent changes such as daily or weekly changes, to optimise player engagement and/or monetisation and/or viralisation.

A second aspect is:

A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device; and in which, one or more of the processors are programmed to implement the game with:
  (a) a first game mode where the player is prompted to find items on a list within a picture; and
  (b) a second game mode where the player is prompted to compare two nearly identical images and find the differences;
  (c) a third game mode where the player is promoted to find items on a list within a certain picture, wherein the picture is darkened and only a select section is lit up, the lit section being dependent on input given by a pointing device.

A third aspect is:

A non-transitory computer readable medium encoded with instructions for controlling a computer system to display a game on a display, the instructions enabling a processor to implement the game with:
- (a) a first game mode where the player is prompted to find items on a list within a picture; and
- (b) a second game mode where the player is prompted to compare two nearly identical images and find the differences;
- (c) a third game mode where the player is promoted to find items on a list within a certain picture, wherein the picture is darkened and only a select section is lit up, the lit section being dependent on input given by a pointing device.

BRIEF DESCRIPTION OF THE DRAWINGS

FIG. 27—An area not dug for treasures yet.
FIG. 28—An area where the player already has dug.
FIG. 29—Rock.
FIG. 30—Grass Shelf
FIG. 31—Magic Hand.
FIG. 50—Detailed word statistics shown after the completion of a game.

DETAILED DESCRIPTION

The terms user and player are used interchangeably throughout this document and no specific meaning is intended using one or the other unless the context suggests otherwise.

In the following description of various implementations of the invention, reference is made to the accompanying drawings, which form a part thereof, and in which is shown by way of illustration various implementations in which the invention may be utilised. It is to be understood that other implementations may be utilized, and structural and functional modifications may be made without departing from the scope of the present invention.

Figure 1:
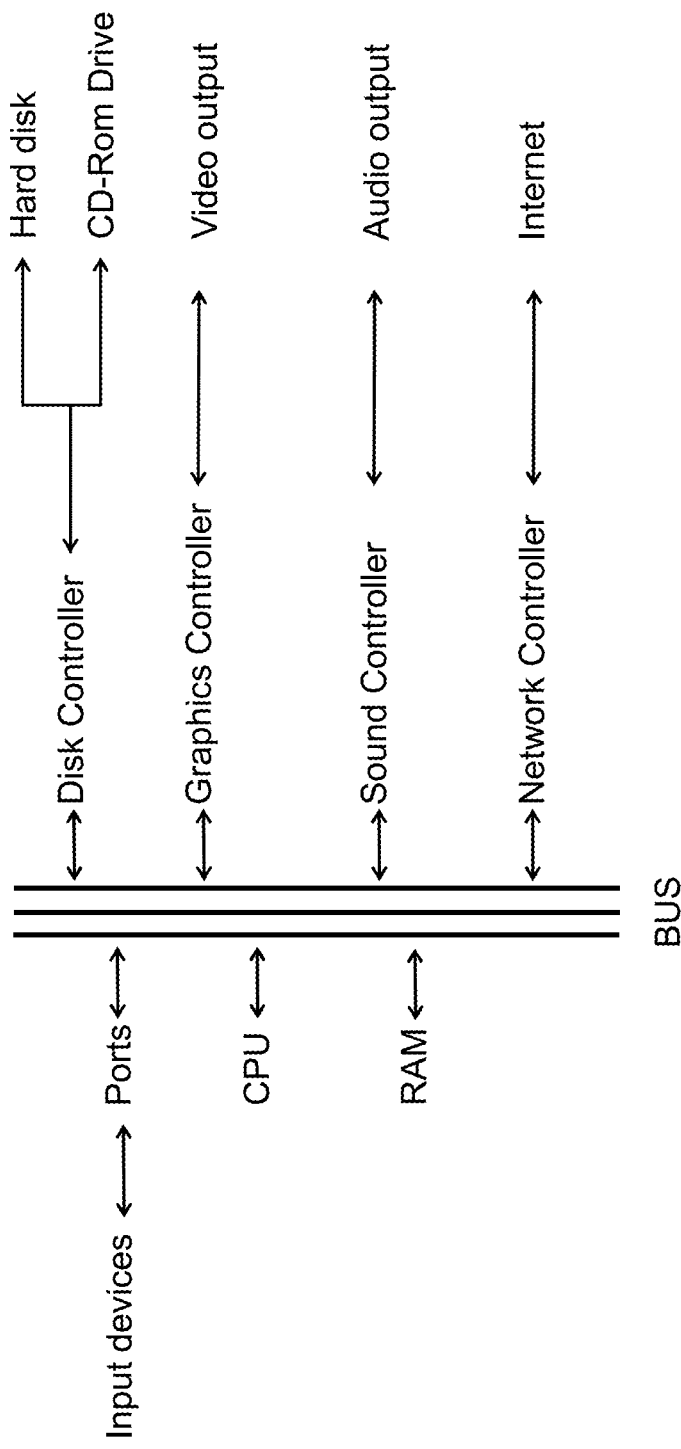
FIG. 1 shows a schematic illustration of a computing device.

FIG. 1 shows a schematic picture of a computing device, containing a Central Processing Unit and Random Access Memory. The CPU acts according to input given from input devices, such as a keyboard, mouse or touchscreen. Computer BUSes are used to communicate, both between input devices and the CPU, but also between different controllers within the computer device, such as the graphics controller and the network controller. These controllers in turn communicate with external devices, such as a monitor for video output with which the graphics controller communicates, and the network controller communicates with for instance the internet, through wireless or wired connections. A user can interact with the computing device through input devices, such as a pointing device (e.g. a mouse) and a keyboard.

Figure 2:
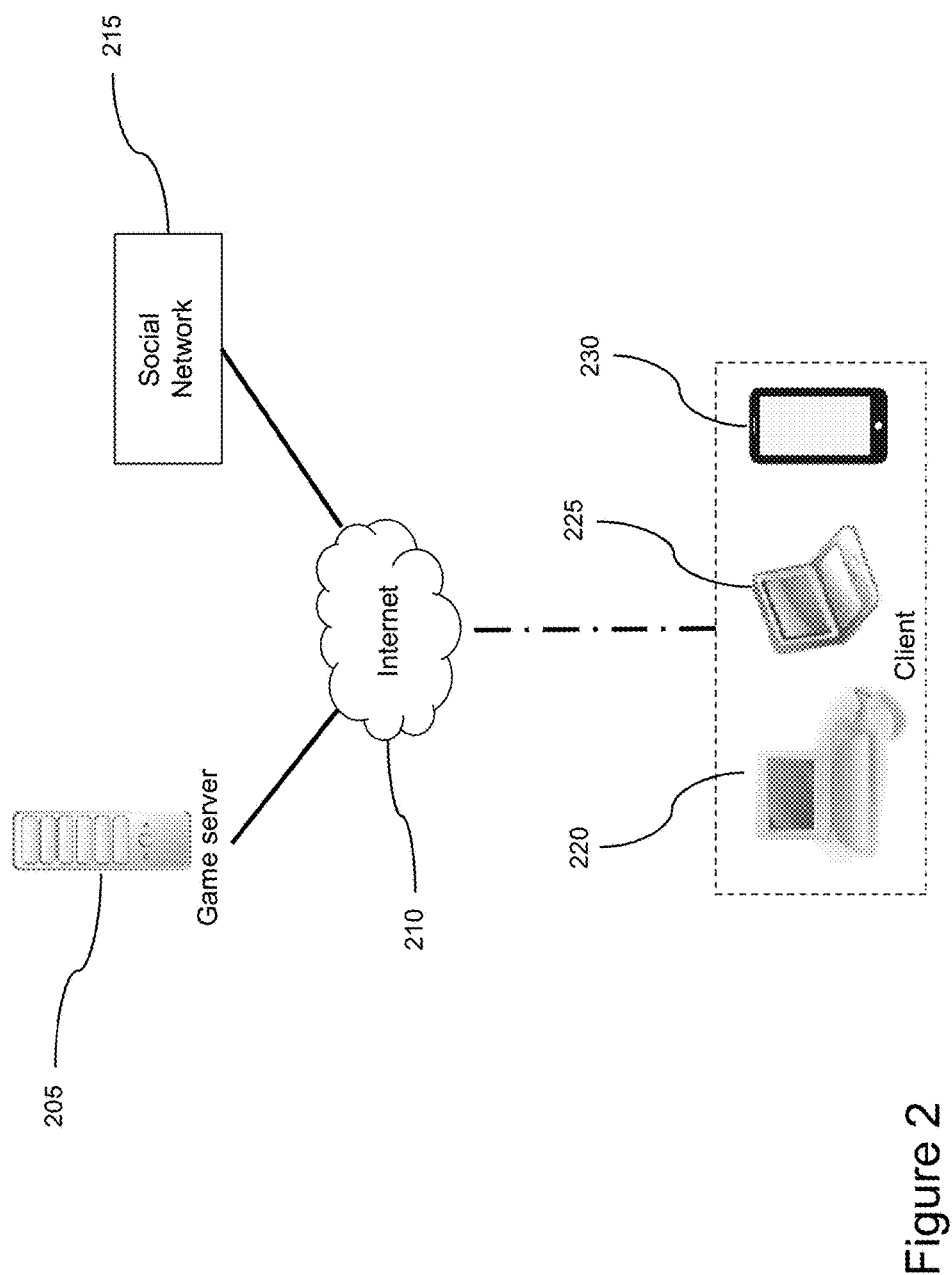
FIG. 2 shows an exemplary implementation.

FIG. 2 portrays an exemplar overall environment in which the present invention can be utilized. A virtual game is stored on, for instance, a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other network. It should be understood that the social network 230 and the game server 210 does not have to be located in different places, they could be on the same server or on a plurality of servers located in different locations. An environment where the invention may be implemented is described in PCT/EP2013/060641 which is hereby incorporated by reference. People skilled in the art will understand that other devices than the exemplary ones listed can also be used, without departing from the spirit and scope of the invention.

Different Implementations

The techniques described in this patent can be deployed in many different gameplay architectures. For example, a computer game can be implemented as a computer program that is stored and runs entirely locally on the processor of a PC, games console, tablet or mobile telephone, or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture, but can be deployed on any suitable game architecture.

The game can be implemented allowing a user to interact with it in different ways, depending on the capabilities of the device, which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves, or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game are not exhaustive. What is described herein are certain preferred embodiments. It is possible to implement the way in a number of variations, without departing from the spirit or scope of the invention.

We will now describe different implementations of the invention.

Treasure Switcher

The game described herein may be a clicker or a switcher game. The player may in some implementations move or switch game elements on a game board to form lines of 3 or more game elements of a certain type. The game board can for instance be a grid of maximum 9×9 tiles and there may be several different types of game elements on the game board.

Some additional elements may also be present on the game board. Such additional game elements can be fixed in a certain position on the game board or can be moveable. In some implementations there are not game elements on the full grid but the grid may take an arbitrary shape.

Game Overview

Make switches and create combos to move your heroine around a world of islands in search of fame and fortune!

Move up and down and from side to side freely as refills come in the direction you are switching!

Create combos and fill up the Dash Meter to send your heroine sprinting through the bricks like a dart! The heroine can when 'dashing' go in either direction until she hits the game board or an obstacle. She will travel in one row only but she will dig up everything in three rows wide. So if the map or a treasure is beneath a game element within those three rows then that will be collected.

Search for hidden treasure beneath the moving bricks, and make switches on top to dig them up! The game board may indicate which ties that have been dug up previously. In some implementations this can be done using a darker colour for that tile.

In some implementations if half the game board has been dug up or a number of the treasures the locations of the remaining treasures or the map may be indicated. This can be done so that the game element on top flashes or jumps up and down. This may also be implemented to happen if the player has uncovered the map but not all the other treasures on the board.

Dig for treasures where you are, or take your chances and move to the next island in hopes for more!

Do great and you just might make it to the fabled Treasure Islands where fortune beyond your wildest dreams awaits!

Figure 3:
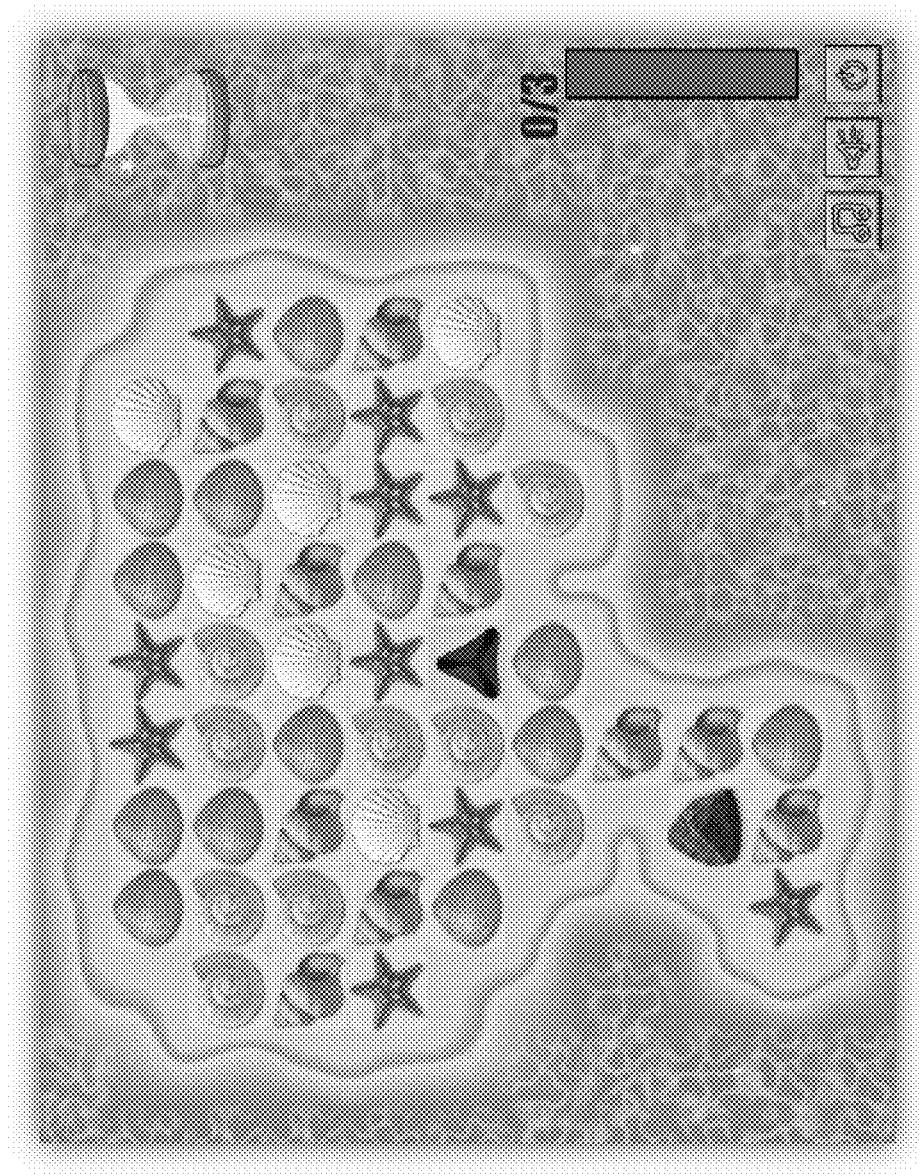
FIG. 3 shows the game board in a typical implementation.
Figure 4:
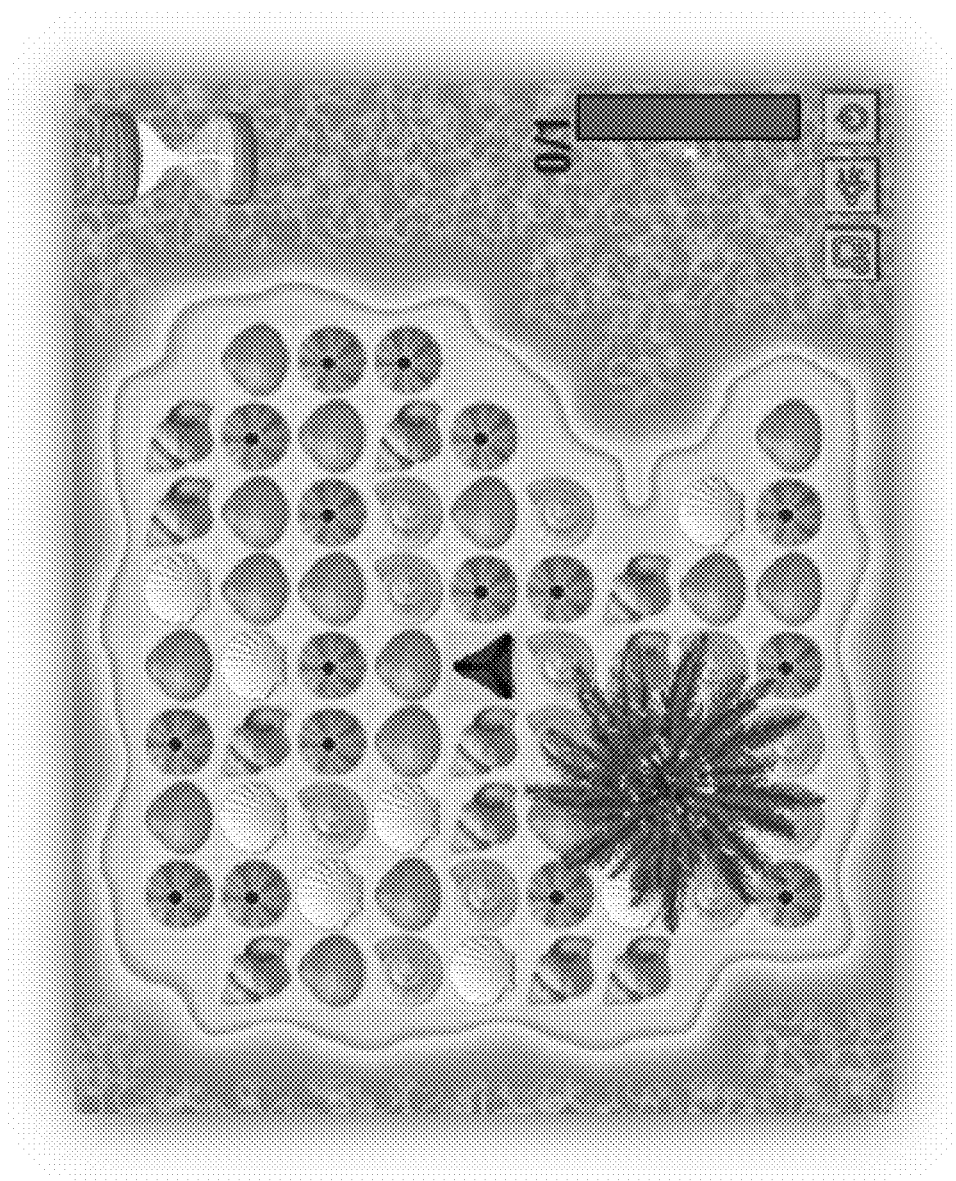
FIG. 4—Shows another example of a game board.
Figure 5:
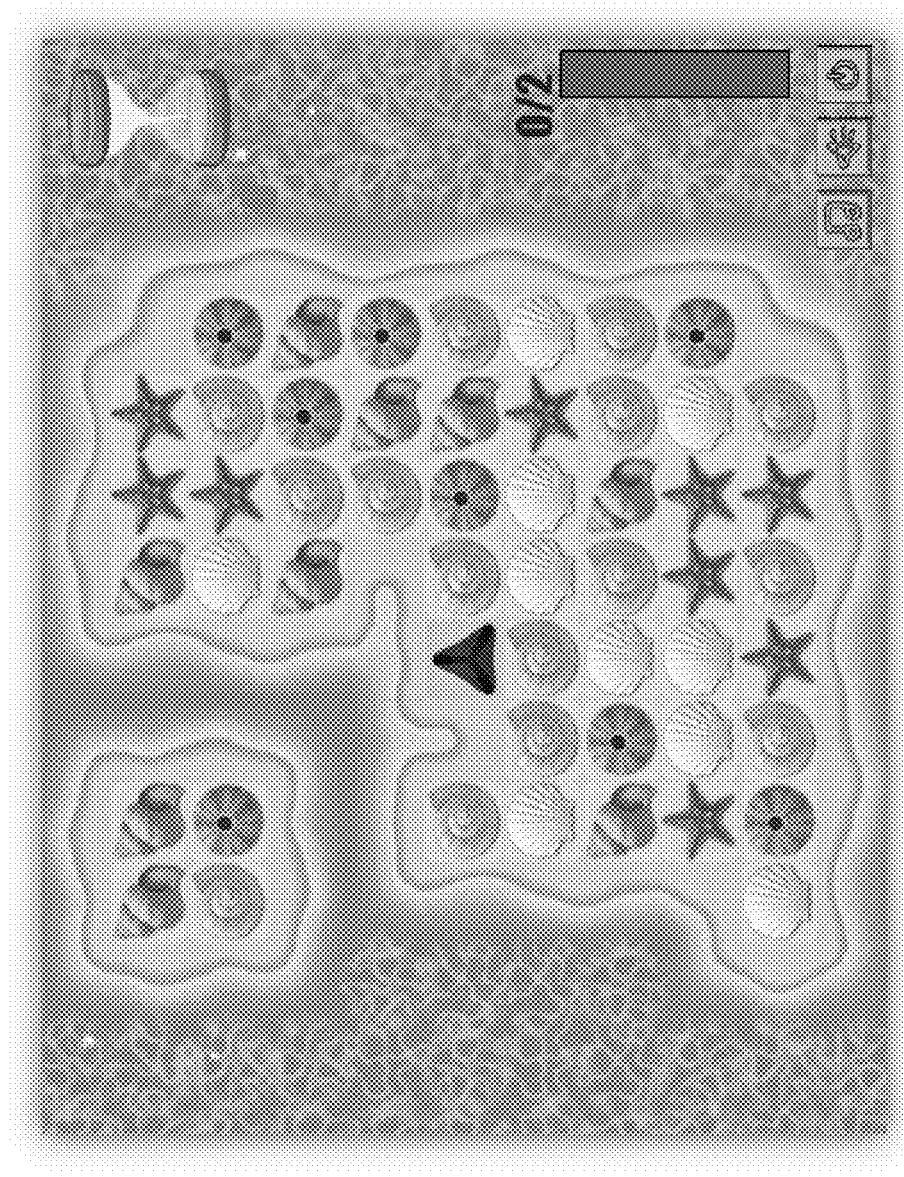
FIG. 5—Shows another example of a game board.
Figure 6:
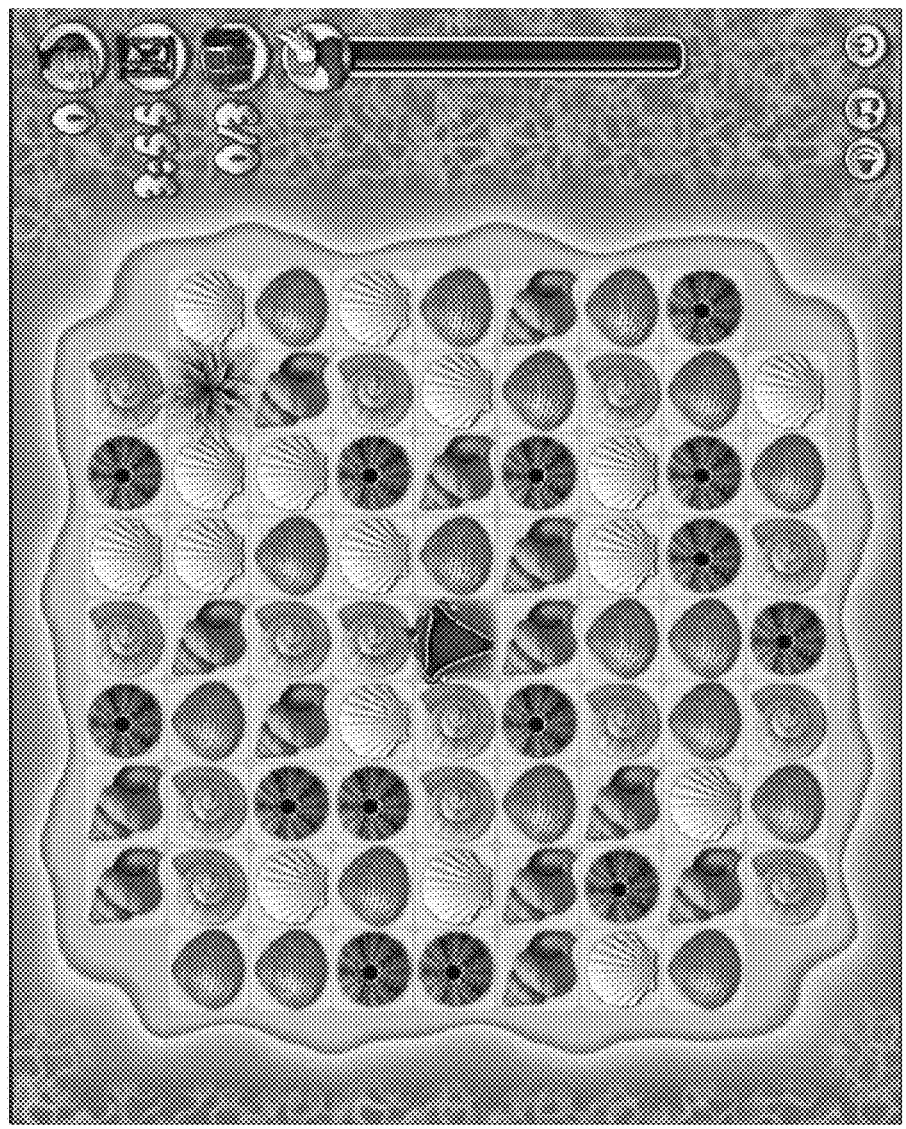
FIG. 6 shows an exemplary implementation.
Figure 7:
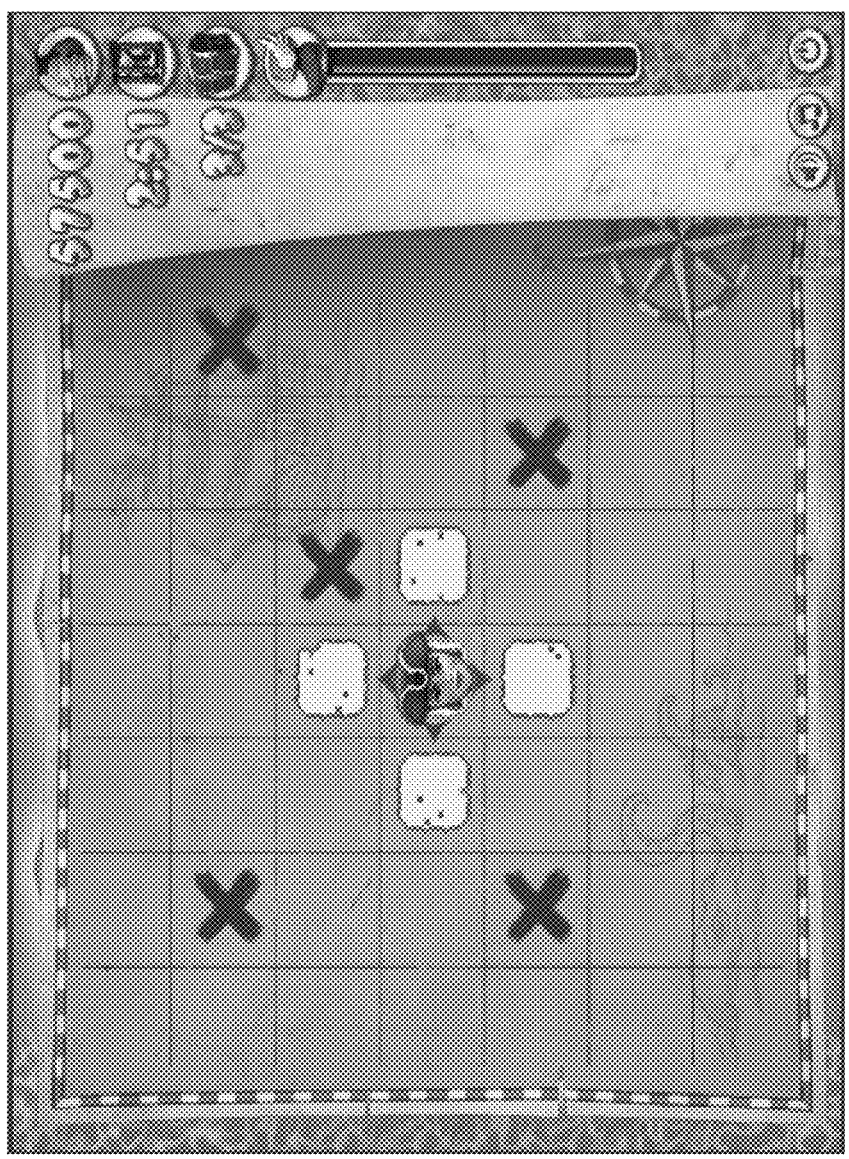
FIG. 7 shows an exemplary implementation of a map view.
Figure 8:
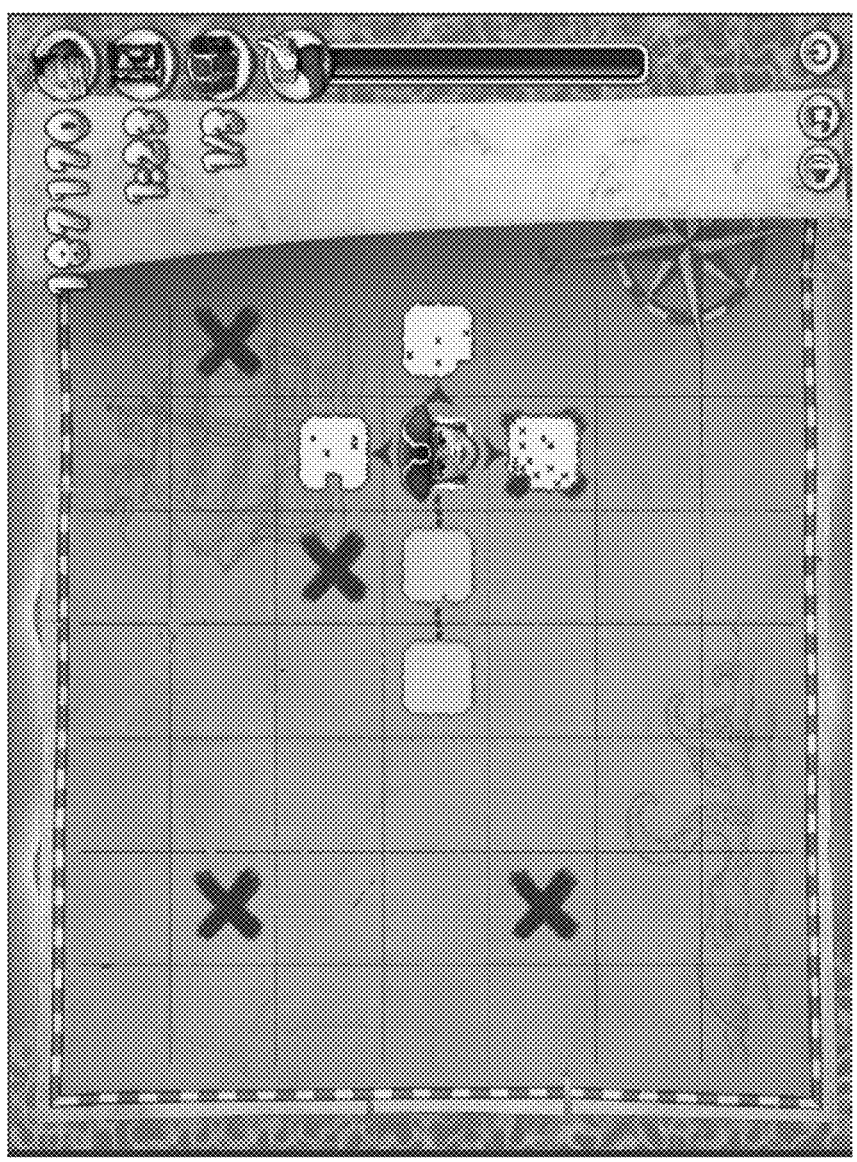
FIG. 8—Map view where the player has completed three levels.

The game can be laid out over several different shapes for the game board and FIG. 3 shows a game board with a plurality of game elements of several types. The triangle in the middle of the game board is what is sometimes referred to as the 'Heroine' which is a game element that can not be matched with other game elements. The Heroine can also move on the game board to for instance collect the map when that has been revealed.

When game elements have been removed after a match of game elements the game board is refilled with game elements from the side where the matched elements have been moved to the other in the matched group. If the removed elements were in the middle of the board the adjacent game elements will be moved in to fill the gap and new elements will fill from the game board edge.

Game Flow

The game is a time based game that plays like a switcher on the surface, but differs in three main aspects;

The aim of the game is to guide a protagonist (the Heroine) around the game world to collect items and move from area to area by switching and matching similarly coloured bricks The game world consists of a network of playfields or islands, between which the player can move using charts and maps Refills come in the direction that switches are made, and as the protagonist is essentially just one of the bricks, the player is free to move around using switches and combos The game takes place during the pirate era on a string of tropical islands where the heroine Captain Bonnie "Cutlass" O'Boy sets out on an epic hunt for fame and fortune. The main gameplay involves combining bricks in the form of shells washed ashore to dig up treasures hidden below. As combos disappear, new bricks are refilled with waves rolling in the direction of the switch, bringing any special bricks along.

Treasures are randomly distributed and buried on single squares throughout the levels, and by making combos on top of, landing on or dashing over such a square automatically digs up the treasures hidden below. To further assist the player to overview where treasure has already been searched for, all squares having been dug up permanently turn a different colour than the rest of the board.

On each level, a chart must be collected to unlock the surrounding areas. The chart, which is randomly buried with one of the treasures, will bring up the world map when collected on which the player then may choose which island to go to next by simply clicking on it.

Lastly, the world map also contains the treasure islands randomly scattered throughout the game world. These islands feature more regular treasures than other islands, making them most desirable to reach in terms of points. The treasure islands are viewable from the start and are represented by large Xs on the map.

Dash Meter

The Dash Meter is a visual meter denoting at what level the chargeable dash ability is currently at. By making combos and finding treasure and charts, the dash meter fills up accordingly until being completely full.

Once filled, a symbol at the top of the meter is lit to inform the player that a dash is available. Depending on the distance travelled when activating the dash ability, various amounts of the meter is depleted.

Based on an 80 points scale, the dash meter correlates to the maximum amount of squares possible to traverse at 10 points per square. Examples of the various awards for combos may be seen on the following page. Different game board layouts can require different amount of score to fill the dash meter. The dash meter can be in the form of a bar that is filled up to progressively show the player how far from having collected points to do a dash he has come.

Combos

The player can make different combinations of the game elements in the game. Some of these combinations will reward the player with certain special game elements.

Colour Combos

Colour combinations are the most basic way of achieving score in I Love Treasure. Used to move both protagonist and items around, as well as uncovering hidden treasure, colour combos make up the bulk of the gameplay in the game.

3-combos

Combinations made from three bricks of the same colour are the most basic combos in the game. These need to be made in a straight line; either horizontally or vertically, to be viable. 3-combos award 5 points to the Dash Meter.

4-combos

Combinations of four bricks of the same colour also need to be made in a line, but depending on their orientation, they either generate a line blast or a column blast when completed. 4-combos award 10 points to the Dash Meter.

5-combos

Combinations including five bricks may be made in a variety of different ways. L- and T-shapes cause simultaneous line- and column blasts, while lines trigger a colour bomb of that particular colour. Common for them, however, is that all 5-combos award 20 points to the Dash Meter.

Multi-combos

Combinations involving six bricks or more may be made in a wide variety of shapes and forms. All of them, however, cause the whole board to clear and award 80 points to the Dash Meter.

The map view can be shown where the player can select which level to play after one level has been completed. The level is in some implementations completed when the player has captured the map by placing the Heroine on the tile where the map is.

In the map view miniatures of the closest levels are shown and in some implementations the locations of the treasures are indicated on the levels. Treasure islands can also be shown in the map view.

Game Objects

Protagonist

The protagonist, or 'heroine', of I Love Treasure is basically a brick that is switchable but not possible to combine. Starting each game in the centre of the first level, the protagonist may be moved directly by switching with an adjacent brick that creates a combo, indirectly by making switches ahead in the desired direction or by performing a dash.

Obstacles

Obstacles are stationary, obstructive objects randomly placed throughout the levels that come in various shapes and sizes. Ranging from small rocks and bushes taking up a single tile to multiple tiled hills and trees, all of them exist to challenge the player's movement and the collecting of items. However, obstacles may be destroyed using 4, 5 and multi-combos.

Charts

Charts in I Love Treasure are the tools used to open the passages to other levels. Every level features a single chart randomly placed in one of the treasure chests that, once unearthed, falls to the ground. Since charts act just like the protagonist brick, the player can choose to have the heroine go to the chart or have the chart come to her. Once collected, the chart opens up the World Map from which players choose which island to go to next.

Treasures

Treasures in the game are chests filled with charts and/or points. There are two types of treasures; the regular treasure which may be found on any island and that contain charts and/or gold in various amounts, and the special treasure which may only be found on treasure islands and that always carry a large amount of gold and a chart.

In Short

Protagonist

The protagonist is a special tile without colour coding

It is switchable with other tiles but not possible to combine

It always starts every session in the centre of the first level

Obstacles

Obstacles are randomly placed, stationary objects

They come in various shapes and sizes

They are impossible to pass through but can be destroyed

Charts

Charts open up the World Map when collected

They are randomly placed in one of the treasure chests

They are special bricks comparable to the protagonist brick

Treasures

Treasures are chests filled with charts and/or points

They are randomly determined in terms of amount and location

They are automatically opened and emptied when dug up

Game Scoring

Combos

Making combos is the most basic way of achieving score in I Love Treasure. Due to the varying difficulty of each specific combo, naturally different combos yield different points:

3-combos award 1000 points 4-combos award 2000 points 5-combos award 4000 points Multi-combo award 8000 points Treasures Collecting treasure is one of the main aims of the game:

Small treasure award between 2 000 to 10 000

Big treasure award between 20 000 to 100 000

Finding all treasure on an island award 20 000

Boosters

The game may be implemented to offer the player the opportunity to buy or to generate or in some other way acquire boosters to enhance the gameplay. The boosters can in some implementations match the obstacles introduced on the game board.

Boosters

Sixth Sense Start each island with all treasures revealed

Instant Dash Start every island with the dash meter filled

Extra Time Start the game with +20 seconds on the clock

Game Modes

The game can be implemented to be played in several different game modes. In one implementation the player is playing the game against another player to score more than the other player. The goal is to play as many levels in the game as possible in a limited amount of time, for instance 4 minutes.

Open Game

Play 1 island or for 1 minute

Waves

In some implementations when several waves have occurred consecutively and generated new combinations the player can be rewarded with certain events or game elements. Such event can be to clear the whole board after 5 waves that have generated new matches of 3 or more game elements after each wave.

Yo-Yo Game

Another game that may be implemented using the techniques described herein is a yo-yo game.

Game Goals

The system and methods herein relate to games that can be played online and some embodiments can be played on platforms where the game is integrated in to a social network and in some implementations the game may be a standalone game that is played by one player.

The game may be implemented as a game with different types of game elements that can be understood to behave like balls and yo-yos. The ball game elements are typically differentiated by colours.

The player plays a character, who in a typical implementation is named Josie, who is trying to clear away balls from the rotating ball trains around her with her Yo-Yo. The aim is to knock out balls so that the remaining coloured balls contract into matching groups of 3 or more of the same colour.

Fill up the score meter by making matches to complete the levels. The player should usually use the Yo-Yo sparingly as destroyed balls do not count as points. It is possible to knock out balls as the yo-yo is pulled back as well as when it is shot forward.

Game Rules

Figure 10:
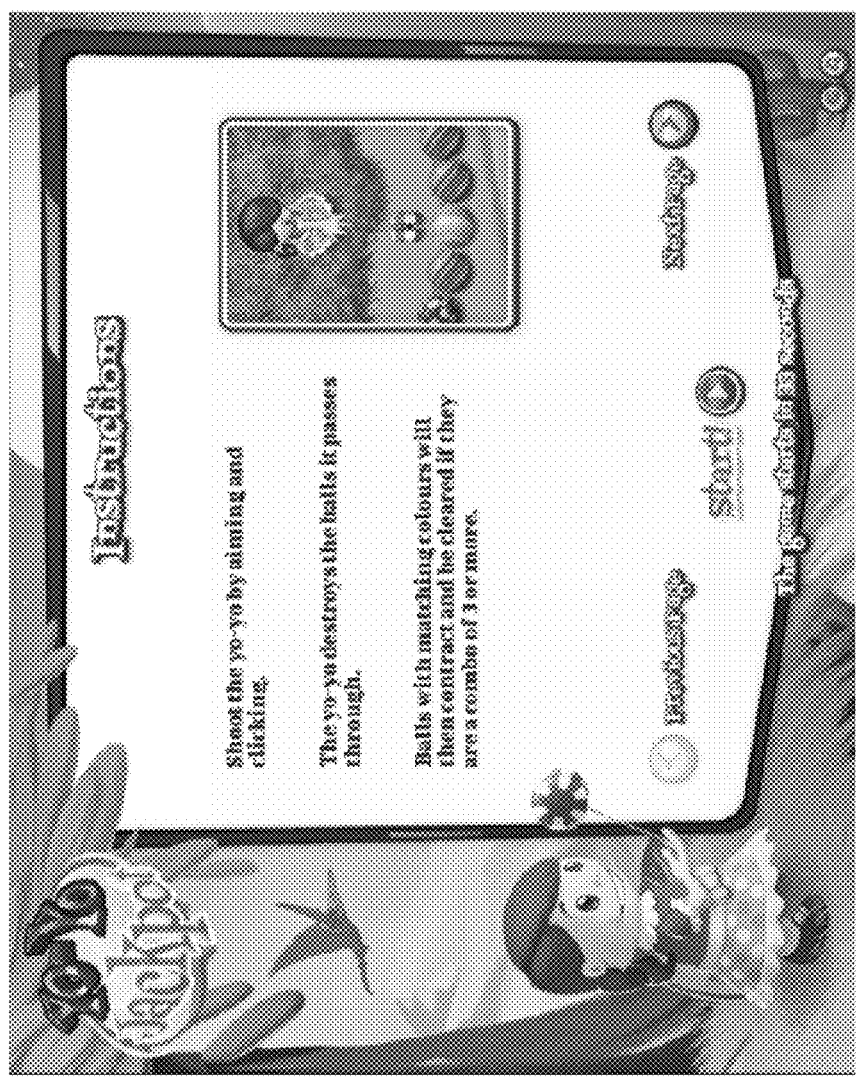
FIG. 10—Game instructions part 1.
Figure 11:
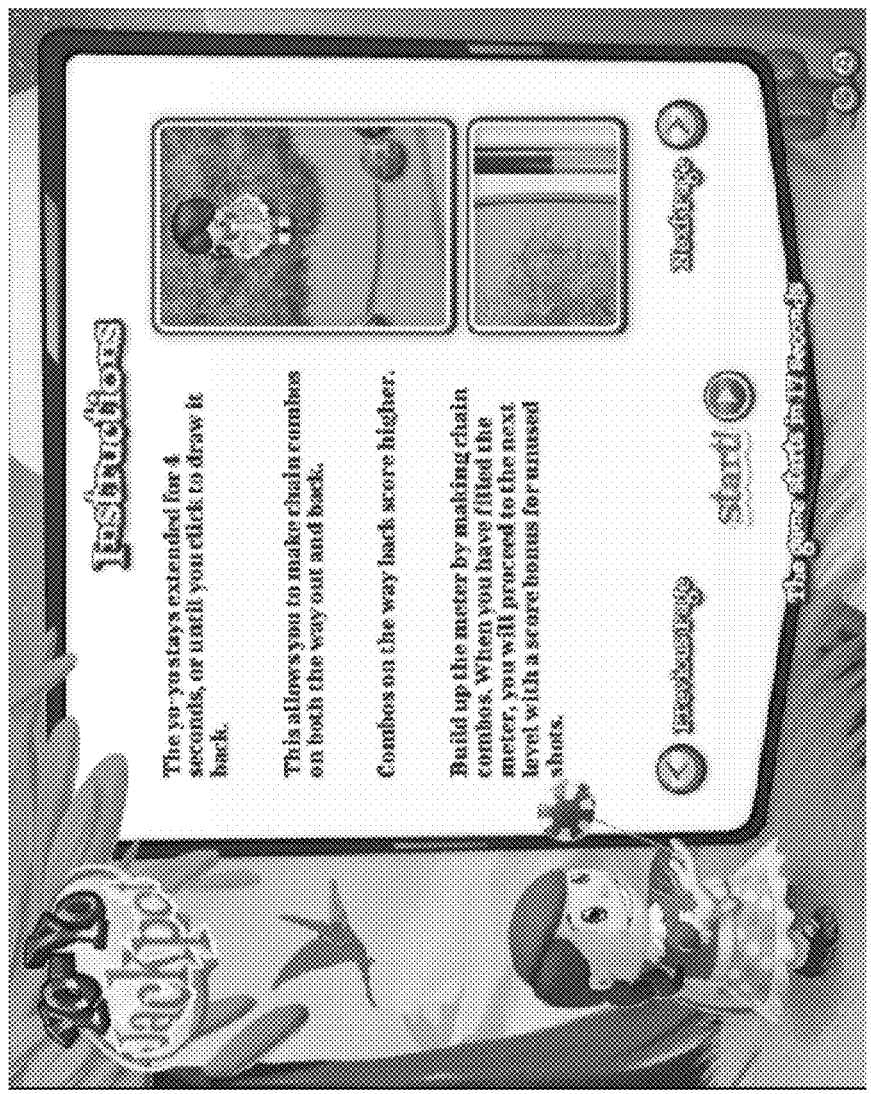
FIG. 11—Game instructions part 2.
Figure 12:
FIG. 12—One level with two tracks of balls being played. Score meter is shown on the right side of the screen.
Figure 13:
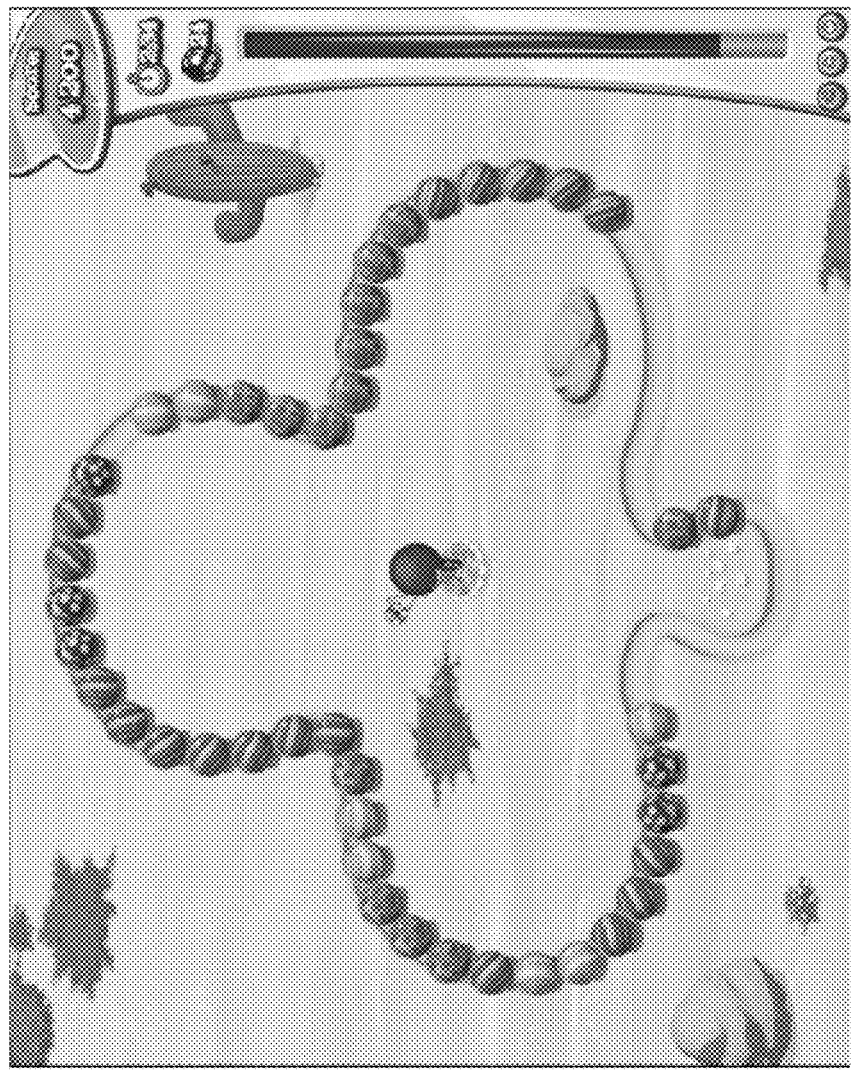
FIG. 13—Showing the player character before making a yo-yo shot.
Figure 14:
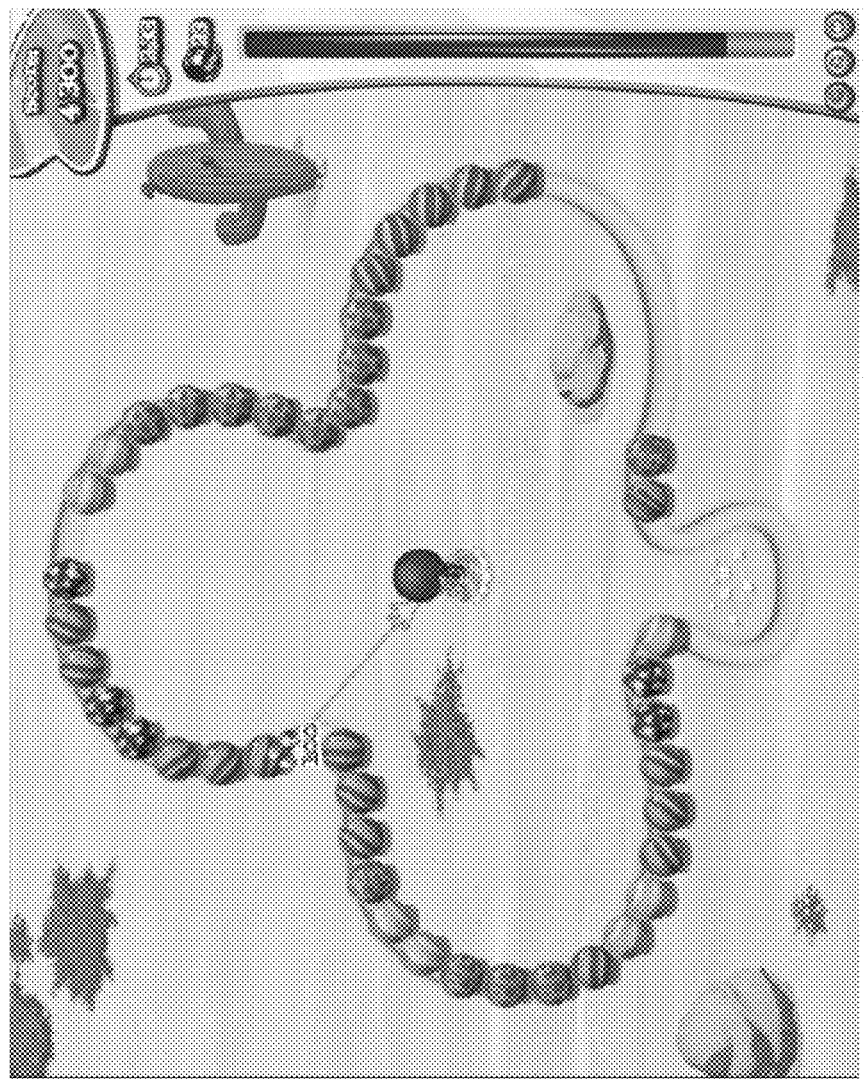
FIG. 14—Showing the outbound journey of the yo-yo when the player makes a shot by clicking.
Figure 15:
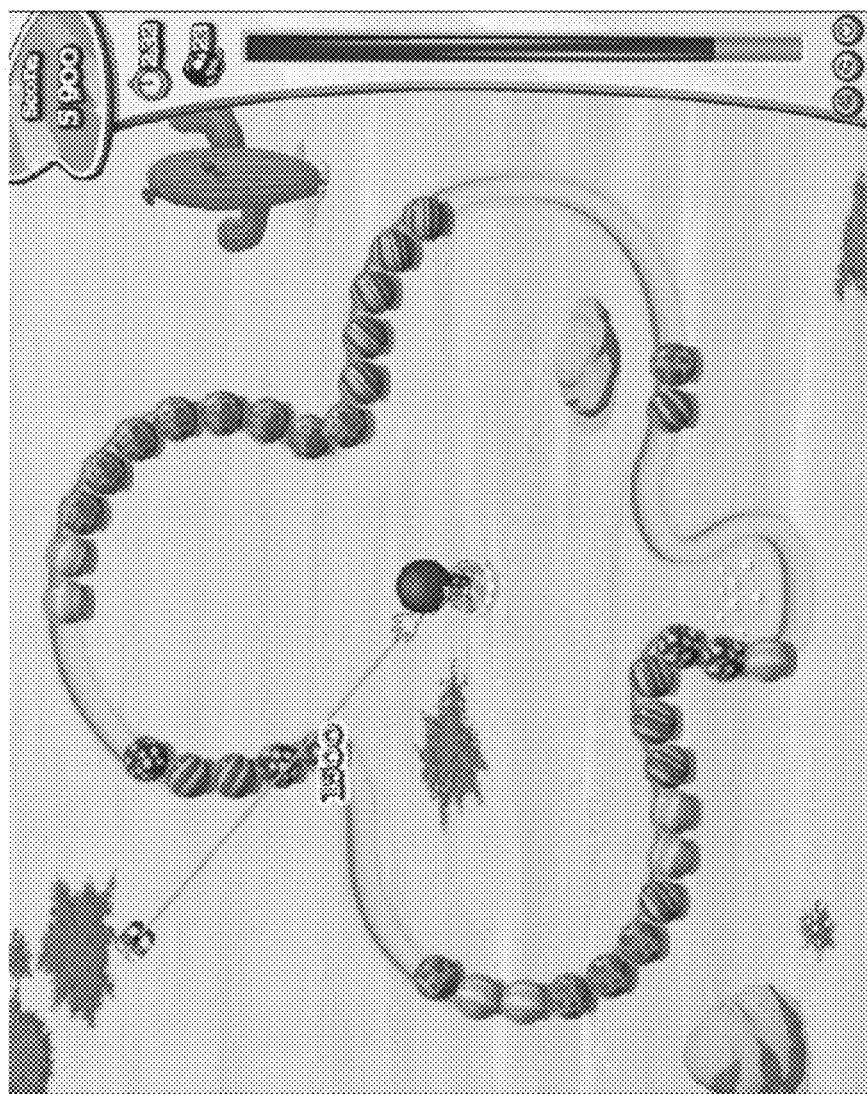
FIG. 15—Showing the yo-yo extended to the maximum.
Figure 16:
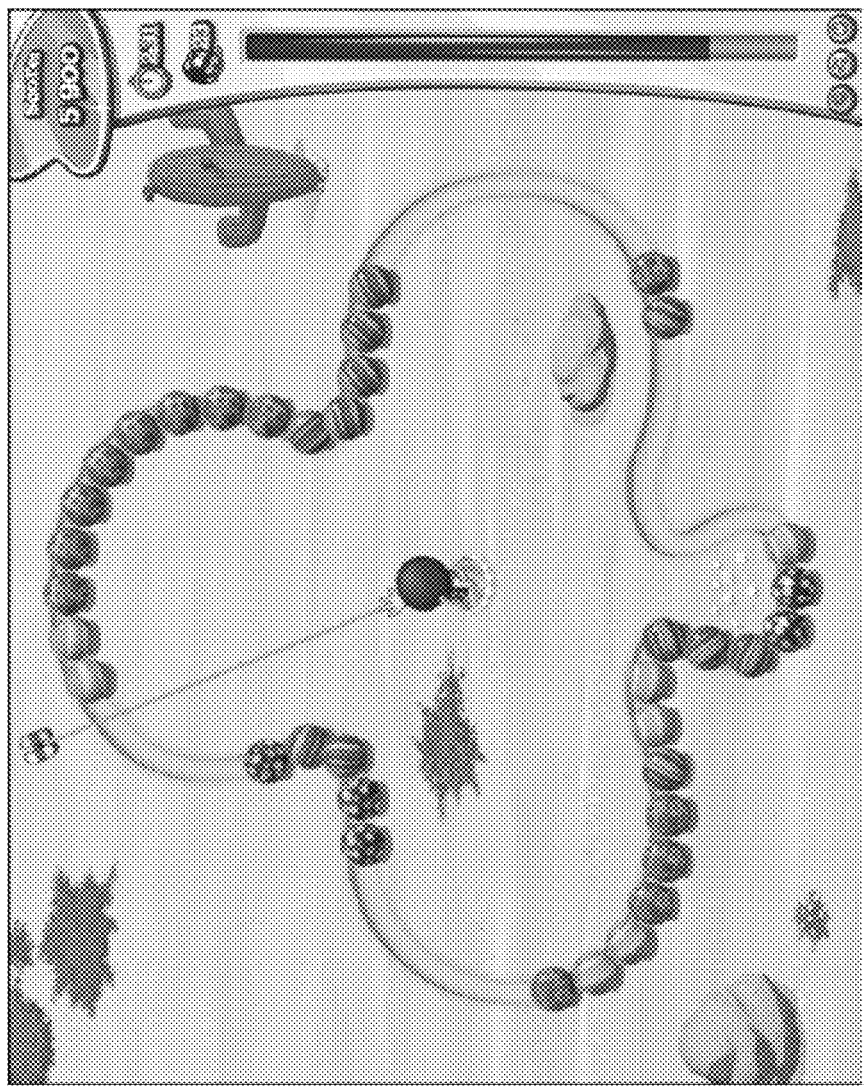
FIG. 16—Showing that the player can rotate the yo-yo during a shot.
Figure 17:
FIG. 17—Showing the inbound journey of the yo-yo, which can either be manually activated by the player or which is triggered after a certain period of time.

The player controls a character, who typically is in the middle of the screen as shown in FIG. 12. Rotate the character to aim, and click to shoot out her yo-yo to destroy balls. Rotation is done by for instance moving the cursor of the mouse, in the case the game is implemented on a computer with a mouse pointing device. The player is typically presented with instructions when starting the game, shown in FIG. 10 and FIG. 11.

The yo-yo will remain fully extended until the player click again or come back automatically after 4 seconds. The yo-yo will destroy balls on the way back as well as on the way out.

Figure 9:
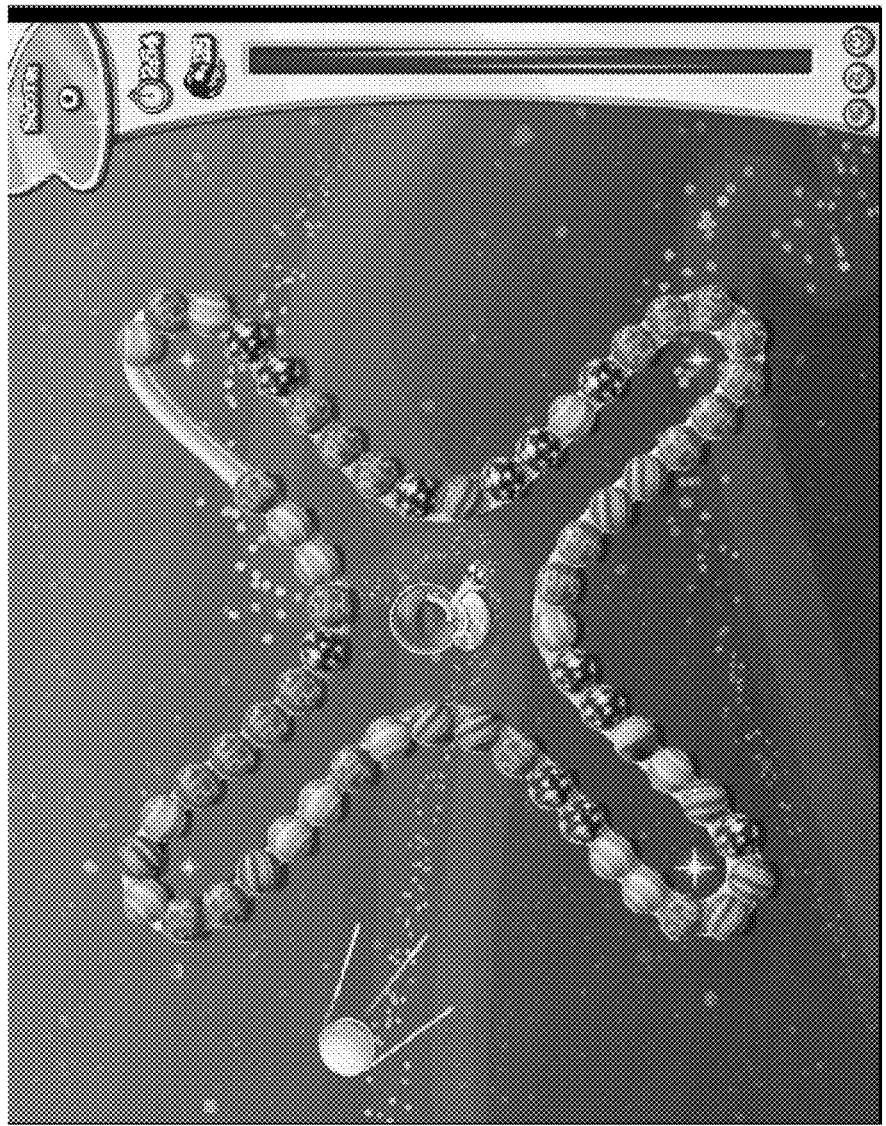
FIG. 9—A level with one track of balls before the first shot is made.

When the player's yo-yo creates gaps in the train, the gaps will only contract if the balls on both sides of the destroyed ball have the same colour. If the player makes 3 or more balls of the same colour match up this way they will pop, i.e. be destroyed, and the player may get a chain of consecutive matches. As the ball track empties, it gets filled up again when the number of balls runs too low. Some levels can have one track of balls, as shown in FIG. 9, or it can have multiple tracks, as shown in FIG. 12.

Balls destroyed by the yo-yo gives a very low score impact, in a typical implementation zero. Instead it is the matches that give a high score and also fill up the player's combo meter on the right side of the game screen. Top up the whole meter to complete the level and to receive a special Yo-Yo Jackpot, which increases the score. The player's Jackpot bonus depends on the number of yo-yo shots the player made during the game, so in order to get a high score the player should aim carefully and make use of the yo-yo in both directions to maximize the score.

Special Balls

Mixed into the train of coloured balls there are three special balls:

Black Ball

A black ball cannot match with any other balls, and blocks the player's chain combos. The player can destroy it with the player's yo-yo though.

Rainbow Ball

This ball is attracted to any colour and if the player gets it to touch any ball, all balls of that colour will be destroyed in all ball trains, and will help to top up the meter. So knock out the balls next to it to trigger it. It cannot be destroyed by the yo-yo.

Cloud Ball

These glowing balls come in pairs. They are only attracted to each other and if the player gets them to connect the whole train is cleared, which helps to fill up the player's combo meter.

In a typical implementation, the game ends when time runs out or the player have completed 2 levels.

Game Controls

The controls described herein are used in an implementation on a computer, having a keyboard and a mouse. It should be noted that other implementations can be adapted to other devices.

Move the mouse to rotate the player character and aim. Click on the left mouse button to send out the yo-yo, and click again to pull it back in. If the player wishes to end the game prematurely, just press End Game.

In versions where the game is implemented on devices that have touch screen, the game controls can function in different ways.

In some implementations, the player clicks with a finger or stylus in order to shoot the yo-yo in the direction of where the player clicked. Then the player can use a swiping motion to move the yo-yo around, and a clicking motion to pull the yo-yo back again.

In other implementations, the player clicks and holds the finger or stylus in order to aim, then releases the it to shoot the yo-yo in the direction the player is aiming when releasing the pressure. In order to retract the yo-yo, the player can once again press and hold the finger or stylus to the screen, and upon release the yo-yo will be retracted.

The game may also be implemented so that the player may use a swiping motion to shoot the yo-yo, and then use a subsequent swiping motion to retract it. The yo-yo may in some implementations follow the position of the player's finger or stylus, so that both extension and retraction of the yo-yo is done in one fluid motion.

Combinations of the implementations described above are also possible.

Game Scoring

The player's score is based on the matching combos the player make and how many shots the player needed to fill the meter.

Cleared balls: 100 points each.

Matches:
　Outgoing yo-yo shots:
　3 ball match: 500 points
　4 ball match: 1000 points
　5 ball match: 1500 points
　6 ball match: 2000 points
　And +1000 points for each additional ball.
　For matches made when the yo-yo is returning all the scores above are increased by 500 points.

Chain Matches

If the player creates a chain of matching combos with one shot, each consecutive match has a 20% score bonus, so the second match gets 120% score, the third 140% and so on.

Double Match Bonus:
　Match in both ball tracks with a single yo-yo shot in the multi track levels for a 50% score bonus.

Special Ball Scores:
　Rainbow ball: 200 points per destroyed ball.
　Cloud ball: 200 points per destroyed ball.

Yo-Yo Jackpot Bonus:
　At the end of each level the player gets a bonus depending on how many yo-yo shots the player used to fill the meter:
　Level 1 bonus: 50,000 starting bonus, then 2,000 points per yo-yo outbound shot are subtracted.
　Level 2 bonus: 100,000 starting bonus, then 5,000 points per yo-yo outbound shot are subtracted.

Strategy Playing the Game

The following describes the strategy to play the game and to earn high score in the game in one implementation.

The key in a typical implementation of the game is to fill the meter fast. This is done by spotting which balls are possible to destroy to create a multi step chain match. As each outbound shot decreases your Yo-Yo bonus it is vital to use the contraction to create matches as well. It is important to think before each shot instead of rushing it.

Use the special balls to get an advantage as these fill up the meter fast. If any rainbow balls appear they are an easy way to fill the meter, but consider which colour it should impact with for maximum effect.

Use the special double match and colour bonuses to boost the score, by creating the right colour matches upon the yo-yo's return.

The first shots with a full ball track can often be the best opportunity as there are many balls to create matches with. So pay extra attention when the ball track has filled up again.

Physics

An integral part of the game is the way the yo-yo is implemented. In a typical implementation for playing on a computer with a keyboard and mouse, the player clicks in the direction the yo-yo is supposed to be fired.

When making a shot, the yo-yo will extend in the direction the player clicked, and will destroy any balls it comes in contact with on the way. In a typical implementation, the yo-yo will destroy balls that it comes into contact with both on the way out and on the way back. During a shot, it is possible for the player to rotate the yo-yo and subsequently change its track. When the yo-yo is extended fully, the player can choose to pull it back by clicking again. If the player does not actively choose to pull the yo-yo back, it will retract automatically after a pre-set period of time, such as four seconds.

In some implementations, the body of the yo-yo will destroy balls, but the string holding it will not affect the game board.

It is possible in some implementations for the player to select how far the yo-yo extends each shot by for instance clicking a second time to stop the yo-yo, then a third time to retract it.

FIG. 13 to FIG. 17 show the process of extending and retracting the yo-yo in a typical implementation of the game.

Princess Game

Another implementation utilizing the inventions described is presented below.

The system and methods herein relate to games that can be played online and some embodiments can be played on platforms where the game is integrated in to a social network and in some implementations the game may be a standalone game that is played by one player.

Game Story

The story of the game in one implementation is as follows:

An evil witch has cast a spell that has removed all the love from all of the Kingdoms in all of the world. Everyone and everything is petrified.

Figure 18:
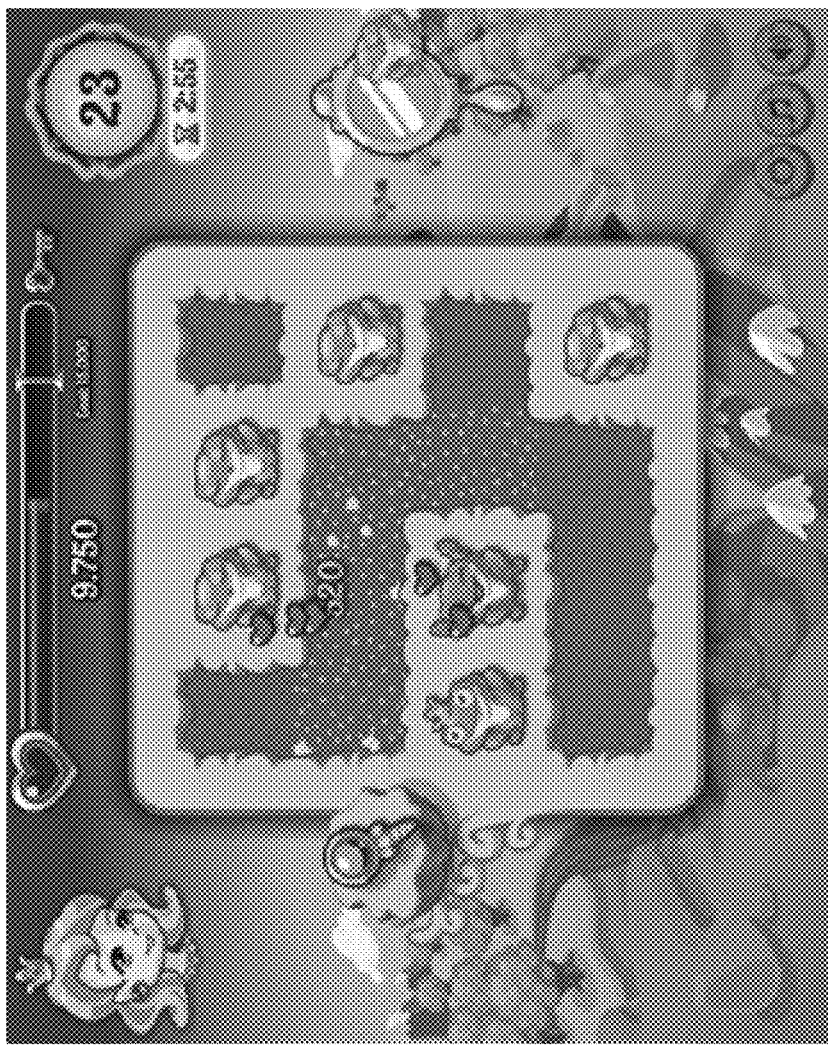
FIG. 18—A typical implementation of a game in progress.
Figure 21:
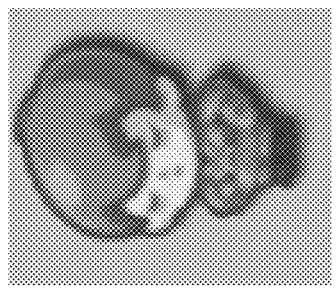
FIG. 21—Prince.
Figure 22:
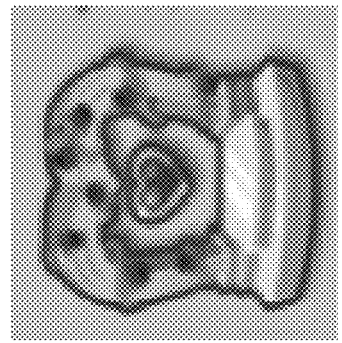
FIG. 22—Love Portal.
Figure 19:
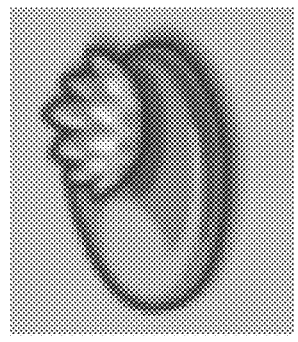
FIG. 19—Water lily.
Figure 20:
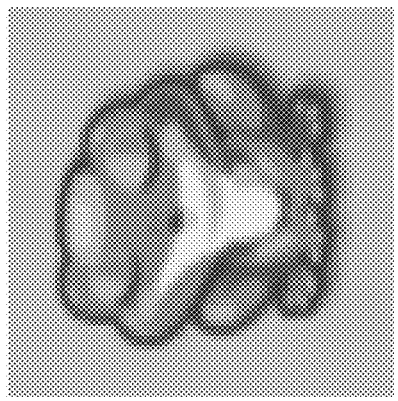
FIG. 20—Frog.

Now there is only one hope for the Kingdoms: Princess Peony! The player has to help her combine similar objects and release Love into the kingdom again. Create enough Love to receive the Heart Key and free each Kingdom from the spell. A typical implementation of the game board is shown in FIG. 18.

Game Rules

In this game the player needs to place three or more figures of same type next to each. This will make them evolve to their "next" form. Different game objects used for combinations, also referred to as figures may be Water lily, Frog, Prince, Love Portal and Castle. A typical implementation is shown in FIG. 19, FIG. 20, FIG. 21, FIG. 22 and FIG. 23.

Example: Three water lilies placed next to each other will transform into a frog. Then three frogs will transform into a Prince, three Princes will transform into a Love Portal and three Love Portals will transform into a Castle.

There are a limited number of moves in the game. Each time the player places a figure on the game board the player's number of moves is reduced by one. The number of moves left can be seen in the top right corner of FIG. 18.

Typically there is also a time limit, for instance four minutes. The time remaining can be seen in the top right corner in FIG. 18, below the number of moves left.

Love Meter

Figure 24:
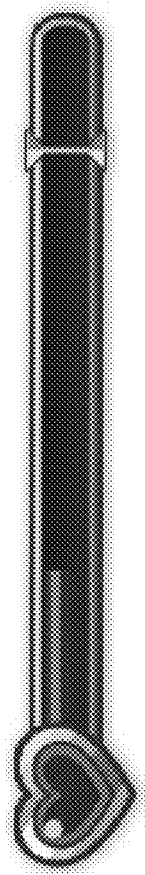
FIG. 24—Love meter.

Each correct match will not only create a new object but will also release "Love" in the form of hearts into the Kingdom. These hearts will fill the meter on top of the game board, which can be seen in FIG. 18. When the meter is full the current Kingdom will be released from the spell and the player will advance to the next level/Kingdom. A love meter implementation can be seen in FIG. 24.

Bigger groups of matched figures release more "Love" and will give the player more points. If the player matches 6 or more figures the player also wins extra moves.

Treasures and Other Game Objects

The player can find treasures in empty spaces after a match is made.

Example: The player places a frog next to two other frogs. All three frogs will then move to the position of the last-placed frog and transform into a Prince. The area where they stood will be dug up and any hidden treasure will be revealed.

The treasures can contain extra moves and/or gems.

Figure 25:
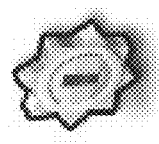
FIG. 25—Coin.
Figure 23:
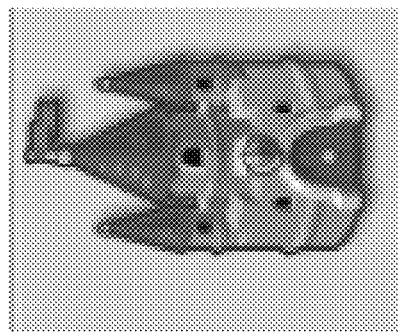
FIG. 23—Castle.

Coins will give the player extra moves. An exemplary implementation can be seen in FIG. 25.

Figure 26:
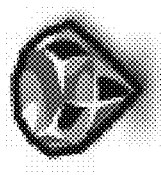
FIG. 26—Gem.

Gems will give the player extra points. An exemplary implementation can be seen in FIG. 26.

The player can see what areas the player has dug. The difference between areas where the player has dug and not dug can be seen in FIG. 27 and FIG. 28. The player should try to find all treasures on each level, as this will give the player a lot of extra moves and points.

There can also be rocks on the game board, which take up the same spots as regular figures but cannot be matched with anything. An exemplary implementation can be seen in FIG. 29.

To the left of the playing board there is a grass shelf where the player can place a figure that the player don't want to place on the game board at the moment.

Just click on the grass shelf to place the game object there. Later on when the player would like to use the game object placed on the Grass Shelf, he or she can click it to pick it up and switch with the currently held game object. An exemplary implementation can be seen in FIG. 30.

Magic Hand

Figures 31, 32:
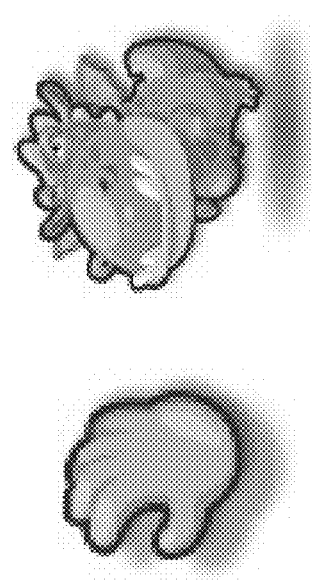
FIG. 32—Dragon.

The Magic hand makes it possible to move an already placed figure to another location. Just click a figure to pick it up and then the player can place it on an empty location. An exemplary implementation can be seen in FIG. 31.

Dragons

Figure 33:
FIG. 33—Showing a trapped dragon.

The dragons are a special kind of figures. An exemplary implementation can be seen in FIG. 32. After each move the player makes they will fly to a new location. However they can only move one square at a time so the player can capture them by making sure that each square next to a dragon is occupied by another figure. After a dragon has been captured it remains so, even if adjacent squares would become unoccupied. A captured dragon can be seen in FIG. 33.

If the player manages to capture three dragons next to each other the player is awarded, in a typical implementation with a magical wand.

Figure 34:
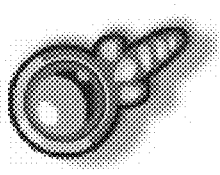
FIG. 34—Magical Wand.

The magical wand will transform all figures of a specific type to their next form. An exemplary implementation can be seen in FIG. 34.

Figure 35:
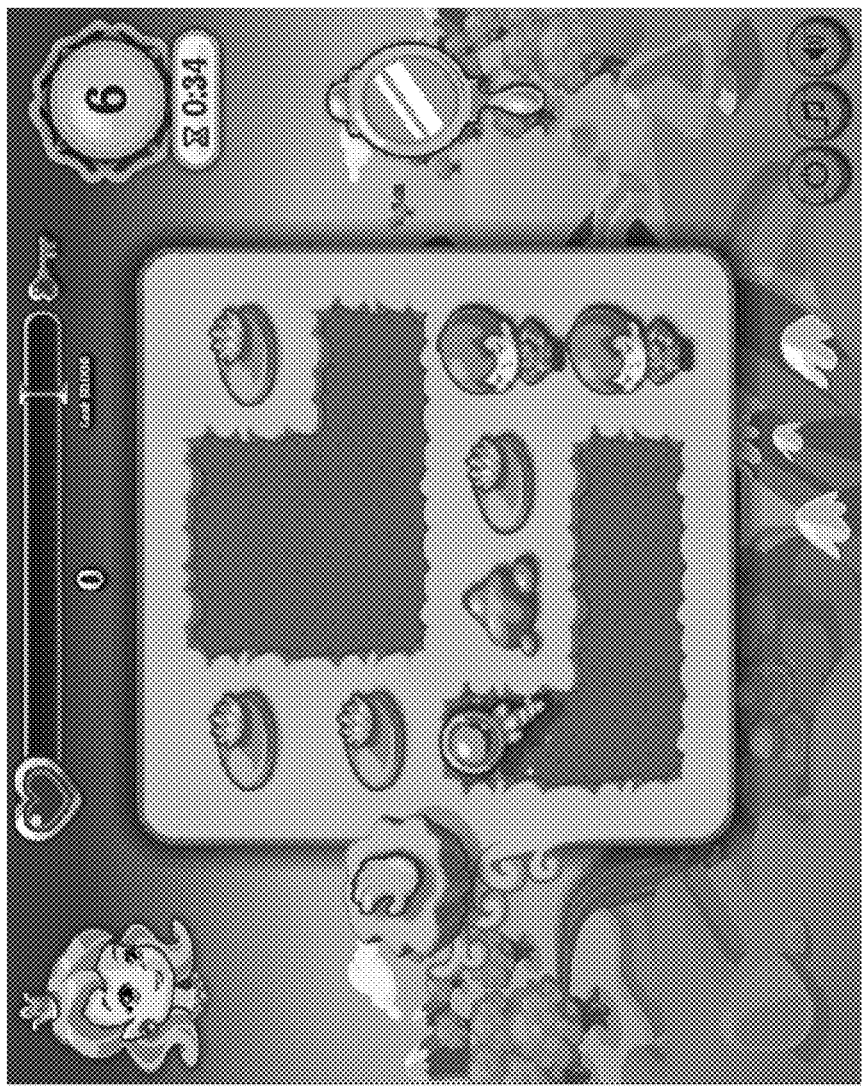
FIG. 35—Magical wand about to be used for transforming figures.
Figure 36:
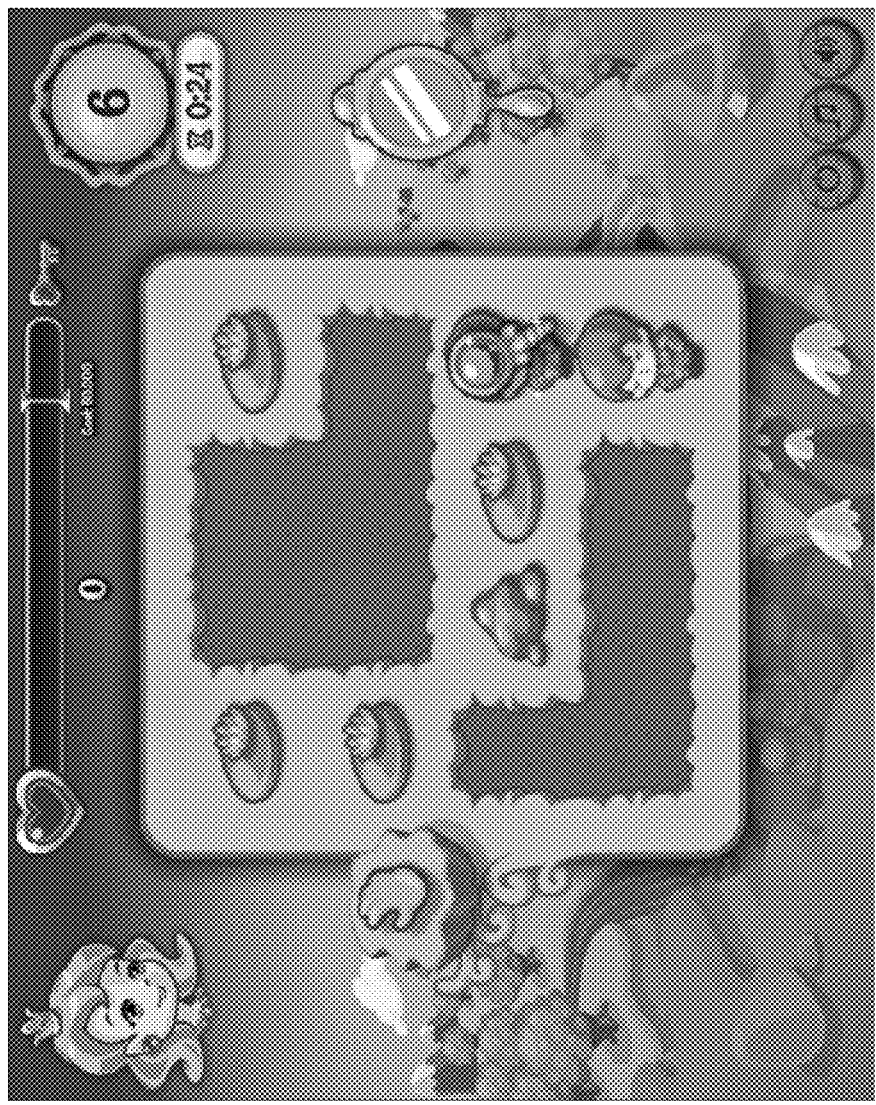
FIG. 36—Magical wand targeting a Prince, which will transform all Princes into Love Portals.
Figure 37:
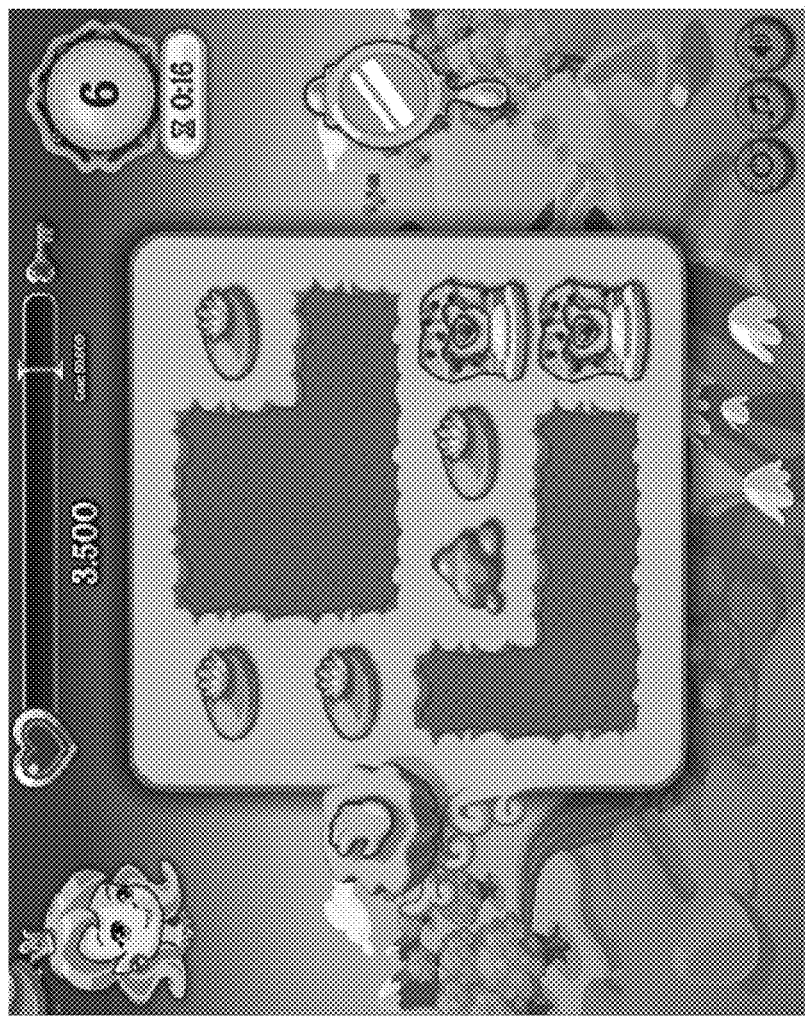
FIG. 37—Showing after the Princes have been transformed into Love Portals.

The player can just click a figure with the magical wand and all figures of the same type on the whole board will transform. This process is shown in FIG. 35 to FIG. 37. In a typical implementation, the wand can only be used on objects that are match-able (i.e. figures), which means it cannot be used on rocks, coins or other types of game objects.

Game Controls

Depending on which kind of device the game is implemented, the controls may vary. A typical implementation is on a personal computer equipped with at least a mouse.

In this typical implementation on a personal computer with a mouse, the game is controlled with the mouse. Move the mouse and click where the player would like to place a figure.

If the player wishes to end the games prematurely just press End Game at the bottom of the screen. The player can also toggle the sound and music On or Off.

In some implementations on mobile devices, the player can use touch-based gestures to interact with the game, this is described further elsewhere in this document.

Game Scoring

The player gets points for matching three or more figure of the same kind. The more figures matched the more points the player gets. Below are the scores in a typical implementation:

3×water lilies=400 p
4×water lilies=800 p
5×water lilies=1500 p+1 extra move
6×water lilies=2500 p+2 extra move
7×water lilies=4000 p+3 extra move Then 2000 p for each extra water lily and 1 extra move for each water lily.

3×frogs=1200 p
4×frogs=2400 p
5×frogs=5000 p+1 extra move
6×frogs=7500 p+2 extra move Then 2500 p for each extra frog and 1 extra move for each frog.

3×Princes=5000 p
4×Princes=7500 p

Then 2500 p for each extra Prince and 1 extra move for each Prince.

3×Love Portals=10000 p
4×Love Portals=12500 p
5×Love Portals=15000 p+1 extra move
6×Love Portals=17500 p+2 extra move
7×Love Portals=20000 p+3 extra move
8×Love Portals=25000 p+4 extra move
9×Love Portals=30000 p+5 extra move The player gets points for trapping dragons.

Three trapped dragons=4000 p
Four trapped dragons=7000 p
Five trapped dragons=10000 p Then +5000 p for each extra trapped dragon.

The Magical Wand gives the player the same points as a regular combination would. But with the Magical Wand the figures in the combination don't have to be next to each other. Ex: If the player clicks a Prince with the Magical Wand and the player has 5 Princes on the board the player get 10,000 p.

If the player use the Magical Wand on a figure more evolved than the Love Portal the player get 25,000 p for each figure.

There is a multiplier that will increase with 0.1 with each kingdom the player release from its spell.

The multiplier affects all points for the remainder of the game.

The player gets three extra moves for each Kingdom the player releases from its spell.

Strategy for Playing the Game

The player gets a lot of points from finding treasures, and should try to find as many of them as possible.

The player should try to make as big groups as possible. Not only will this give the player more points but the player can also earn extra moves.

The player should plan ahead where to place the figures and try to make sequences of combinations. For example, the player can match three water lilies together that are standing close to two frogs, which will make the three lilies turn into frogs, and then subsequently turn the three frogs into a Prince.

Trap three dragons to get the player's hands on the magical wand.

Use the magical wand wisely. Remember that all objects can be stored on the grass shelf, including the magical wand. This way they can be used on later levels.

Physics and Visual Effects

Whenever three or more figures, or match-able objects, are placed close to each other, they will merge and transform into a new type of figure. This is done through animations that make all adjacent objects 'melt together' and transform at the same time in order to become the new type of figure.

Figure 38:
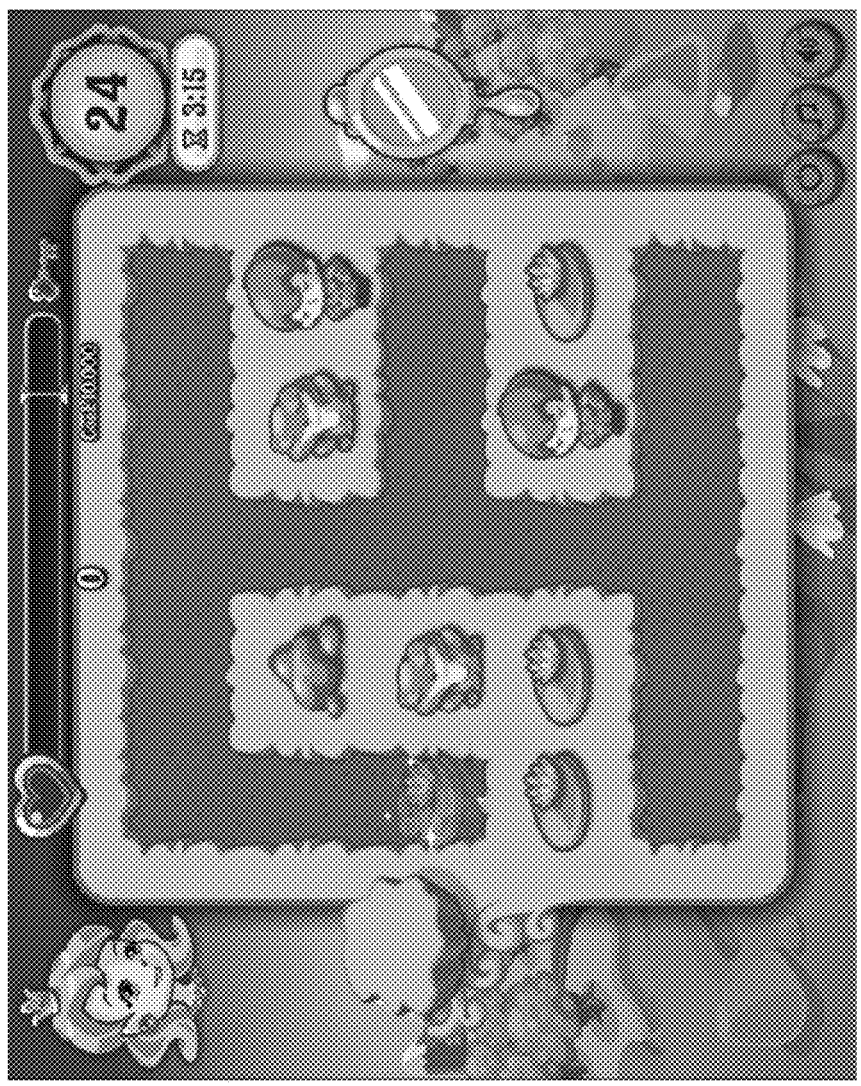
FIG. 38—Three water lilies about to transform into a frog 1.
Figure 39:
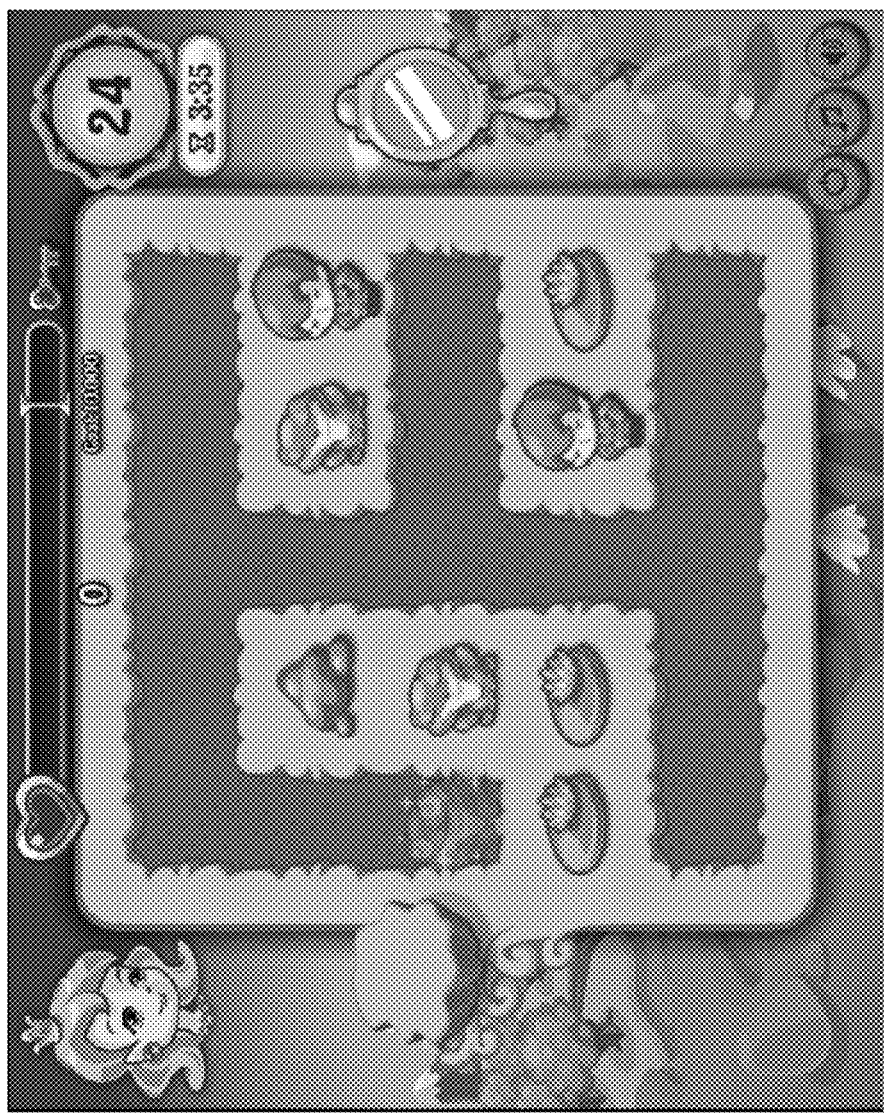
FIG. 39—Three water lilies about to transform into a frog 2.
Figure 40:
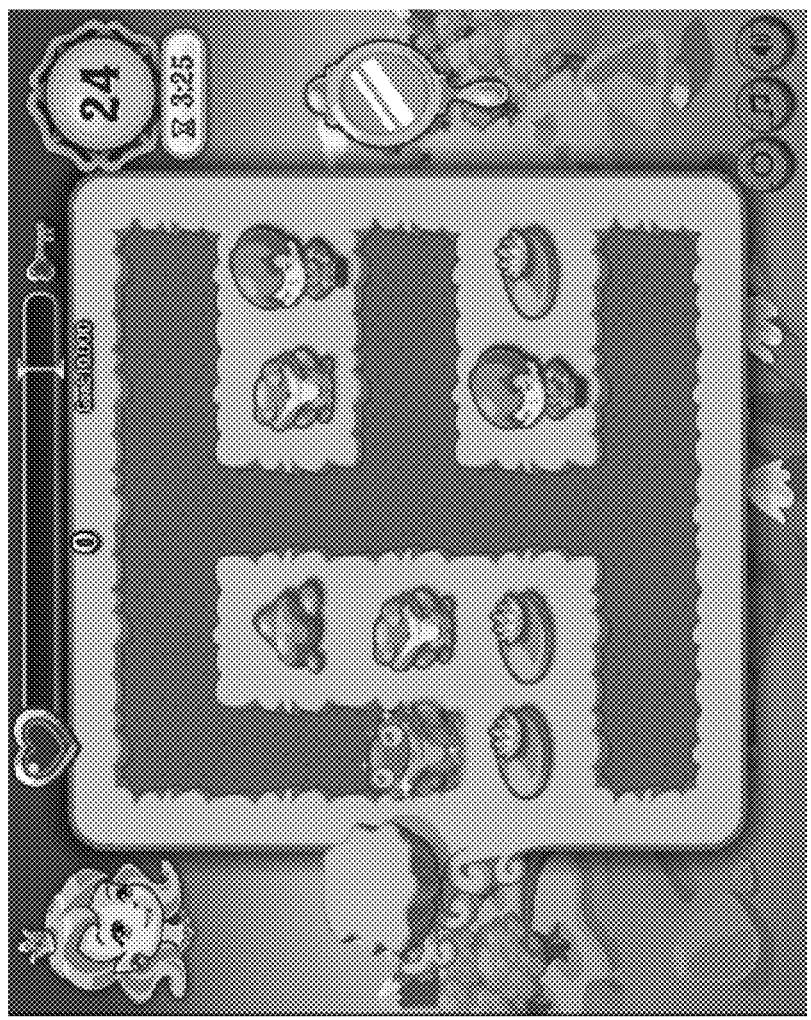
FIG. 40—Three water lilies about to transform into a frog 3.

When hovering over a place when the player is about to make a match, it can be seen which objects will be transforming, and also what kind of figure they will transform into. This is shown by an image flickering between showing the new figure which the surrounding figures are about to transform into, and showing the figure the player is about to place on the game board. In FIG. 38 to FIG. 40 the player is about to place a water lily next to two other water lilies, and those three figures will transform into a frog. The flickering image of the frog can be seen in the figures.

In FIG. 38 the water lily the player is about to place on the ground can be discerned behind the transparent frog. FIG. 39 shows less of the lily and more of the frog, and in FIG. 40 the player can see the flickering image of the frog quite clearly.

In some implementations, the figures that are about to transform into a new figure will visually be drawn towards the placement of the new figure when the player is hovering over the position it is about to be placed in. This will happen in pulsating movements that in a typical implementation corresponds to when the image flickers between the current figure and the figure that is about to be created.

So for example, when the image of the placed figure is shown (the lily in FIG. 38), the figures that are about to be transformed are in a relative position that is further from the centre than the positions they have when the image of the frog is more distinguished in FIG. 40.

Card Game

Another implementation utilizing the inventions described is presented below.

The system and methods herein relate to implementing a card game on an online gaming platform, optionally connected with a social network. This is to some extent embodied in the games King of Hearts and King of Spades, descriptions of which will follow. The techniques explained this document mostly relates to typical implementations, but it should be understood that alterations can be used without departing from the spirit or scope of the invention.

King of Hearts

In King of Hearts the player plays the classic card game Hearts against multiple computer opponents, typically 3. In Hearts, the aim is to collect as few points as possible. In a typical implementation, the game is played for 4 rounds, or until one of the players gets a total of 53 points or the time runs out.

The game plays according to classic Hearts rules. Hearts is a trick-taking game where all Hearts give 1 penalty point and the Queen of Spades gives 13 penalty points. The player's objective is to avoid winning tricks with points cards in them to keep the player's points as low as possible. The lower the player's card points are when the games is up the better the player's final score will be.

Game Rules

At the beginning of the game each player receives 13 cards. In a typical implementation, the player's cards will automatically be arranged according to suit and value. In the first round the player get to trade 3 cards with the opponent to the left from the player. The player chooses what to give away without knowing which 3 cards will be received back. In the second round the player trade 3 cards with the player on the player's right and in the third round 3 cards with the player across from the player. In the fourth round no cards are traded and then the process starts over again.

The player has to follow suit, which is defined by the first card played in each trick, if the player can. If the player lacks a card of the right suit the player may play any card. The highest card in the first suit played in each hand wins the trick. There are no trump suits.

There are some special rules on what cards may be played. The first card played in the first trick is always 2 of clubs. During this first hand no one may play a Heart or the Queen of Spades, even if they lack any Clubs. The player cannot lead with a Heart before the suit has been "broken". This means that first someone has to play a Heart when the hand was opened with a different suit. After that Hearts may be played as the first card in a trick.

The first round is started by player that has the 2 of Clubs on hand. The following hand is started by the player who won the previous trick by playing the highest card in the leading suit. This continues until all cards have been played and the score for the round is tallied.

The aim of the game is to avoid winning tricks that contain cards from the Hearts suit which give 1 penalty point each and in particular to avoid winning a trick with the Queen of Spades which is worth 13 penalty points. The game continues until 1 of the players has amassed 53 points or more. The player with the lowest amount of penalty points at that stage is the winner.

There also 2 special score events that can happen:
If a player wins all 13 tricks in a round the player "is Shooting the Sun".
If a player wins all the penalty cards, i.e. all Hearts and the Queens of Spades, it is known as "Shooting the Moon".

In the event of a Shooting the Sun all 3 opponents are given 52 penalty points. In case of a Shooting the Moon all opponents are given 26 penalty points if the shooter's current score is below 26 points. If the players own score is more than 26 he gets 26 points deducted from his penalty count.

The game ends after 4 rounds, or when one of the players has a total of 53 penalty points or more at the end of the round tally, or when time runs out.

Game Controls

The player selects the card that the player wishes to play by for instance clicking on it in an implementation for a computer. The game will automatically grey out cards that cannot be played if they are of the wrong suit or similar. To pass cards to an opponent, just click on the 3 cards the player wish to pass from the player's hand.

If the player wishes to end the game prematurely, just press End Game.

Visual Indicators

The game described herein can be implemented with various indicators that help the player keep track of things.

Figure 41:
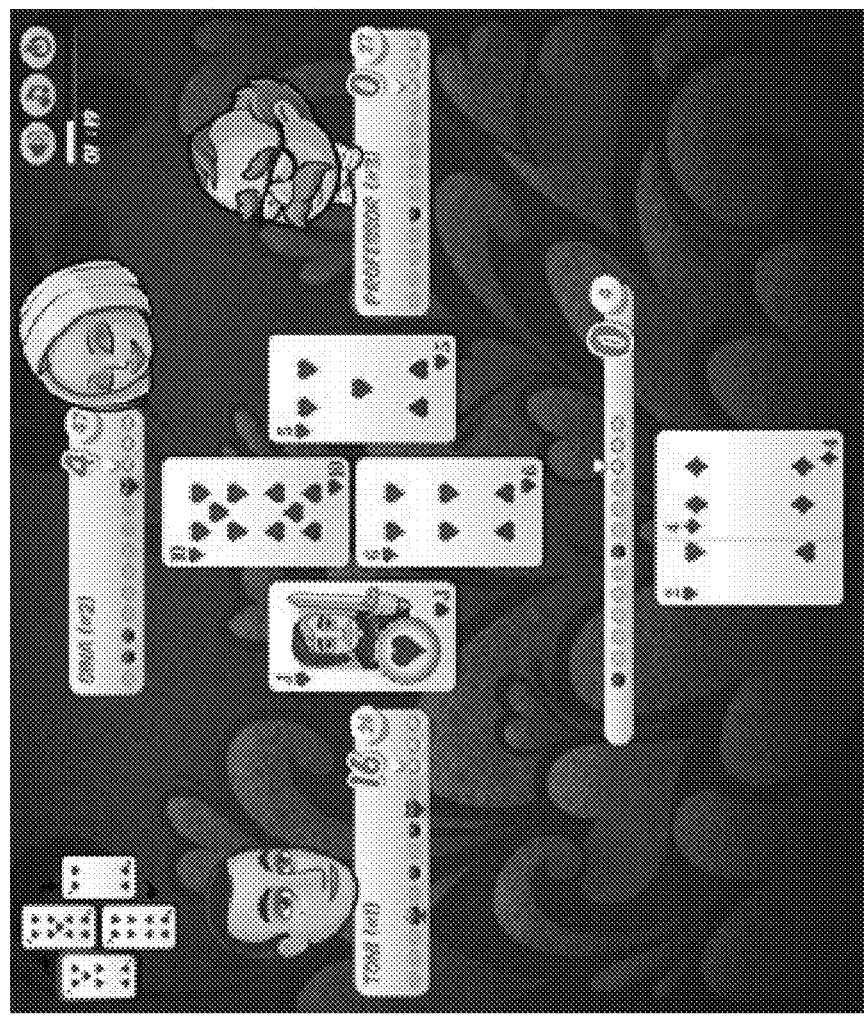
FIG. 41—An on-going game of Hearts. The leftmost player will take the current trick since Jack is higher than the other three cards.

FIG. 41 shows an on-going game of Hearts. In some implementations, the previous trick is shown during the play of a game, which is done in the top left corner in the figure.

In some implementations, each player will have an indicator for each of the 13 rounds in the game. These indicators can then be modified depending on the outcomes in the different rounds, for instance a spade can indicate which player received the Queen of Spades in which round. In FIG. 41, it can be seen that the leftmost player Toni took the trick with the Queen of Spades in round 4, because his round 4 is denoted by a spade symbol.

Game Scoring

The player's score will be presented at the end of a game, and is based on the following structure:

Points avoided: 5300−(100*penalty point the player collected) but never less than 0.

Score bonus: If the player's penalty points are lower than the losing opponent's penalty points the player get 200* (loser penalty points−The player's penalty points)

Time bonus: 1000*(% of time left)

Zero bonus: 2000 extra points are given for completing a round with 0 penalty points.

Shooting the Moon: 10000 points extra are awarded if the player achieves this feat.

Shooting the Sun: 15000 points extra are awarded if the player achieve this feat.

Figure 42:
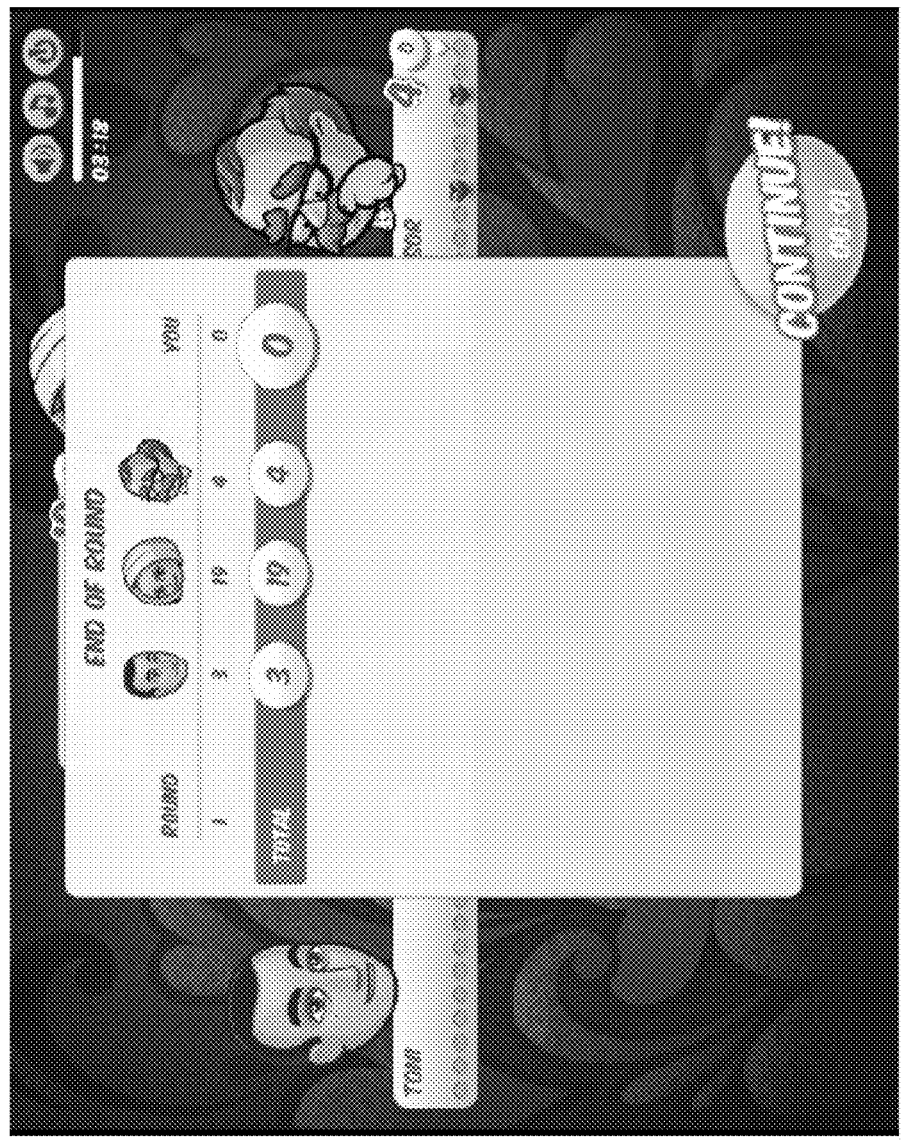
FIG. 42—Showing score after one round in the game.
Figure 43:
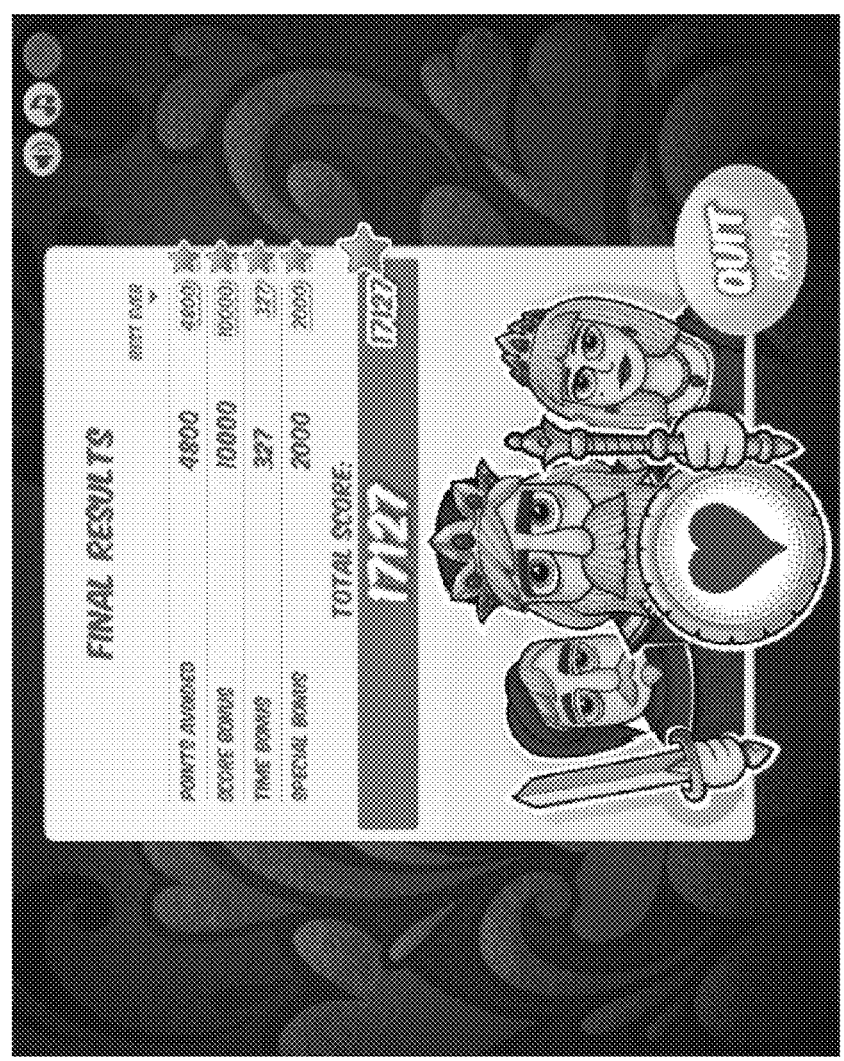
FIG. 43—Showing the score after a completed game.

In a typical implementation, the player is shown the score of a round after the round is finished. This is shown in FIG. 42. After completing a game, the player will also be presented with the total results of the game. This is shown in FIG. 43.

King of Spades

In King of Spades the player plays a classic game of Spades with 3 computer opponents. The player play as a pair with the player sitting opposite and the goal is to collect as many points as possible. The game is played over 3 rounds, and the team with the highest score wins.

The game plays according to classic Spades rules. Spades is a trick-taking game where the all Spades are trumps. At the start of each round each player bids how many tricks he plans to win. If a team manages to win as many tricks as they bid together they get points based on the amounts of tricks bid, but if they fail to reach the bid number they get a score penalty. But winning too many tricks gives the player 'bags' which can give an additional penalty if the player gets too many.

Game Rules

King of Spades is based on the classic trick-taking card game Spades. The player plays with 3 computer opponents and will be teamed up with the player sitting opposite to the player. Each player plays 1 card at a time. All 4 played cards form a trick. The player has to follow suit, which is defined by the first card played in each trick, if the player can. If the player lacks a card of the right suit the player may play any card. The highest card in the first suit played in each hand wins the trick, unless a trump is played as then the highest trump played wins. Spades are trumps, but may not be played at the outset of a trick unless the suit has been broken first. This means that first someone has to play a Spades when the trick was opened with a different suit. After that Spades may be played as the first card in a trick.

At the start of each round the player has to make a bid between 0 and 13 for how many tricks he or she aims to take. The goal is to take at least as many as the bid so the player has to look at the cards he has received and judge how many he can take, and also factor in what the computer opponents have bid so far. The total bid of the two teammates may never be higher than 13.

The important task is for the team to achieve its bid. So even if the player do not manage to take as many tricks as the player bid, the player's computer team mate may make it up by taking an extra trick. This happens automatically and the player will see a green marker for when a teammate helps with winning a trick. If the team makes its bid they will get 10 points for each trick they bid, and 1 point for each additional trick they got. Although if the team fails to reach the total bid they will get a penalty of −10 points for each trick bid, regardless how close they came to making the bid.

For each additional trick the team takes that is higher than the total bid they are given a 'bag'. Accumulating a total of 10 bags in the team will give the team a −100 point penalty. So make sure the player try to bid accurately.

If a player bids zero, or 'Nil' as it is called, he may not take any trick—even to help a team mate during the round. If successful with a Nil bid the team gets an additional 100 bonus points for the Nil bid apart from what the team mate's bid score would give if they succeed in the total bid. If a Nil bid fails the team gets a −100 point penalty though. The game ends after a total of 3 rounds have been played, or time runs out.

Game Controls

When the bid control appears at the start of each round the player first click the bid the player want to make, and then press the 'Place Bid' button.

The player click on the card the player wish to play. The game will automatically grey out cards that cannot be played because they are of the wrong suit or similar.

If the player wishes to end the game prematurely, the button End Game can be pressed.

Visual Indicators

The game described herein can be implemented with various indicators that help the player keep track of things.

Figure 44:
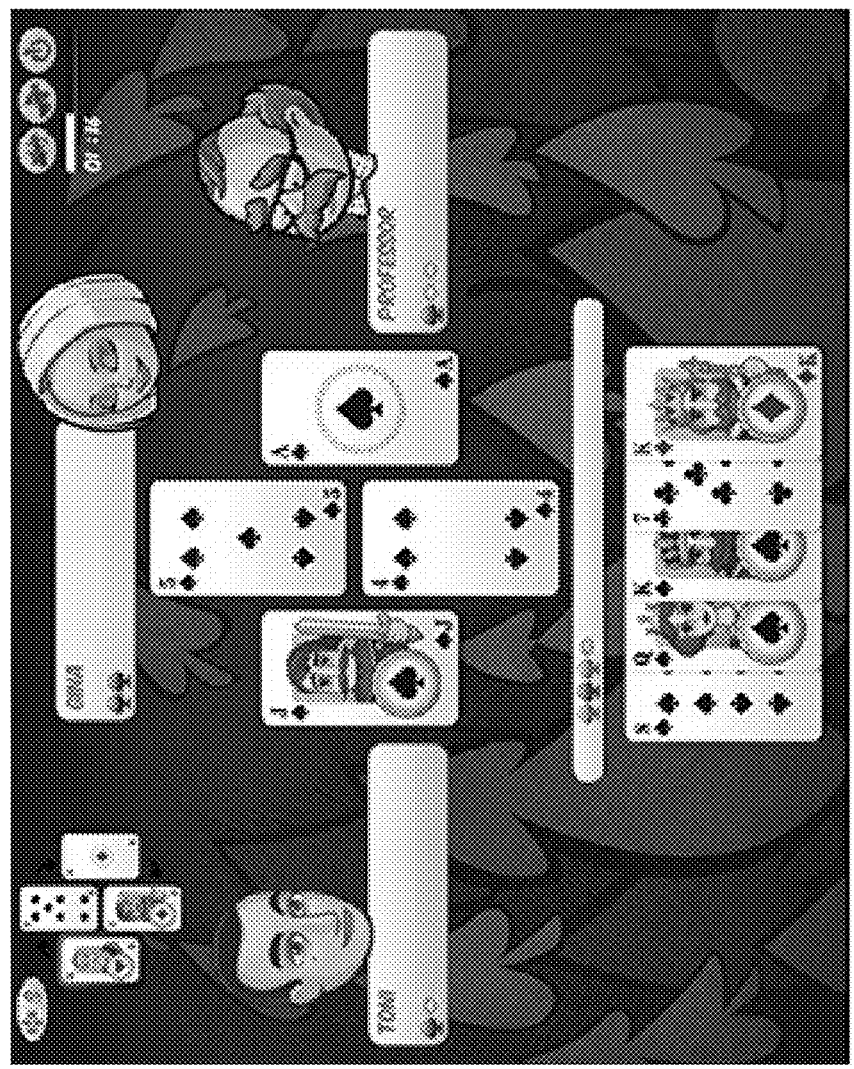
FIG. 44—An on-going game of Spades. The rightmost player will take the current trick since Ace is higher than the other three cards played.

FIG. 44 shows an on-going game of Hearts. In some implementations, the previous trick is shown during the play of a game, which is done in the top left corner in the figure.

In some implementations, each player will have an indicator for the amount of tricks they bid for. These indicators can then be modified depending on the outcomes in the different rounds, for instance a spade can indicate which player won each trick. In FIG. 44, it can be seen that the player has bid to take four tricks, and has currently won three.

Game Scoring

The player's score will typically be presented after the game has been finished, and is based on the following structure:

Base score: 10,000 score
Points score: Spades points achieved by the player's team*10 is added, which can be a negative number as well.
Difference score: (The player's team points−Opponent team points)*20.
Time bonus: 1000*(% of time left) score.
Nil bonus: 1000 extra score.

Figure 45:
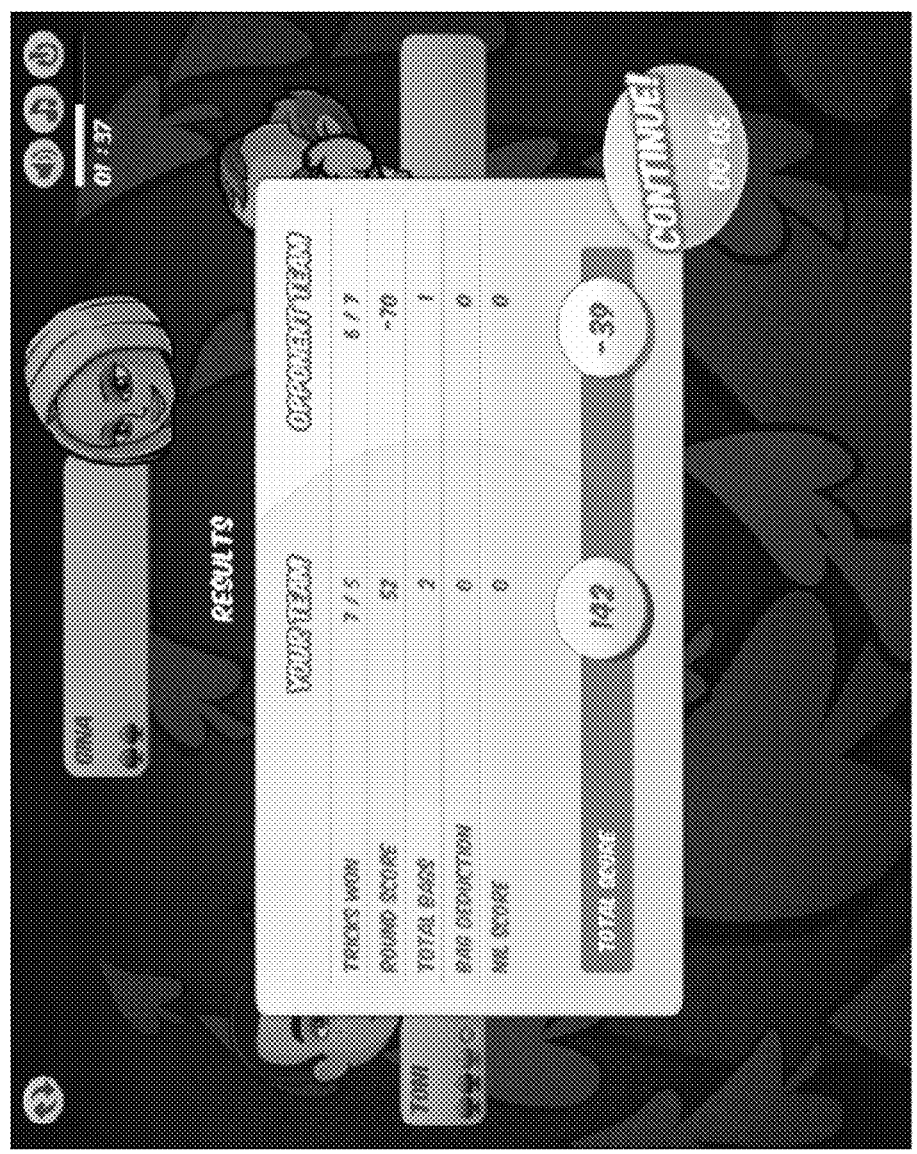
FIG. 45—Showing score after one round in the game.
Figure 46:
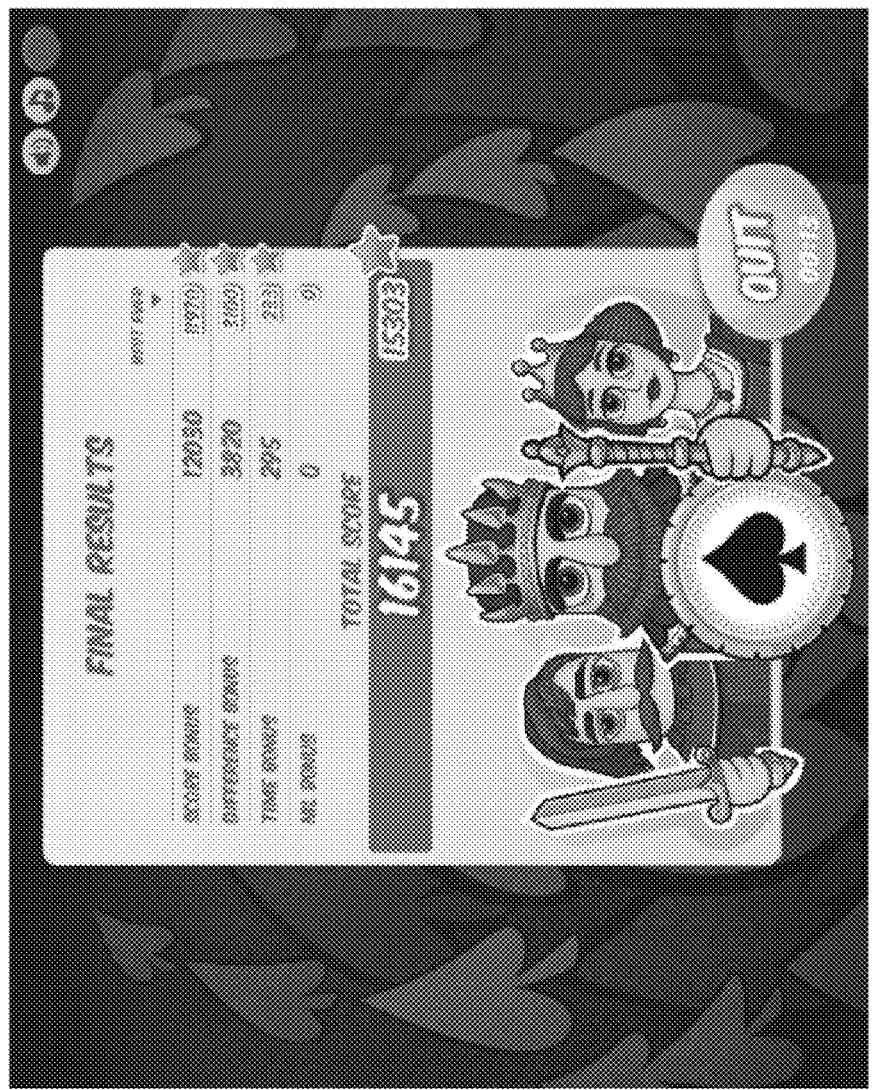
FIG. 46—Showing score after a completed game.

In a typical implementation, the player is shown the score of a round after the round is finished. This is shown in FIG. 45. After completing a game, the player will also be presented with the total results of the game. This is shown in FIG. 46.

Word Game

Another implementation utilizing the inventions described is presented below.

The system and methods herein relate to games that can be played online and some embodiments can be played on platforms where the game is integrated in to a social network and in some implementations the game may be a standalone game that is played by one player.

The game is a word puzzle game where the goal is to compose the 3 best scoring words on a game board of 25 letter tiles placed as a square of 5 by 5 letter tiles. There is limited time to spell the words and as the words are submitted, the player will progress to the next round and get a new tile lay-up. In some implementations, the number of words required per level and the amount of tiles on the game board can vary.

There is in a typical implementation only 5 minutes in total to play a total of five rounds. Therefore it is important not to waste too much time in each round. If the player spells a long word in each of the 5 rounds, it is possible to qualify for a bonus round and get a chance to increase the score further.

Game Rules

When the game starts the game board is filled with letter tiles. Any letters that are touching each other can be combined into a word. Each letter can only be used once per word and also once per round, so choosing the right combination of words is the aim of the game.

The player should aim to find three words per round. Fewer words may be submitted if the player cannot find sufficient words, and it is possible to change the words up until the words are finally submitted for each round.

A word has to be a certain amount of tiles long to be submitted, for instance 3-10. The letter tiles typically have different values depending on how common they are in the dictionary. Also, longer words are worth relatively more points than shorter words.

In a typical implementation, the player can create words that are in any form, singular or plural, present or past tense etc. This makes it strategically important to look for the possibilities of creating a longer word with touching letter tiles by using a different form. Combinations of several extensive dictionaries may be used to determine whether or not a word is accepted. No abbreviations or names are accepted. If a word is input that is not found in a dictionary, it will not give any points to the player but neither will it cause the player to lose points.

Score estimates for the words can be seen as they are spelled out, but the player will not know whether they are accepted by the dictionaries until all words in a round have been submitted.

Bonus Tiles and Bonus Round

Figure 48:
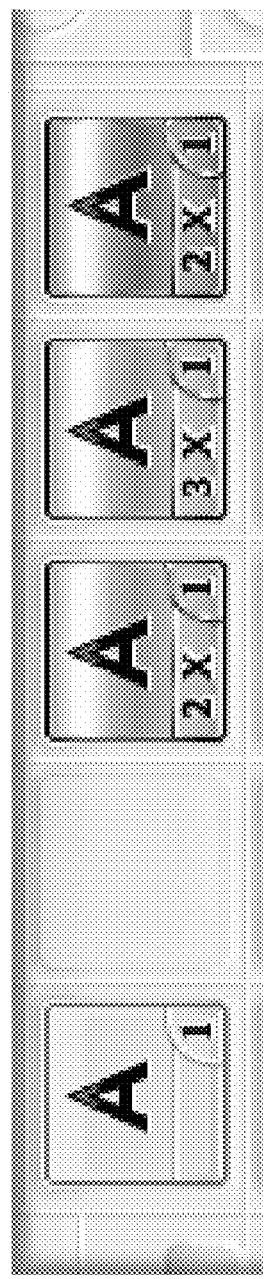
FIG. 48—Bonus tiles. Silver ones affect the score of a tile, gold ones affect the score of the whole word.

In a typical implementation, there are 3 types of bonus tiles which are all shown in FIG. 48:

2×Letter: This doubles the Letter score of the tile.
3×Letter: This triples the Letter score of the tile.
2×Word: This doubles the value of the whole word in the same manner, including any letter that have already been doubled by a Silver Bonus Tile.

Bonus tiles can be earned by submitting long words that are approved by the dictionaries. In order to receive a 2× Word bonus tile the player needs to submit words that are at least 6 tiles long.

On the left side of the game board the current round is displayed. As each round is completed, the player will see whether he or she qualified for the Bonus round. This is typically indicated by the portion corresponding to that round being shown in a positive colour such as green.

In order to play the Bonus round this the player will have had to submit at least one approved word of 5 tiles or more, or three words with 4 tiles in each of the 5 rounds. If these criteria are not fulfilled in each of the 5 rounds, the player will not get to play the Bonus round.

In the 6th bonus round the number of Silver and Golden bonus tiles will be higher than in the regular rounds, so reaching it will allow the player to achieve a better score.

When time runs out the game is over, and the final score will be shown to the player on the result page. It is also possible to end the game prematurely by using the End Game button.

In some implementations, there is a bonus tile called a 'hot tile'. This tile will triple the value of the whole word it is used in, but if it is not used, the player will receive half the value of the lowest valued word in the round.

Game Controls

In every round the player can input up to three words. The letter tiles the player wishes to link into a word are connected by clicking on them, for instance with the left mouse button if the game is being played on a computer. It can also be possible for the player to click on the first letter of an intended word and then hold the mouse button and drag the pointer over the subsequent letters of the intended word.

The letter tiles have to be touching each other to be able to be combined. When a word has been completed, the player can lock the word and move on to forming the next one. In a typical implementation, this is performed by clicking an additional time on the last letter tile. Alternatively the player may click on the next word field to the right to activate the next word. A word that has not yet been locked is pink in colour, which changes to blue when the player locks the word.

A tile may only be used once in a round, so when a tile is already used in one word it cannot be used again in another one. For instance, the letters used for the words 'mine' and 'lies' in FIG. 49 cannot be used when forming the third word starting with 'na'.

Figure 49:
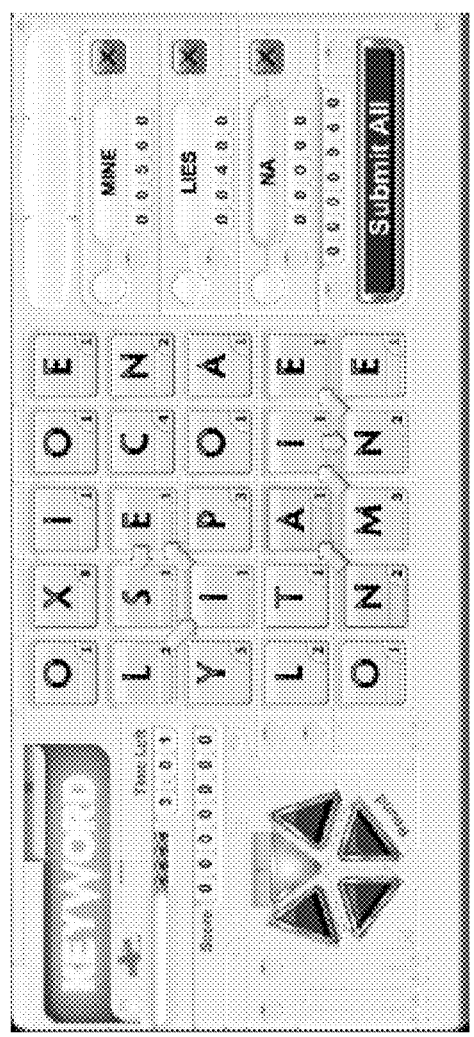
FIG. 49—A game in progress.

To quickly re-spell a word that has already been locked, the player can click on any letter tile in that word to reactivate it—the letter tiles will again become pink. It is also possible to use the x-buttons next to each of the three word fields to quickly delete a word completely. These x-buttons are shown in FIG. 49.

If the player wishes to unmark a tile, this is done by going back and clicking on any tile used earlier in the word to back up to that specific point. It is possible to unmark a whole chain of letters at once by clicking on another part of the game field.

Figure 47:
FIG. 47—A typical implementation of the game board.

To submit words and go to the next round, the player can click on the Submit All button on the right side below the words, as shown in FIG. 47. After this it will be shown if the words were approved by the dictionaries and the final scores for the round are received. The player does not have to find three words to move on to the next round, rather it is possible at any time to move to the next round if no more words can be found. If the player wants to end the game prematurely, the 'End Game' button can be used, which is typically located in the bottom right corner as shown in FIG. 47.

Game Scoring

The word scores are based on several factors, mainly the value of the letter tiles that are linked and how many tiles that are used to form the word. This means that long words with more difficult letters are more valuable.

In a typical implementation, the word score is calculated as follows:

Word score=(Sum of letter tile values including Letter bonuses)*(No. of tiles used squared) *5*Word Bonus Letter Scores In a typical implementation in the English language, the scores for each letter is as follows:

1 point: A, E, I, O, R, S, T,
2 points: D, G, L, N, U
3 points: B, M, P
4 points: C, F, H
5 points: K, V, W, Y
7 points: QU (counted as one letter tile)
8 points: J, X
10 points: Z The player does not get any point deduction for a word that is not approved by the word list.

It is possible to receive bonus score based on time if a round is completed faster than in 60 seconds. The Time bonus is typically calculated as (120−Seconds used)*2, and if more than 60 seconds is used then no Time bonus is received for that round.

At the end of a game, the player is shown detailed statistics about the words used and the scores received. These statistics may for instance include bonus tiles used, time bonus received and the total amount of submitted words. An example of an implementation of the detailed statistics is shown in FIG. 50.

Strategy for Playing the Game

Spelling longer words significantly raises the score as well as brings the Golden bonus tiles into play. So when spelling a word, the player should check nearby letter tiles to see if you can make it longer by using a different form. However, speed is also important in order to have time left on the bonus round in case it is reached, so it is also important to not think too long.

Getting to the Bonus round is valuable, so the player should make sure to qualify in each of the rounds.

A long word is worth much more than several short words, which is important to keep in mind when prioritizing.

Liquid Mechanic Game

Another implementation utilizing the inventions described is presented below.

The system and methods herein relate to games that can be played online and some embodiments can be played on platforms where the game is integrated in to a social network and in some implementations the game may be a standalone game that is played by one player.

The game may be implemented as a game with different types of game elements that can be understood to behave like viscous fluids such as ice cream. The game elements can be identified as different types which can be exemplified with different ice cream flavours. Also other implementations where the game elements for other objects and take other shapes may be devised using the methods and systems described herein.

Game Goals

The game described herein is a new type of puzzle game. The story in one implementation of this game is that the player is selling ice cream, and children are lining up for their ice cream cones. The objective of the game is to clear away as big groups of ice cream as possible to score higher and also clear a certain number of different game elements. The player has limited time and limited moves to complete the task, in some implementations only the time is limited or only the number of available moves are limited.

The player makes moves by clicking on groups of game elements that are cleared from the game board if they form a large enough group of game elements. The groups can be formed by two or more game elements to be removed from the game board.

After each move, more ice cream game elements are added to the game board 'bowl', and it can be seen before each move which sort of game elements that will be added after the next move and also from where they will fall in to the game board. An exemplary implementation can be seen in FIG. 51, where there are six cups filled with ice cream in the top of the bowl, all which will fall down after the player makes a move. Each cup can contain one or several 'portions' of ice cream. A portion of ice cream is a game element.

The points awarded for removing ice cream can be any combination of linear, cubic or exponential. When all requirements have been met, i.e. when the player has removed the ice cream required of each sort, the bowl is no longer filled with more ice cream. The player will be rewarded if he game is ended with a clean bowl. The player can in some implementations collect more game elements than the target number of game elements and in some elements be rewarded for collecting over the target number.

Game Rules

Figure 51:
FIG. 51—Showing a typical implementation of the game board.
Figure 52:
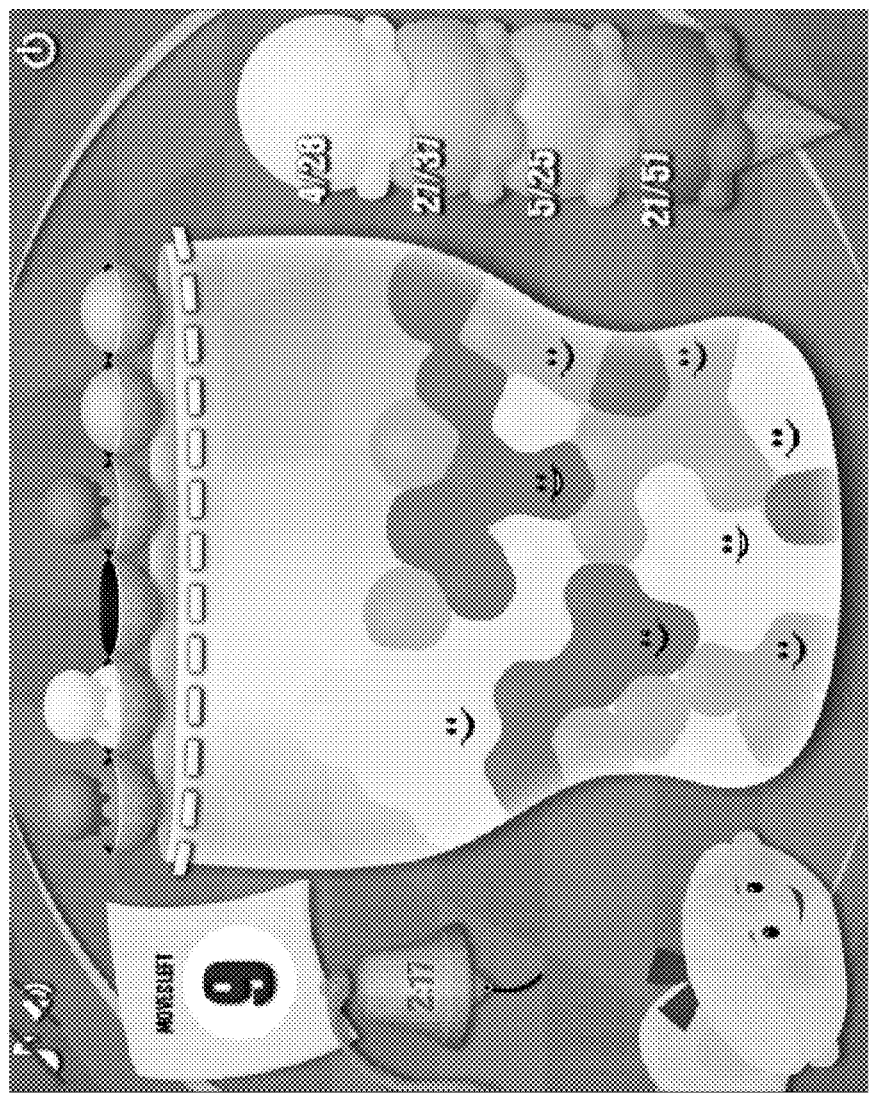
FIG. 52—A game in progress. Three of the cups on top have double portions of ice cream about to fall down after the player's next move.
Figure 53:
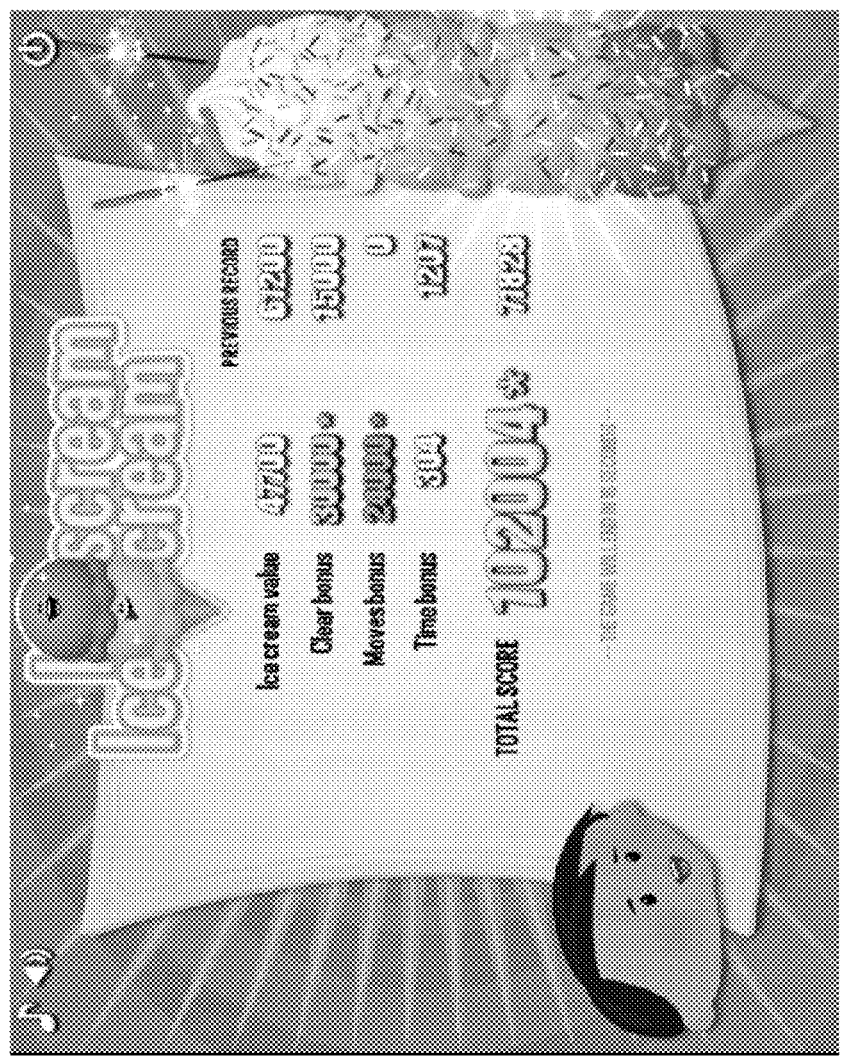
FIG. 53—End game screen showing the player's score. Clear bonus and moves bonus are awarded because all ice cream was removed from the bowl.
Figure 54:
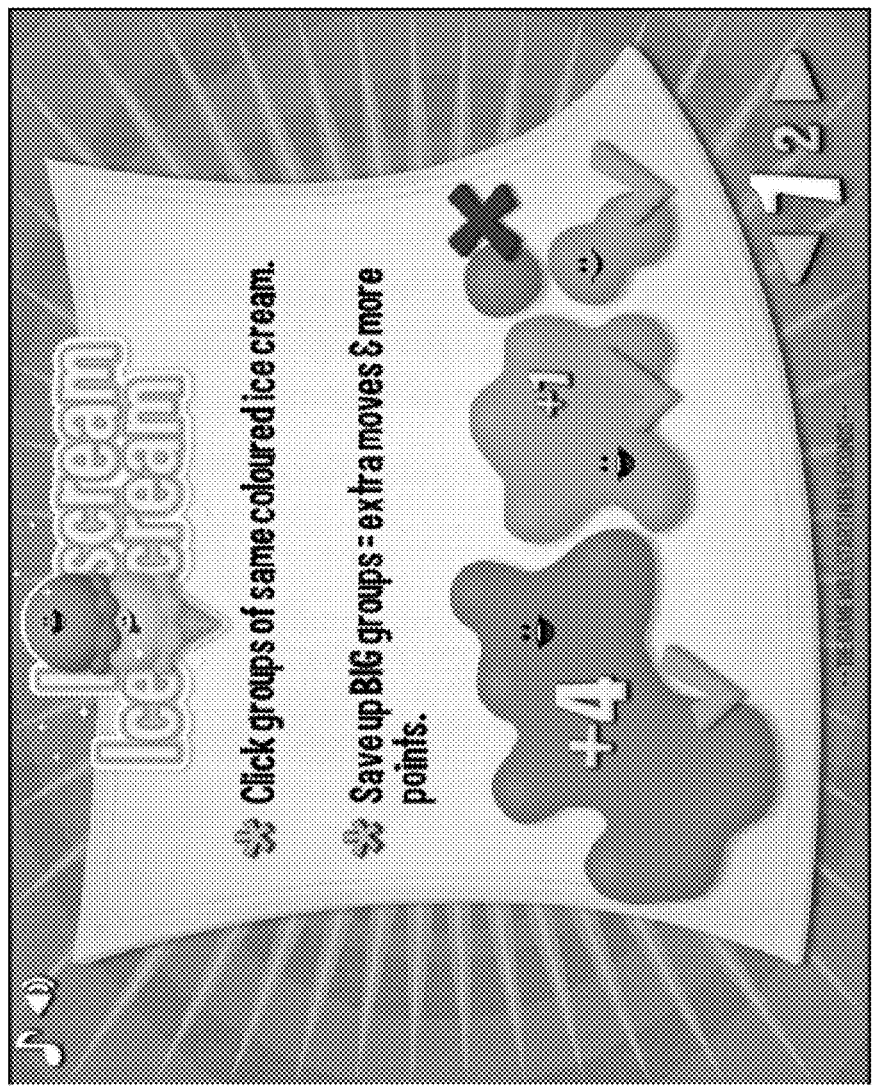
FIG. 54—Playing instructions.

The game is mainly based around two different parts. When the game starts the player is met by a bowl of ice cream. In a typical implementation, there may be four different sorts of ice cream, differentiated by colours or pattern, present on the game board. On the right hand side you see the ice cream cone which the child wants you to make. All this is shown in FIG. 51.

The ice cream cone consists of a number of different 'flavours' that are to be collected through removing game elements from the game board. Next to each flavour there is a target amount for each one. The player's goal is to scoop up at least as much as the targets for each flavour. Ice cream is cleared by clicking the ice cream inside of the bowl. It is only possible to click, i.e. remove, groups of ice cream that are big enough. In a typical implementation, big enough groups are indicated by that they have a mouth and eyes. The size of the group of game elements can vary in different implementations.

In some implementations the player may be required to collect the game elements in order as well as meet the number of game elements as required.

The player has a limited amount of moves when the game starts, for instance 15. When the player clicks a scoop of ice cream the moves left will be reduced by one. How many moves that are left can be seen on the meter at the left hand side of the bowl.

Extra moves will be rewarded to the player if the amount of ice cream removed with one click is large enough. It can be seen when a group of ice cream is big enough to give extra moves, and in a typical implementation a large enough portion has a big smile on its lips. It is important for the player to earn extra moves or else it will be very hard to meet the target goals.

The number of extra moves earned depends on the number of scoops in the removed group, and in one implementation the amount of extra moves rewarded is as follows:
A group with 9 scoops will give you one extra move.
A group with 12 scoops will give you two extra moves.
A group of 15 scoops will give you three extra moves and so on.

The size of the group of game elements can be identified or signalled to the player through different symbols on the game board. In one implementation it can be a happy face that is happier the larger the group of game elements is.

The game will end if the ice cream in the bowl overflows. A counter will start when there is ice cream above the dotted line at the top of the bowl shown in FIG. 51. When the counter starts the player has 5 seconds to remove enough so that no ice cream is above the line.

When all flavour targets have reached their amount the refilling of ice cream is stopped. Now the player should try to empty all ice cream from the bowl to successfully complete the level. In some levels the level is completed if the player has reached the target score and other requirement on the level such as collecting game elements. If all ice cream is removed, the player will in a typical implementation receive bonus points for remaining moves and time.

The game will end if one of the following things occurs:
the timer reaches zero.
the overflow countdown reaches zero.

When all the flavours have reached their targets, the game can end if there are no more available moves.

The player may complete the level upon end of the level depending on if the target for the level has been reached.

Game Scoring

You get points for removing groups of ice cream. Score for the groups depends on their size. A typical implementation has the following scoring structure:
2 scoop group=100 p
3 scoop group=200 p
4 scoop group=400 p
then +100 for each new scoop At the end of the game the player gets 100 points for each scoop of ice cream removed. If the player manages to completely remove a flavour from the bowl at the end of the game, 5000 bonus points will be awarded per removed flavour, and a bonus of 10000 points will be awarded if all flavours are removed. Also, if all the flavour targets are reached, the player will also get bonus points for time remaining. Time bonus=2000×(time left/total time).

Physics

The game is reliant on the underlying physics of the elements on the game board. The ice cream is the primary element, and in a typical implementation it is acting like a relatively viscous fluid. In order to make players feel more familiar with the movements of the game elements, it is important that they are implemented in a natural way that is similar to how real world equivalents would act.

The game elements of the same type that are adjacent will be grouped together in one group. In some implementations this can be shown as that the game elements form part of one mass. The individual game elements can still be visible or distinguishable as being part of the larger mass. The mass of game elements can in some implementations move around on the game board to fill out the space in the lower end of the game board in the way a fluid would fill out the space in a container. The masses/groups of game elements can be distinguishable from each other and the elements will only group together with elements of the same type.

When the player hovers over a portion of ice cream in the bowl, the whole group of ice cream game elements light up slightly so that it is easier for the player to discern what will be removed.

A typical implementation of the game can be seen in FIG. 51, FIG. 52, FIG. 53 and FIG. 54.

Strategy Playing the Game

The following describes the strategy to play the game and to earn high score in the game in one implementation.

It is very important to earn extra moves! So try to save up on one flavour in order to create a big group of that flavour. If it's big enough you will earn extra moves.

Try to get as many scoops above the flavour targets as possible. One way of doing this is to save one final flavour when the three other have reach their targets. Try to make a group of the final flavour as big as possible before you click it.

When you are cleaning the bowl at the end of the game make sure that you don't forget a single scoop of a flavour somewhere. So make sure to plan ahead when removing the remaining scoops from the bowl. You will need the points you get for completely emptying the bowl.

The golden rule is to SAVE UP!

Save up a big group of a flavour to earn extra moves. Remember that ice cream that gives extra moves has a big smile! Save up on the last flavour before it reaches its target. Try to make it as big as possible When you are saving up to make a big group of a flavour don't be afraid if the overflow warning starts. Just make sure the counter doesn't reach zero before you have removed your big group.

Planning is valuable. Try to see what flavours will be refilled after the next move.

As shown one strategy for playing the game can be to allow the groups of game elements to form larger groups before removing those to achieve a higher score.

Solitaire Game

Another implementation utilizing the inventions described is presented below.

Figure 55:
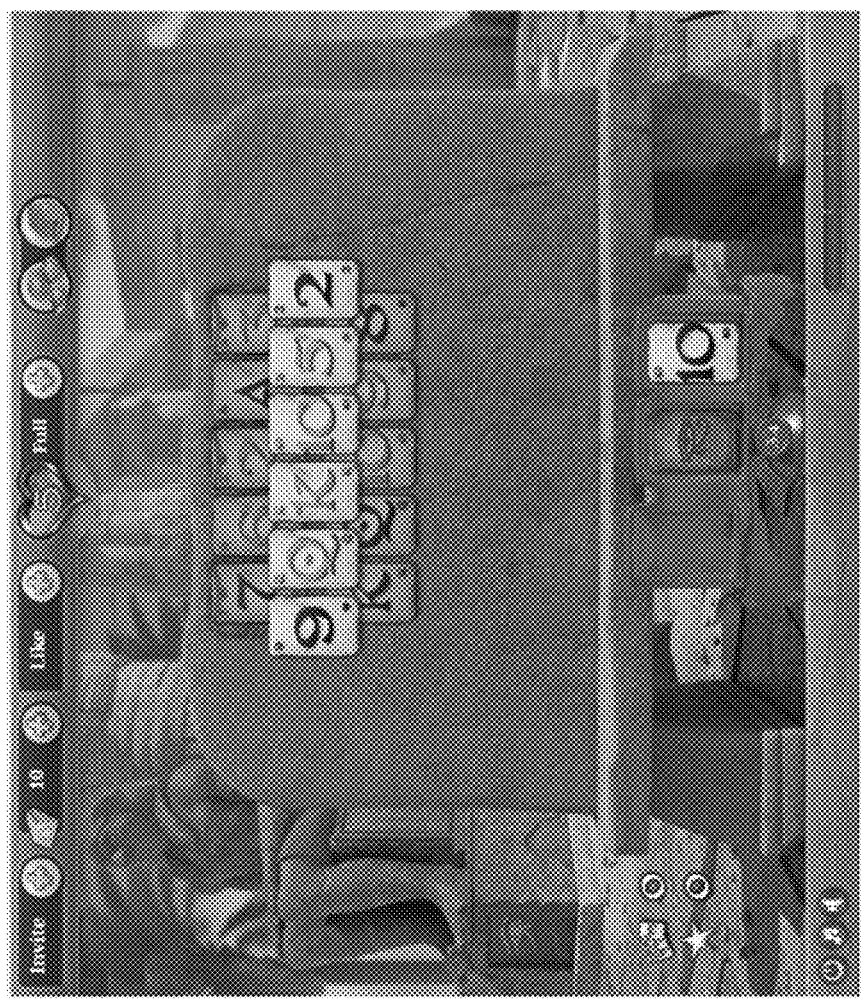
FIG. 55—Example of a Pyramid Solitaire level.

The system and method in herein relate to a card game, which is to an extent embodied by the game Pyramid Solitaire Saga. Pyramid Solitaire Saga is a virtual card game that resembles a classic form of Solitaire called Pyramid, but with different rules and card layouts that differ from the pyramid-shape. Other aspects have also been added and adjusted from the classical game to enhance the gameplay and utilize the social network connections and the computer. A typical implementation can be seen in FIG. 55.

Instructions:

Clear as many pyramids as possible by removing the cards one by one before you run through your deck of cards or out of time.

To clear away cards from the pyramid they have to be one value higher or lower than the open card of the pile. So on a 4 you can place either a 3 or a 5, and so on. The player can click on the face-down portion of the pile to flip over a new card.

You move cards from the pyramid by clicking on them with your left mouse button. If a card is free to move it will get highlighted when you move your mouse over it.

Additional Rules

In addition to the basic rules, there are some other ones that further add to the complexity of the game:

- Cards with a gold edge are hiding scarabs underneath them. The goal of the game is to remove these gold cards from the playing field.
- Cards can only be removed from the board if they are not covered by other cards.
- In some levels, the player has a joker-card that can be used as any other card, meaning that any card can be removed from the playing field and put on top of the joker card.
- At the end of the level, players get bonus points for the maximum number of moves in a row without using the deck as well as for the cards remaining in the deck and the cards remaining on the playing field.
- When removing gold-edged cards, scarabs emerge. Some of them start moving around after being released, and can be clicked on by the player in order to receive a reward. In some implementations, the regular cards cannot be clicked during the time a scarab moves around, in order to prevent the player from making unintended moves when trying to click a scarab.

Game Modes

The game has several different game modes. Different levels may have different game modes, and in some implementations it is possible to play random levels of a selected game mode. All game modes can be unlocked from the start or they can require certain criteria to be fulfilled before they are unlocked. In a typical implementations more game modes are unlocked as the player progresses through the game.

Achieve a Certain Target Score

In this mode, the player is supposed to get a certain amount of points with a limited amount of cards in the deck. Points can be gained by:

Removing cards

Removing multiple cards in a row

Having cards left in the deck when finishing

Having cards left on the board while finishing

Figure 56:
FIG. 56—Pre-level screen of a level with a target score.

In FIG. 56 a typical pre-level screen is shown.

Achieve a Certain Streak

Figure 57:
FIG. 57—Pre-level screen of a level with a target streak.

In this mode, the player is supposed to remove a certain amount of cards in a row, without using the deck in between. The joker card can be used without breaking a combo. After the combo has been achieved, the player still has to remove the remaining cards from the playing field before the level is finished. In some implementations, the player also has to achieve a certain minimum score in this mode. An exemplary implementation can be seen in FIG. 57.

Finish with a Certain Amount of Cards Left in the Deck

Figure 58:
FIG. 58—Pre-level screen of a level where the player needs to have a certain amount of cards left in the deck.

In this mode, the player is supposed to finish the game by removing all cards from the playing field, and still have unused cards left in the deck. In some implementations, the player also has to achieve a certain minimum score in this mode. An exemplary implementation can be seen in FIG. 58.

Finish the Level within a Certain Time-Frame

Figure 59:
FIG. 59—Pre-level screen of a level where the player needs to finish the level within a certain time frame.

In this mode, the player has to finish the level within a certain time frame. In some implementations, the player also has to achieve a certain minimum score in this mode. An exemplary implementation can be seen in FIG. 59.

Speed and Eternal Game Modes

Both of these game modes have the same principle—an continuous layup of cards, meaning that there is no 'last card' to be removed. The goal can be to achieve as high a score as possible, or in some implementations to get a high combination or to remove as many rows or lines as possible.

The Speed mode has a time limit to it. This time limit can in some implementations be subject to change depending on actions performed by the player. For instance, the player can get an extra five seconds for removing five cards in a row, enabling the possibility to keep playing for longer than the initial time limit.

The Eternal mode is a continuous layup without a time limit. The only thing that can stop the player from continuing in this mode is a blocker of some kind.

Other Task-based Levels

There can be variations on the tasks required to finish a level, other than the examples mentioned previously. These variations include but are not limited to:

Clear 10 cards in a sequence without using a joker in the sequence

Clear 2 sequences of 5 or more

Clear 2 scarabs in 1 sequence

Clear layup with 5 cards left on table

Clear layup without using a joker

Blockers and Obstacles

Face Down Cards

Figure 60:
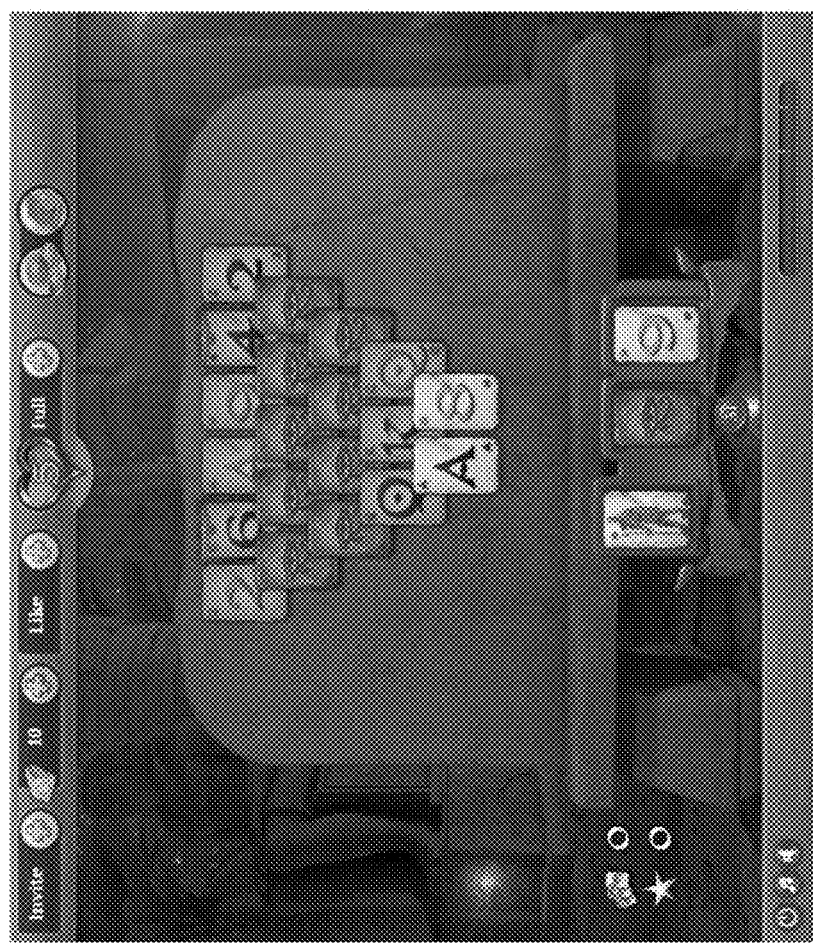
FIG. 60—Showing face-down cards.

Cards can be turned face down, meaning that the player does not see which card it is. Cards can be turned faced down as long as they are covered by other cards, but when there are no more cards covering them they are turned face up. The figure below show face down cards, the four ones in the third row will in a typical implementation be turned face up after the two queens and the king that cover them are removed. An exemplary implementation can be seen in FIG. 60.

Locked Cards with Key

Cards can have a lock on them, meaning that they cannot be picked until the lock has been removed. Locks are removed by finding a corresponding key, the key is typically located on a certain card in the layup.

Locked Cards Requiring Removal of a Certain Card

Cards can also have locks that do not require the use of keys, but instead require the player to remove one or several of a specific card type. For example, a card with an 'Ace-lock' on it will not be pickable until at least one ace has been removed from the layup.

Bomb Cards

Figure 61:
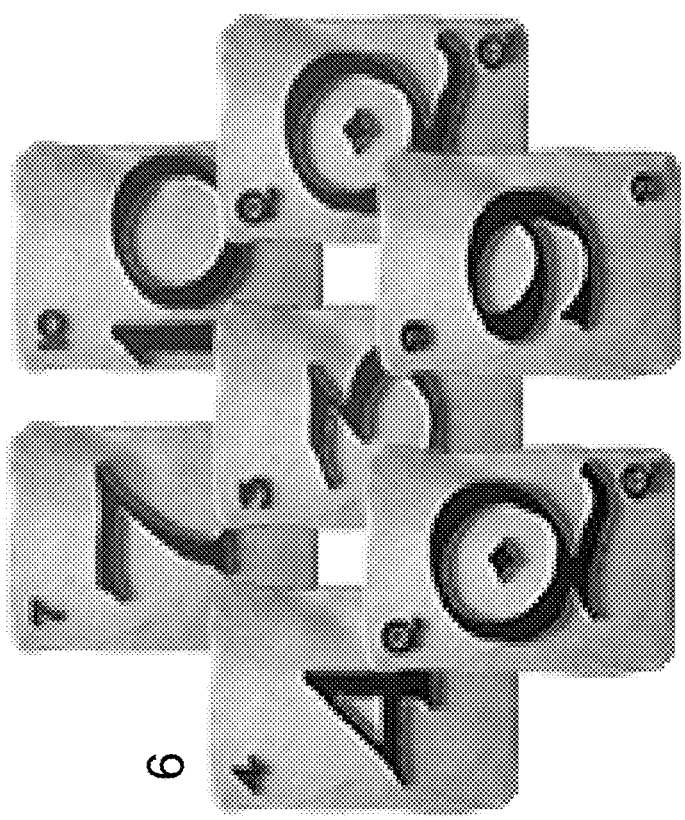
FIG. 61—A Bomb card counting down.

Bomb cards are distinguished by a timer next to them. This time will count down from a number (e.g. ten) to zero, and if it has not been removed before it reaches zero the player loses the game. In some implementations the countdown is dependent on the number of moves the player makes, in other implementations the countdown can be based on time. The figure below shows a Bomb card, indicated by being red in colour, with a countdown showing when it is about to cause the player to lose the level. These cards can both be designed to have a certain placement in a level, or they can be placed randomly. An exemplary implementation of a bomb card can be seen in FIG. 61 where the 4 in the picture is the Bomb card.

Scarabs Turning Cards Face Down

As mentioned, scarabs that are released when gold cards are removed can sometimes move around in random patterns, and the player can click on them to gain bonuses. In some implementations certain scarabs can have negative effects, such as turning cards face down when they pass over them.

Chain Cards

Chain cards only removable as a latter part of an extended sequence. These cards are not clickable until the player has made a long enough sequence, and can only be removed as a part of that sequence. This means that if the player breaks a sequence, a card that was removable can become un-removable again, until the player once again achieves the required number of removed cards in a row.

Timed Cards

Timed cards are slightly different from bomb cards. They have the same characteristics in that the player loses the game when they count down to zero, but it is up to the player to decide when to trigger them. Timed cards have a number that shows what the countdown will start from.

When removing a timed card, a count down begins and the level has to be completed before the countdown reaches zero. In some implementations the countdown is dependent on the number of moves a player makes, in other implementations it is dependent on time. This means that the player has to decide when to remove a timed card, which should preferably be done when the player feels like the level can be completed within the amount of time or moves indicated by the timed card.

Mummy Cards

Figure 62:
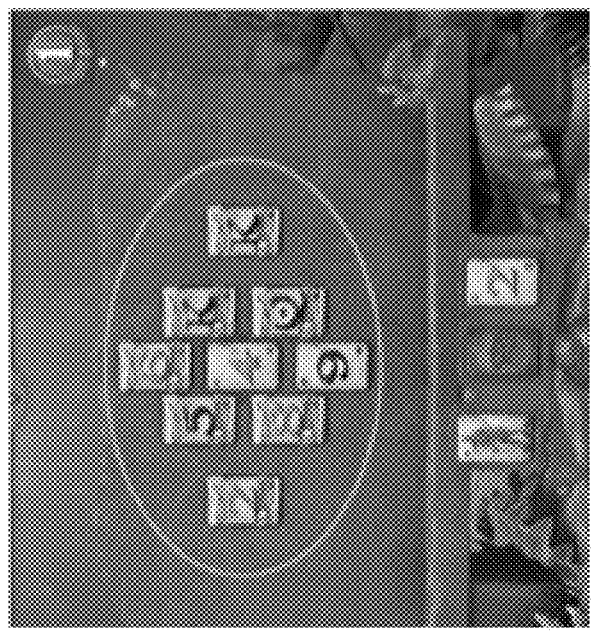
FIG. 62—One implementation of Mummy Cards.

These cards are covered in bandage. After matching a Mummy card for the first time, the bandage is removed but the card is not. After removing the bandage, the card acts as a regular card. This means that the player has to pick each Mummy card twice before it gets removed. FIG. 62 illustrates several cards covered by bandage.

Colour Locks

Figure 63:
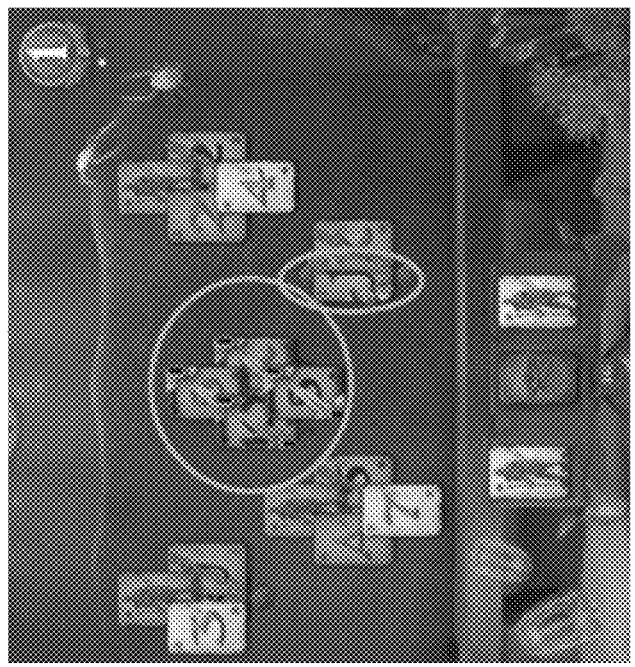
FIG. 63—One implementation of colour locks.

Colour locks make it so that cards are not pickable until the lock is removed. The player has to find a coloured key that corresponds to a lock in order to unlock it. The figure below illustrates a yellow key that can be found on the Jack, which needs to be used in order to unlock some of the locked cards in the middle. An exemplary implementation can be seen in FIG. 63.

Jungle Cards

Figure 64:
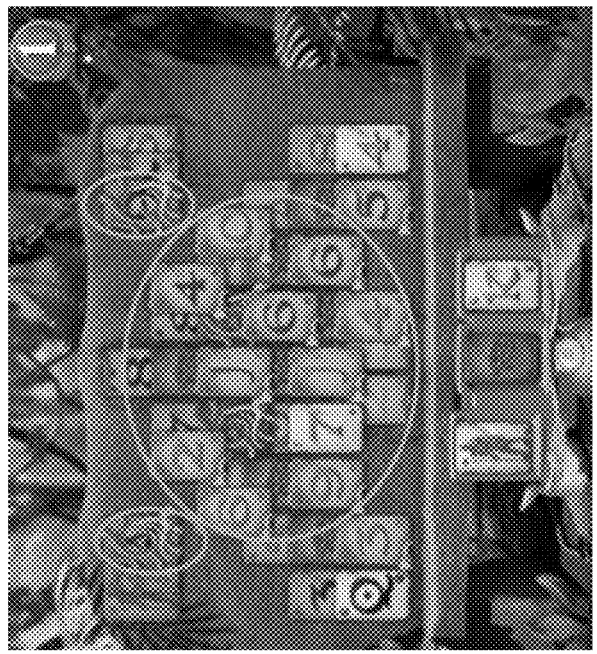
FIG. 64—One implementation of Jungle cards.

Jungle cards are a kind of blocker that is a combination between green coloured cards (multiple ones or a single one) and at least one tangled card. The tangled card cannot be picked until all of the green cards have been removed. The figure below illustrates a layup with multiple green cards and two tangled cards. An exemplary implementation can be seen in FIG. 64.

Leaf Cards

Cards can be covered by leaves. One layer of leaves removes for each card picked in a streak. If you turn up a new card, the streak is broken and the latest layer that was removed is pulled back.

Multiple Stage Levels

Multiple stage levels are not a blocker per se, but it is something that increases the difficulty of a level. Multiple stage levels are designed so that the player has to remove several layups in a row before completing the level. If the player fails with one of the stages, the whole level has to be restarted. For instance, a player completing a first layup in a double stage level, but fails on the second one, will be forced to restart the level and again attempt to remove both stages in a row without failing in between.

Boosters

Boosters are objects in the game that help the player overcome various obstacles. There are for example some boosters that counteract certain blockers, and others that help with general level constraints such as an additional joker card. Boosters can either be found or be given as a reward during the playing of the game, or they can be purchased. Typically there can be at least two different variants of the same booster, one that is usable only one time and another that is permanent and can be used once per level. This applies to all boosters described herein and will not be specified for each one. The mechanics of purchasing boosters is further described elsewhere.

Score Multiplier Card

In a typical implementation, score multiplier cards are signalled by being golden. Unlike the scarab cards, which have a golden edge, the entire of a score multiplier card is coloured. This is illustrated in the figure below. When clearing a score multiplier card, the player gets his scored multiplied by a factor for a certain amount of moves. In a typical implementation, the score multiplier is 2 and the 10 cards following the removal of the score multiplier card.

Extra Joker

This card gives the player an extra Joker card. In some implementations this has to be activated prior to starting a level, in other implementations the extra joker can be activated during the play of a level.

Extra Time

This booster gives the player extra time, and is therefore only applicable on levels that have a time constraint. In some implementations this has to be activated prior to starting a level, in other implementations the extra time can be activated during the play of a level.

5 Extra Cards in Deck

This booster lets the player start with 5 extra cards in the deck. In some implementations this booster can also be activated during the play of a level to add 5 cards to the deck.

Lock Breaker

This booster is used to unlock locked cards, and is therefore only usable in levels containing locked cards.

Bomb Defuser

This booster can be used to defuse a bomb card or a timed card. Upon use, the bomb and/or timed cards are removed, or in some implementations the countdown stops but the cards remain on the board until removed.

Scarab Freeze (Easy to Collect)

This booster makes it so that the scarabs in a level freeze, making it easier for a player to click them. It also helps in levels where scarabs can flip cards they pass by, since immovable scarabs do not move over any cards.

Card Holder

This booster gives the player the possibility to have a card holder in which cards can be stored. One card on the board can be placed into the holder without having to be removed, enabling longer streaks and making the levels easier to complete.

Anti-jungle Booster

This booster can be used on levels containing Jungle cards. When used, it turns all green cards into normal cards. In some implementations, the green cards are removed instead of turned into normal cards when this booster is used.

Anti-Leaf Booster

This booster can be used on levels containing leaf cards. When used, it removes the leaves from all cards covered in leaves. In some implementations, the leaf cards are removed instead of turned into normal cards when this booster is used.

Anti-mummy Booster

This booster can be used on levels containing mummy cards. When used, it removes the bandages from all cards covered in bandages. In some implementations, the cards with bandage are removed instead of turned into normal cards when this booster is used.

Jewels

Figure 65:
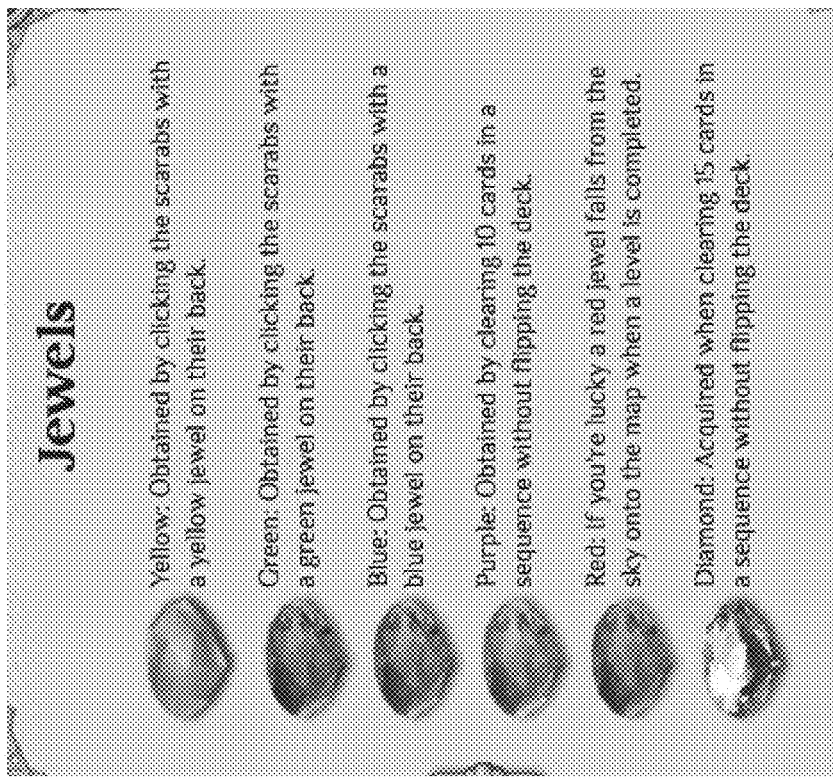
FIG. 65—Describing how to obtain jewels.

Jewels are valuable items that can be found throughout the game. They can be used to craft boosters, and in some implementations they can also be sold for in-game currency. The figure below shows the different types of jewels and one implementation of how they are obtained. An overview of available jewels in an exemplary implementation can be seen in FIG. 65.

Undo Move

This booster can be used to undo the last move the player performed. In some implementations, the player can undo more than one move in a row, and it can be possible to undo moves from several moves back.

Seasonal Bonus Levels

In some implementations, the game will have special levels that are seasonally dependent. One example of an implementation is one in the form of an Advent Calendar. In this example one level is released each day from December 1 to December 25. It can be possible for players to pay in order to receive early access to the levels, even though they still have to complete a level in order to play the next one.

This is not limited to being implemented during Christmas times, it can be applied to any season or holiday, including but not limited to Halloween, Easter and Summer.

The levels can for instance be accessible after a certain level in the game has been completed, or it can be accessible to all players from the start. In some implementations the player will have to fulfil certain criteria, such as inviting a minimum number of friends, in order to get access to the bonus levels. In other implementations, the player is needed to purchase the bonus levels in order to get access to them.

In a typical implementation, seasonal bonus levels will only be accessible for a pre-defined period of time, such as from the start of December until three weeks after Christmas. However, it can be possible for players to get access to levels after they have been taken down for the general public, for instance by inviting friends or making a purchase.

Crafting Boosters

It is possible for the player to craft boosters instead of buying or finding them. Jewels are used as a basis for crafting, and each booster has certain requirements in order to make it.

Hidden Object Game

Another implementation utilizing the inventions described is presented below.

The present invention relates to a computer implemented game which is a 'Hidden Object'-type of game.

In a typical implementation, there are three different game modes:

Normal game mode (Investigate)

Find 10 defined objects from list of words

Spot the differences 2 half screens shown. Find the 10 that are different between the scenes.

Flashlight

Limited view in dark scene. Find 10 objects

Figure 66:
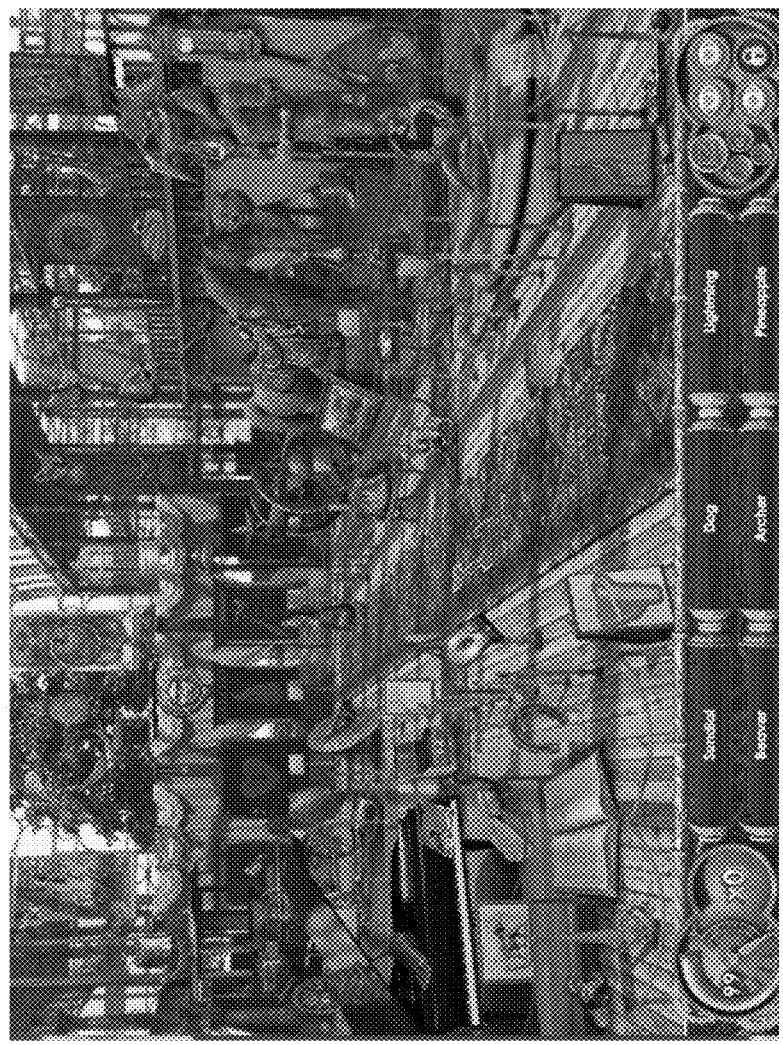
FIG. 66 shows an exemplary implementation.

The game comprises various themes/layups, each with a multitude of objects. In one implementation there are 30 themes, each containing at least 60 items. The game time of a game session can be limited, for instance to 6 minutes. An exemplary implementation can be seen in FIG. 66.

Description of Different Game Modes

Below is a description of a typical implementation of the different game modes:

Normal game mode (Investigate)

Find 10 specific objects in a picture

What objects to find is shown in text

Click an object when you have found it

When you find an object the text label is crossed over/removed

Clicking on wrong object reduces the score

Not possible to get negative score

Two hints per game

A hint shows an area where a random object is located

Unused hint gives extra points if solving the game

Unused hints from first Game Mode is useable in next game mode

Find all hidden objects to finish level

Time bonus for remaining time

Scoring in Normal game mode (Investigate)

1000 p for each found object 200 p for Clicking on wrong object

Not possible to get negative score

If all objects are found you get to play a mini-game (Spot the differences or Flashlight)

Figure 67:
FIG. 67 shows a typical implementation of the Spot the differences game mode.

Spot the differences game mode can be seen in FIG. 67.

Key aspects are:

Two pictures with 10 things that differs

Find 10 things that differs between two pictures

Click spots that differ

Points for each spotted difference

Time bonus is given if completing the whole game

Found object appears in the toolbar

Unused hints from first game mode can be used in this game

Flashlight Game Mode

Figure 68:
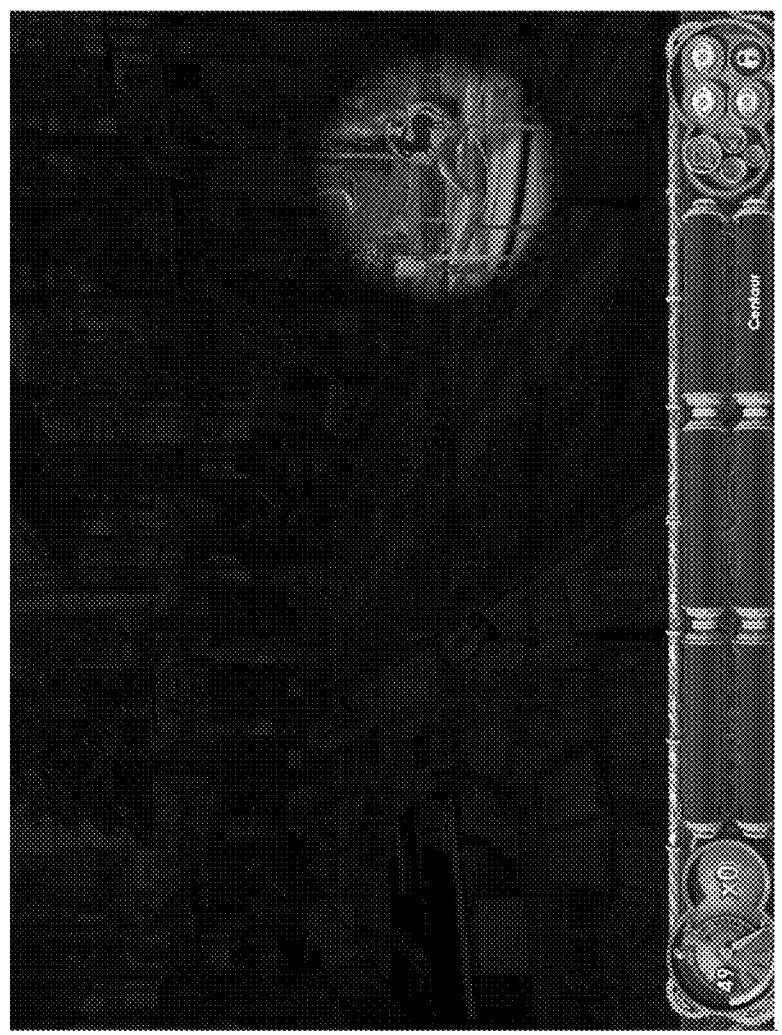
FIG. 68 shows a typical implementation of the Flashlight game mode.

In Flashlight mode, you need to find the objects in the dark. The cursor works like a torch, so move around to discover what hides in the dark. An exemplary implementation can be seen in FIG. 68.

Night Mode
Limited view in dark scene.
Find 10 objects
Click an object when you have found it
Points for each found object
Time bonus is given if completing the whole game
Unused hints from first game mode can be used in this game
Scoring in Spot the differences and Flashlight modes
1000 p for each returned/found object
200 p for clicking on wrong object
  Not possible to get negative score
Time bonus
  10000*% time left
  Only given if all objects are found
Not used hint=2000 p Achievements and Boosters The game can be implemented so that the player has to complete certain tasks to proceed in the game or to be awarded for certain activities. The achievements can be displayed in relation to other players' progress in the game and collection of achievements.

Below are examples of some achievements that can be implemented:
Finish first level
Finish a level in normal game mode without any wrong clicks
Finish a level in Flash light game mode without any wrong clicks
Finish a level in Spot the differences game mode without any wrong clicks
Get more than 6000 p in time bonus
Finish a level without using the hint (possible with 2 in same game)
Find 5 objects in a row within 3 sec in normal game mode (possible with several in same game)
Find 5 objects in a row within 3 sec in Flash light game mode (possible with several in same game)
Find 5 objects in a row within 3 sec in Find Error game mode (possible with several in same game)

Boosters

The game can be implemented so that the player can use certain 'boosters' to enhance the gameplay or to receive certain benefits in the game. These boosters can in some implementations be purchased before or during the game. The player can in some implementations receive the boosters as rewards for good gameplay or after a certain time of gameplay or when he has reached a certain level in the game.

Below are examples of boosters that can be used in various implementations of the game:
10 extra seconds
One extra hint Solitaire Game Another implementation utilizing the inventions described is presented below.

Card games generally use decks of 52 cards comprising 13 different kinds of cards in four suits. The types of cards in each suit are: Aces, cards numbered 2-10, Jacks, Queens and Kings. Aces can in some implementations be valued/numbered as either 1 or 14. Jacks can be numbered as 11, Queens as 12 and Kings as 13.

In the present invention Jacks, Queens and Kings have all been replaced by Aces, resulting in 52-card decks comprising 16 aces and four of each of the cards numbered 2-10. The number of decks of cards used are not limited to a single one, any number of decks can be used.

The goal of the game is to combine two or more cards that sum up to 11. Aces are counted as 1, other cards are counted as the value represented on them. When a card combination summing up to 11 has been completed, those cards cleared from the game board.

When a game is started a number of cards are laid out in a formation, any number of different formations using any number of cards can be used. The formations are characterised by having multiple rows of cards. The cards not used in the formation are stacked in the player's deck. In the formation, only cards that are not covered by other cards may be used to create a combination. The game will give some form of visual representation of which cards are currently selected by the player, for instance by circling those cards with a colour. In one implementation, if a card is selected that would cause the sum of the current selection to exceed 11, all cards are unselected.

Figure 69:
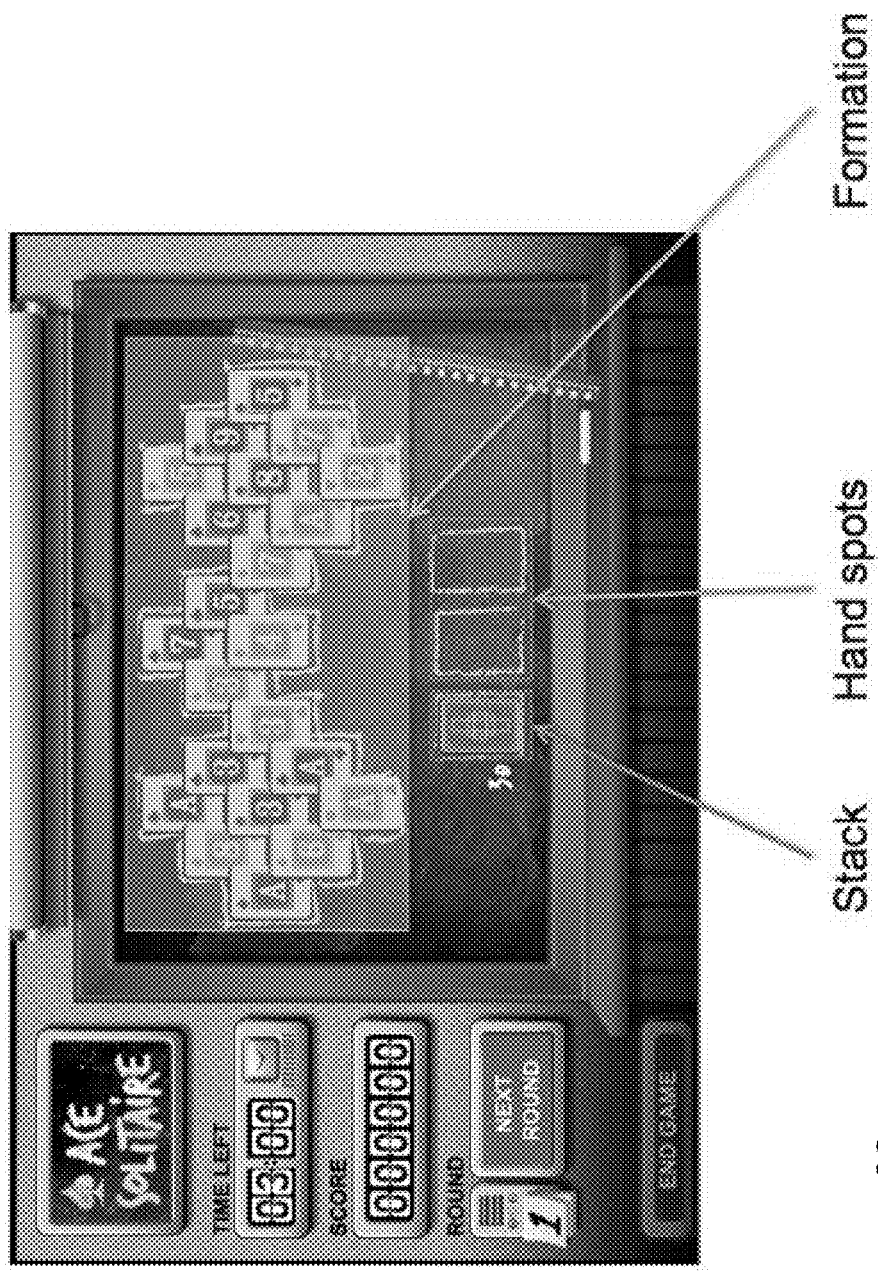
FIG. 69 shows an exemplary implementation.

An exemplary implementation can be seen in FIG. 69.

The player has two 'hand spots' that are used for cards from the deck. Cards from the hand spots can be freely combined with cards in the formation. When a player chooses to look at the next card in the deck, for instance by giving input through the means of an input device connected to a computing device, that card is moved into the hand spot. When the next card in the deck is chosen, the first card is moved from the left hand spot to the right one. When a third card is selected, or any subsequent card selected when two cards already occupy the hand spots, the rightmost card in the hand spot will be moved onto the first empty spot in the formation, in one implementation the empty spots are moving from left to right. If there are no empty spaces the card will be thrown away.

The game can be set up so that the player needs to complete a certain amount of rounds in a certain a mount of time. In a typical implementation, three rounds are to be completed in three minutes. Upon completely clearing a formation of cards, the player passes one round of the game and the next round is started. The formation laid out in the second game can be either the same or different from the one used in the first round. In some implementations, the number of cards left in the deck will affect the look of the formation in the next round. The player can choose to give up a round and move on to the next one by giving up, for instance by clicking on a soft button labelled 'next round'. The player can also choose to end the entire game, for instance by clicking on a soft button labelled 'end game'.

In a typical implementation, in the event that there would be no more possible moves left, the game will automatically start the next round or finish the game, depending on what the current round is. The other way of completing a round or finishing the game is to clear all cards in the layout. In one implementation, the end game score as well as the player's personal best will be displayed upon finishing a game.

Boosters

The game can be implemented so that the player can use certain 'boosters' to enhance the gameplay or to receive certain benefits in the game. These boosters can in some implementations be purchased before or during the game. The player can in some implementations receive the boosters as rewards for good gameplay or after a certain time of gameplay or when he has reached a certain level in the game.

Below are examples of boosters that can be used in various implementations of the game:
Boosters
  Get+10 sec
  Get+5 sec for speed bonus
  Get 4 extra aces in the deck Get a multiplier for points received after the multiplier is activated Achievements The game can be implemented so that the player has to complete certain tasks to proceed in the game or to be awarded for certain activities. The achievements can be displayed in relation to other players' progress in the game and collection of achievements.

Below are examples of some achievements that can be implemented:

Achievement
  Finish all three levels
Diploma hunts (A kind of achievement)
  1. Clear a level with more than 10 cards left in deck
  2. Score more than 65000 points
  3. Get more than 22000 in a level
  4. Remove 16 cards in a row without using the stack
  5. Start a level without using the stack
  6. Get more than 2500 points in speed bonus
  7. Remove 5 combos without using the stack
  8. Remove 5 or more cards in one combo
  9. Make a combo with 4 or more aces Scoring Below is a list of different implementations for score in the game:
  You get a score for a combination based on the placement of the cards in the lay-up formation. The cards that are at the bottom of the formation have the lowest value, and the value increases as you move upwards:
    Card on bottom-most row: 100 points
    Card of depth 2: 200 points
    Card of depth 3: 300 points
    Card of depth 4: 400 points
    Card of depth 5: 500 points
    Card of depth 6: 600 points
    Card of depth 7: 700 points (Note that not all layups will have the maximum number of rows)
  Deck cards in the hand spots
    When you use the cards from the deck in the 2 hand spots in a match, the value of each hand card is the highest value of the cards used in the formation.
  So if you combine 3 cards where the two in the formation have a value of 200 and 400, the card in the hand would be given a value of 400. But if you make a combination out of the two cards in the hand spots only they are only worth 50 points each, so for a high score you should avoid doing that.
  Speed bonus:
    For each combination you can also be given a speed bonus if you make a combination within 10 seconds from the last combination. The counter restarts from 10 seconds after each successful combination
    The Speed bonus=(Time left/10)×150
  Clearance bonus:
    If you manage to clear the formation you will receive a special Clearance bonus of 700 points per card left in the deck. Any cards left in the hand spots are also counted as being in the deck.

It should be understood that other variants of scoring can be used, for instance the value of cards can decrease instead of increase the closer to the top they are.

In some implementations, the player will get bonuses depending on how many points are scored in one combination. These bonuses can be in the form of jewels. In one implementation, a giant rainbow gem is rewarded at 1500 points, a red gem at 1000 points and a blue gem at 800 points.

Graphics

In one implementation, the following will be represented by ingame graphics:
  Time
    Animated
    Warning anim
  Level
  Sound on/off
  Music on/off
  Quit button
  Points
  Number of cards left in stack
  Background
  Deck of cards
    No dressed cards
  Score pops
  Level solved animation
  Social Aspect Connection to a Social Network Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

Ways of Playing the Game

Web-based

One way of implementing a game using the techniques described herein is through a web site with a plurality of casual games. This platform can be used as a basis to test the performance of the game and how it is perceived by players. In some web-based implementations the game is implemented to be played in head-to-head tournaments, has a limited number of levels and no external social network connection. In some implementations the players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new titles.

Virtual Map

Figure 70:
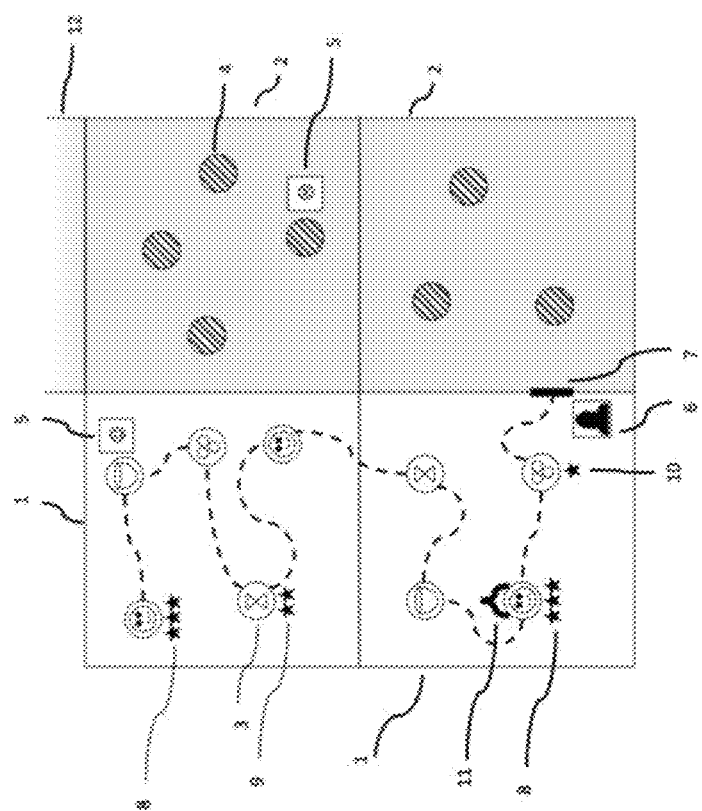
FIG. 70 shows a virtual map.

The game can be implemented so that a player progresses through multiple levels of changing and typically increasing difficulty. FIG. 70 shows an implementation of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players, and also opportunities for viralisation and monetisation.

The virtual map consists of stages 1, 2 with varying number of levels 3, 4 represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

Stages in the game can be both locked or unlocked. In most implementations, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some implementations, certain levels and stages are locked based on other criteria than the player's linear progression in the game. Such levels can for instance be based on the total score the player has achieved on all levels, the average performance on levels or on the number of friends that the player has invited to play the game.

In one implementation, one challenge 7 to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friend and payment to unlock the new stage. The cost for unlocking can in some implementations be lowered as a fraction of the total number of friends needed when help from some but not all needed friends have been received.

There can be ways of getting past a collaboration block other than asking friends for help and paying for it, which are the most common ways of passing a collaboration block. This can be done through to use of 'Mystery Quests', which gives the player the option of completing one or several challenges to unlock the block. Such challenge can for instance be to play one or several past levels with modified goals in order to pass the collaboration block, for instance three levels—one for each of the locks.

These challenges are typically in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to the game is connected. This is one of the viralisation techniques implemented in this game.

In addition to the virtual map layout in FIG. 70, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 70 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 6. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores.

The player is in some implementations of the game rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 8, 9, 10.

In the map view, the player can hover over an unlocked level to display a thumbnail version of it. This makes it easier to find specific already completed levels, and can also give the player an idea of what to expect before actually starting a level. In a typical implementation, thumbnails cannot be displayed for levels that have not yet been unlocked. If trying to view one of these a symbol of a padlock will be in the place the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, that has the highest score. There can in some embodiments be a notification 11 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 3 can for instance be in the form of an object related to the game goal, such as an hourglass representing a level with a time constraint.

Animations and Interactions on the Virtual Map

The landscape of the virtual map will typically have animated sequences which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Figure 71:
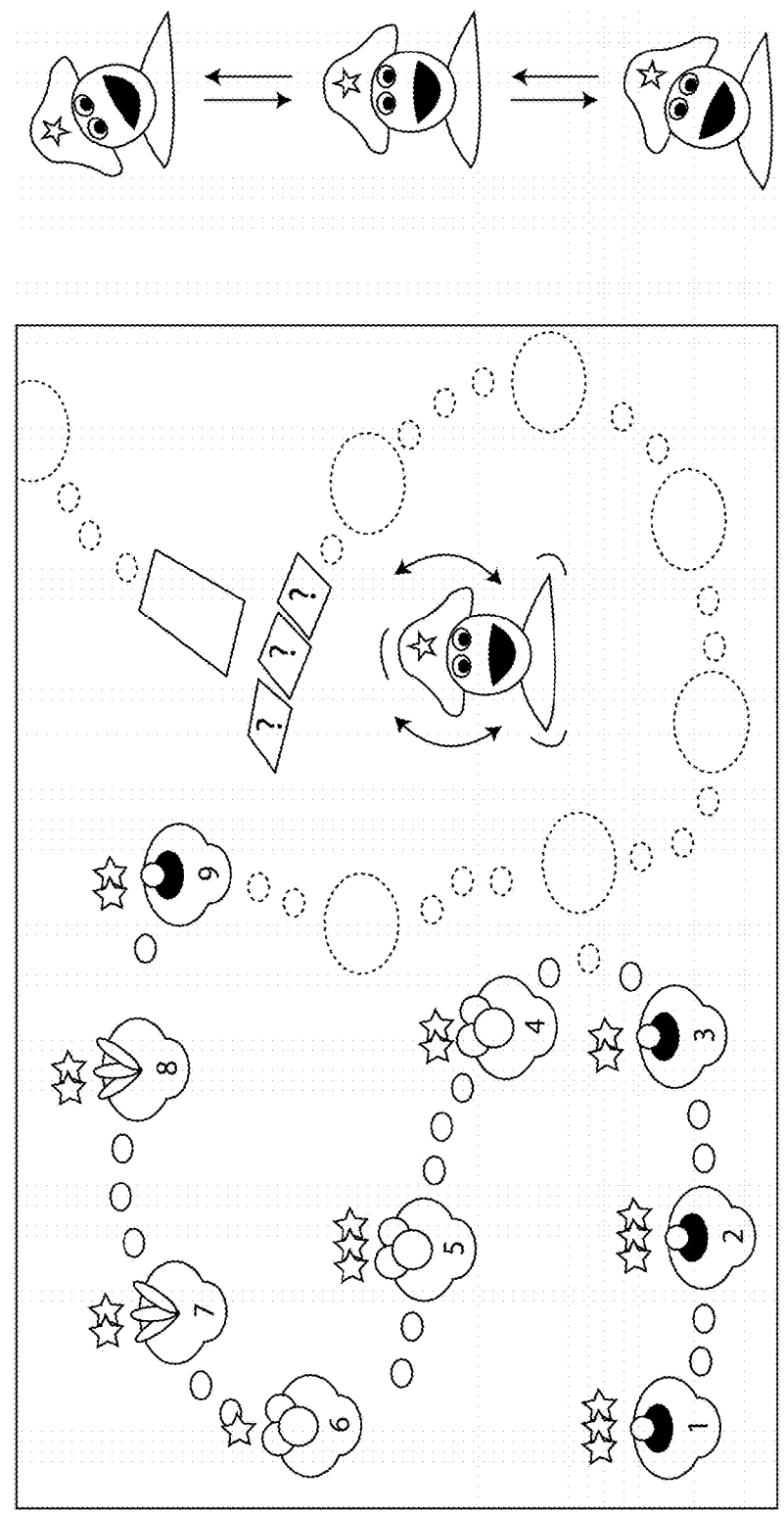
FIG. 71 shows an animated sequence on a virtual map.

One example of how the virtual map can be dynamic and moving is shown in FIG. 71 where a coconut figure wiggles back and forth. In this implementation the coconut figure can not be interacted with but is merely there for a dynamic graphic experience and decoration.

Pre- and Post-level Screens

Before starting a level, players have to select which level to play from the map view. When selecting a level, the player is shown information about the level, such as the amount of points needed, the available boosters that can be used, the goal of the level and also the highscores of friends who have previously played that level.

Figure 72:
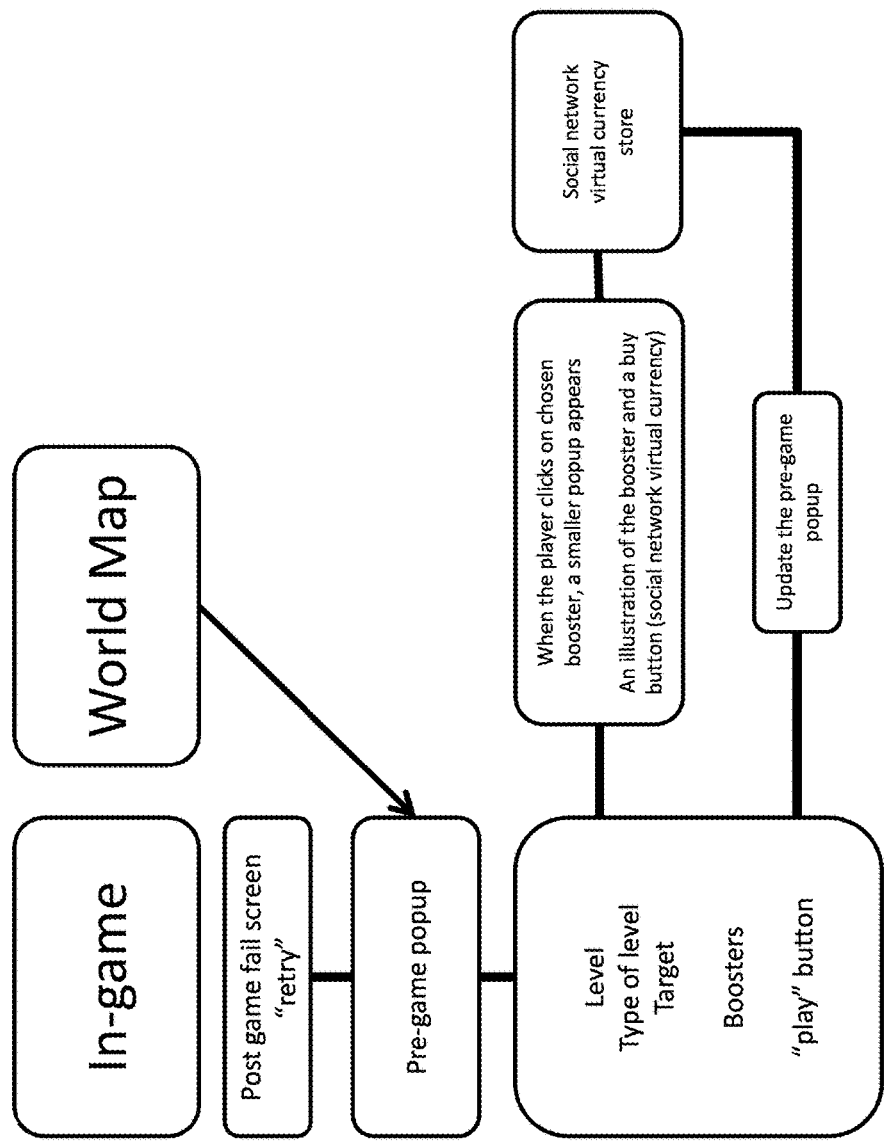
FIG. 72—Pre-level game progression.

FIG. 72 shows one implementation of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

Figure 73:
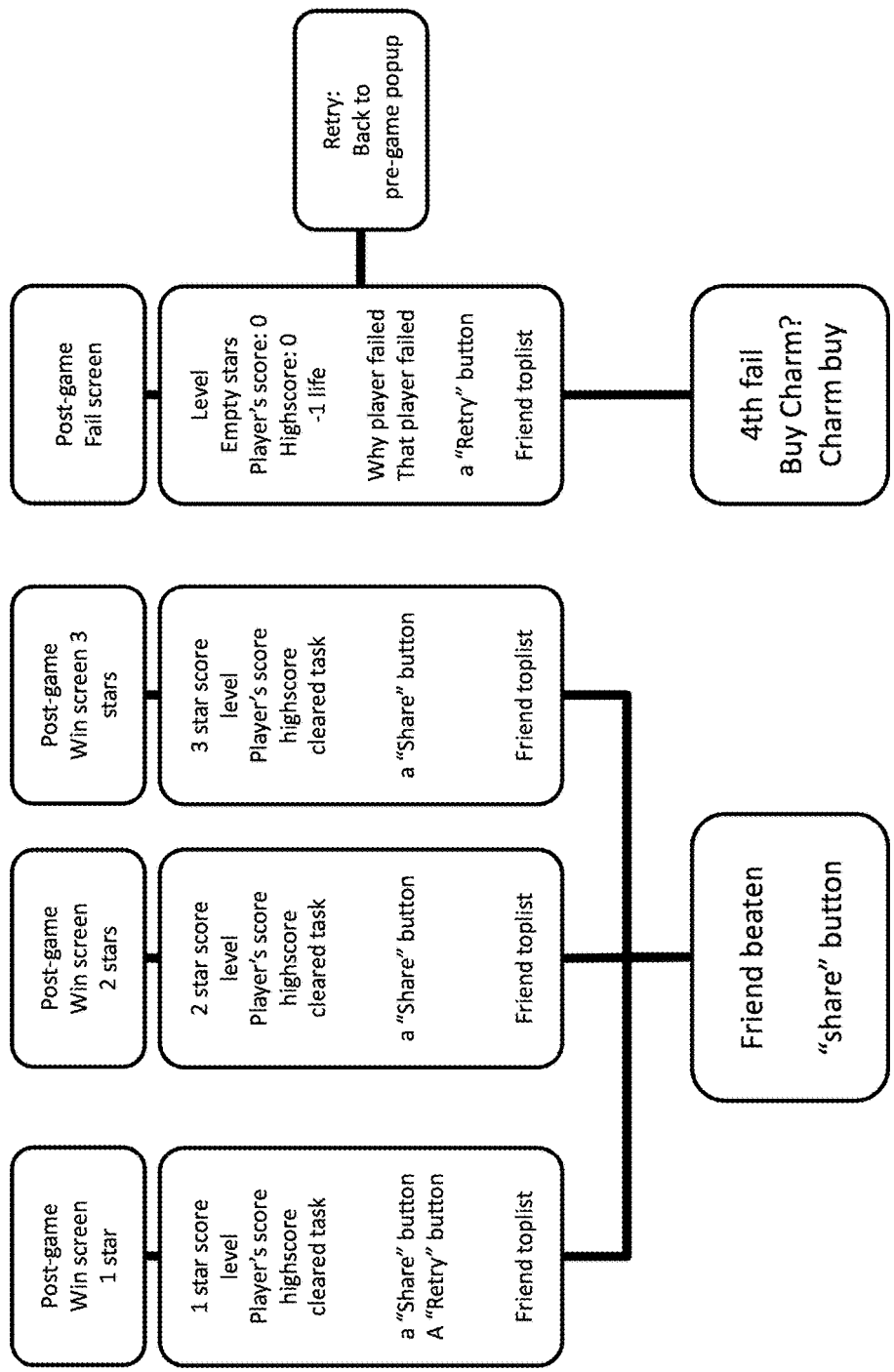
FIG. 73—Post-level game progression.

After completing a level, the player is presented with a screen that shows the amount of points gained, the amount of stars achieved and also the previous highscores of friends. One implementation of the game flow related to the post-level screen is shown in FIG. 73.

Both of the post-level screens discussed present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' highscores, together with a message about which friend(s) that have been beaten.

High Score List

When showing the pre-level screen, players are presented with the highscores of friends. This gives an opportunity to know beforehand what to aim for, and is something that increases the competitive element in the game. The information about friends' scores can be derived from a social network to which the game is connected, it can also be retrieved from a database related to the game. It is important for further increasing the engagement and of players and to some extent viralisation, since players are constantly being reminded about the performance of others, which can incentivise players to try harder and subsequently play more.

In some implementations, each area in the game or certain groups of friends or players can have a 'Champion', 'King' or similar, meaning the player within a network of players that has the best performance on the levels in that area.

Friends' High Scores on Score Meter

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 74:
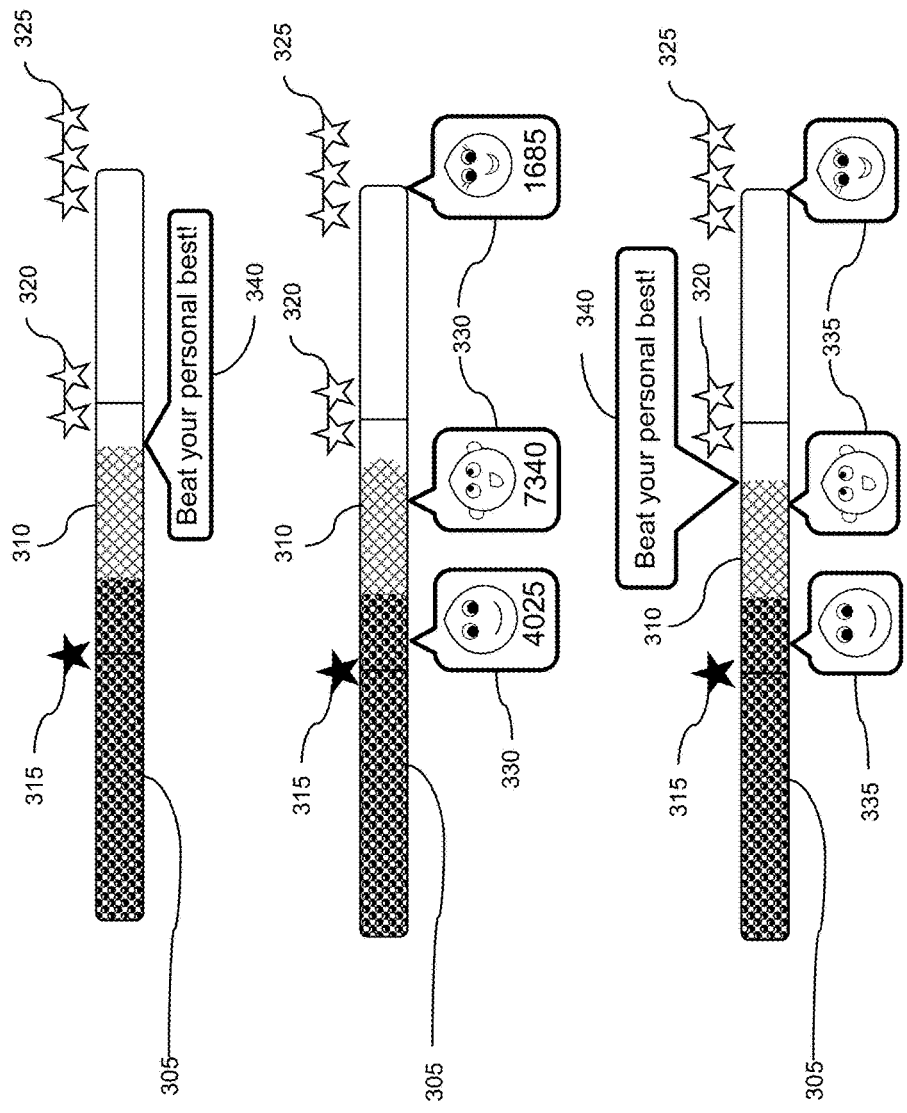
FIG. 74—Different ways of implementing a score meter and the results of other players.

In some implementations, the player can see indications of the previous high score achieved on a level while playing it, shown by 310 in FIG. 74. It is also possible that no indication of the player's own previous score is shown.

In some implementations, the indications of the performance of other players are shown in relation to the score meter. It can be both absolute and relative indications. The indications can be in the form of pictures associated with the players, as shown by 330 and 335 in FIG. 74. When the player passes the score of another player or the previous best score the player has achieved, a message can be shown to encourage the player and denote the accomplishment. One example of such a message is illustrated by 340 in FIG. 74.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on if the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Lives

In a typical implementation, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some implementations, the player will regenerate lives over time, for instance by replenishing one life every 30 minutes. In other implementations, the player can only regenerate lives by performing certain actions, such as playing other games from the same developer or by making a purchase related to the game.

Sending Gifts

One aspect of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 75:
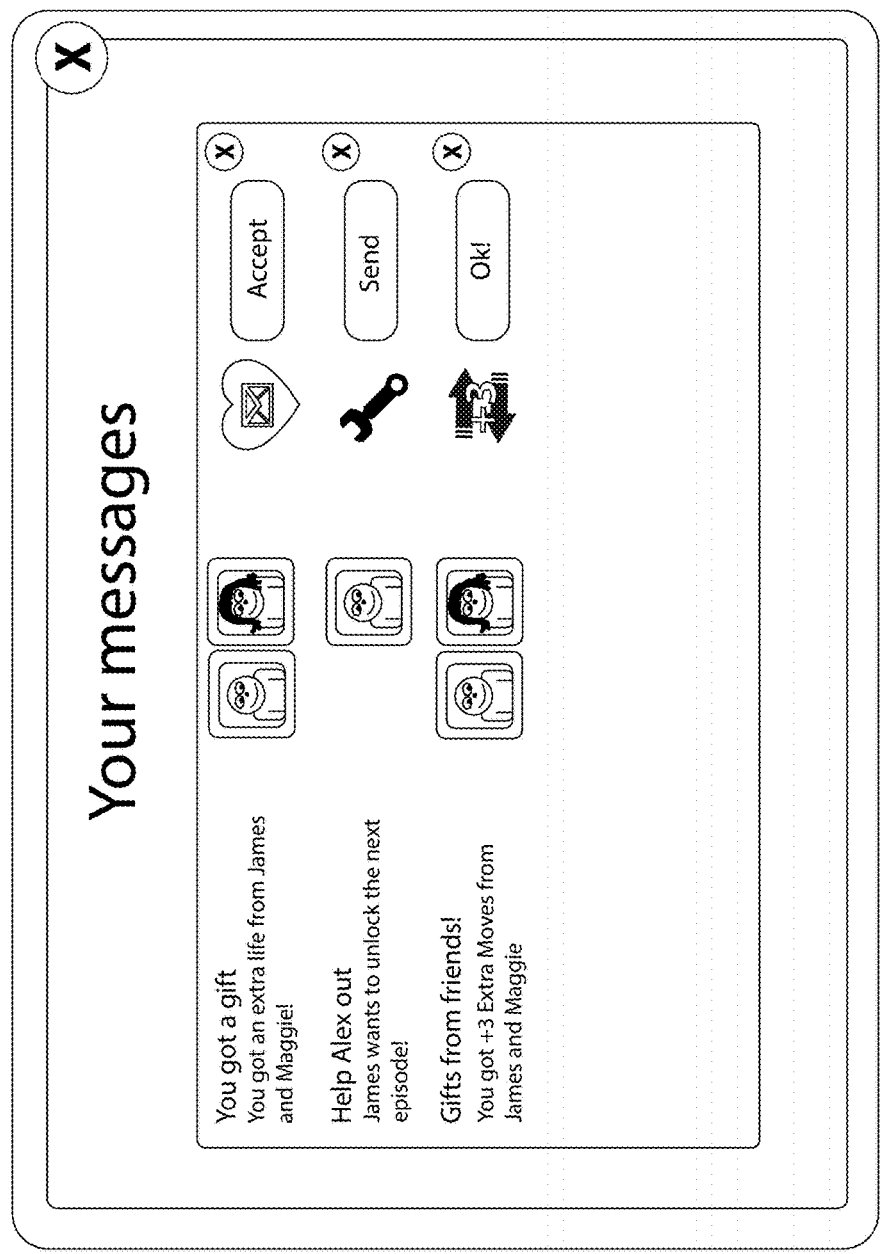
FIG. 75—One implementation of how lives and other gifts can be sent and received.

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some implementations, the player can send a life back by just clicking a single button. The life can for instance be sent via the game platform or via a social network to which the game is connected. FIG. 75 shows one example of an implementation in which the player is prompted by the game to send lives to friends.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In some implementations, lives that are received in the form of gifts have slightly different characteristics than lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 76:
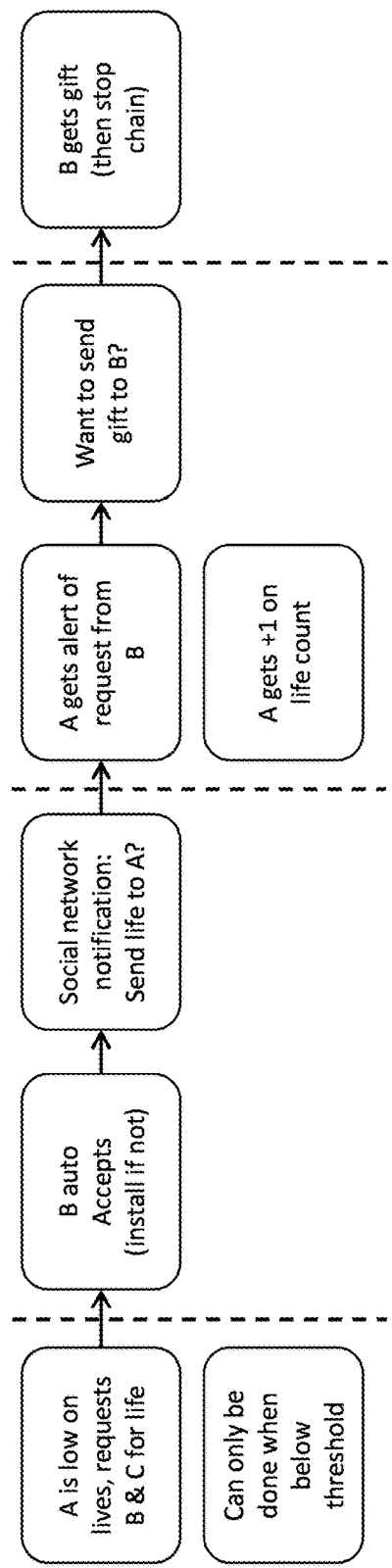
FIG. 76—One implementation of the chain of events when requesting and sending lives.

In the mobile version of the game, the player is presented with messages when logging in. Messages that are presented can be related to the player receiving lives and friends requesting lives. This is shown in the figure below. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts with requesting a life, the chain of events has three steps; step 1 is requesting a life, step 2 is receiving a life, step 3 is sending a life or a thank-you message back in response. One implementation of this chain of events is illustrated in FIG. 76.

It is also possible to buy gifts in the in-game shop and send these to friends. Such gifts are in the form of boosters that can be used either during a level or before a level.

Sending Help to Other Players in the Form of for Instance Extra Moves and Extra Time Another way of helping friends is to send items that provide in-game benefits, such as extra moves or extra time depending on the level requirements in the game. In some implementations, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some implementations, this period of time is two days. In other implementations, the criteria for a player being stuck is related to the amount of times they have tried and failed a level.

Figure 77:
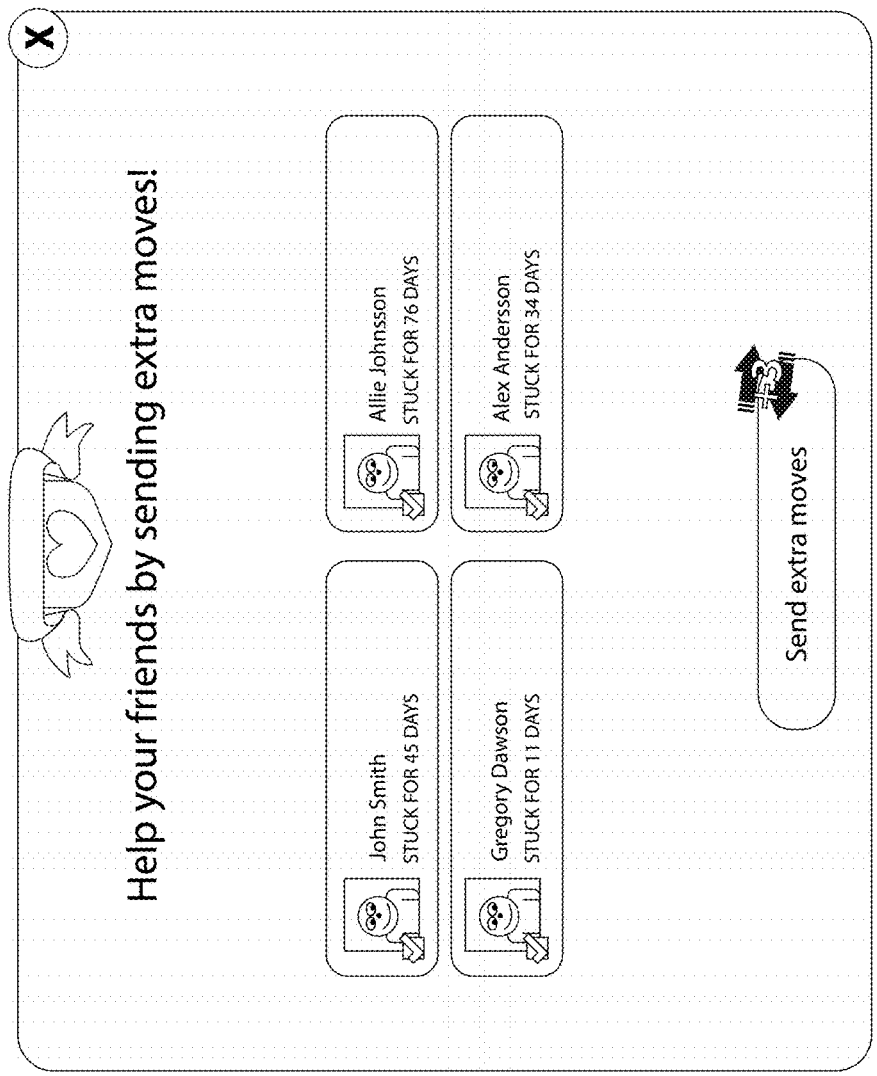
FIG. 77—The game prompting the player to help friends that have been stuck for an extended period of time

The prompting from the game can happen at different points in the game, for instance when a player logs onto the game. Such prompting is illustrated in FIG. 77. The prompting increases engagement by increasing the likelihood of someone providing help to players when the game is particularly difficult, and also adds a sense of collaboration and community among players. When a player has received extra moves, it can be indicated by a symbol next to the level in which the moves can be used.

In some implementations, the player can receive help from multiple friends. Help from multiple friends can be used at the same time or distributed over multiple occasions. When a player completes a level after receiving help from a friend, a 'thank you'-message can be sent to that friend. This message can have different implementations, such as the ones described in the passage above about a thank-you message related to sending lives.

Head to Head Tournaments

The game can also be implemented to be played in a tournament mode with a limited time or limited number of moves or both over a consecutive set of levels. The score can be collected over the several levels to give the player a score for all the levels completed. The tournament mode can in some implementations be played with a virtual map, in other implementations the game has a special interface for head to head competition. One such implementation can be a split-screen mode where each player can see what the other player does in real-time.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots where the player plays the same level where the same types of game elements are used. Jackpots can be absolute or they can be given as a multiplier of a stake that the player can input.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other implementations, there is a daily bonus available that is gained by every player playing the game online during that day, or to players passing a certain secret location during that day.

By giving players samples of existing boosters, they are given a free preview of purchasable items that potentially can lead to sales in the long run, which helps monetise the game. Some implementations contain boosters that regenerate over time, for example a booster that can be used once every two days.

Purchasing and in-game Shop

It is possible for players to make purchases in the game or through a social network connected to the game. One way of making such purchases is through the in-game shop. The shop is accessible for instance through the virtual map screen, but depending on the implementation it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In one implementation, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In some implementations, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some implementations, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

Cross-device and Cross-game Functionalities

Three platforms in particular are changing the way people expect games to be played. These three platforms are growing at the same time, and provide new input possibilities. To date, games have not absorbed all the new input possibilities.

The first platform is Facebook. The skilled person will understand that where Facebook is referred to in this document, other social network platforms may be used. A Facebook game may be a social game, a game you play with your friends. It is rare or unthinkable to launch a game (i.e. to play for the first time) on Facebook that is a paid game, because people playing games on Facebook expect not to pay to access a game. A Facebook game may be played on the internet, after logging in to Facebook (whether automatically or manually), such as from a personal computer.

The second platform is smartphones. Use of smartphones is not always continuous. You may use a smartphone for 5 minutes on a bus, and then for 20 minutes on a connecting train, for example. The use can have many starts and stops. Not like someone working at an office desk or at a home desk in a conventional way. A smartphone can be on an iOS platform, or on an Android platform, for example.

The third platform is tablets. What is a tablet? It can function as a mobile device and as a non-mobile device. The tablet can be a substitute for a personal computer. A user may want a seamless experience between using the game on a personal computer and on a tablet and on another mobile device. A tablet can be on an iOS platform, or on an Android platform, for example.

A game which works on a plurality of, such as all three of the above platforms (or more), may provide a connected fully-synchronized seamless experience. Hence multi-platform games are important. Key criteria for multi-platform games are: they are free, they are social, stop-start use is possible, and seamless experience is provided. Such games may be "played anywhere" e.g. in a mobile environment or in a non-mobile environment. Such games may also be played online or offline.

The game must be fun when used in a stop-start way, and when used for even just short intervals. In an example, a game consists of parts or levels, each of which runs for about 3 minutes, eg. between 1 and 5 minutes. In an example, a game is structured in levels, so that if successful in a game level, such as by scoring a minimum score, a user can progress from that level to the next level. In an example, a game has about 200 levels.

A game can be optimized post-launch. For example, if it is clear that too many users are failing to progress past a particular level, the minimum score to pass the level can be lowered. An optimized game may be provided as an application update from an application store. In an alternative, a game may be optimized by a server sending a revised data file of scores required to pass each game level to a mobile device, when a game state of a user is being synchronized with the server, wherein the application running on the device replaces the previous file of scores stored on the device required to pass each level with the revised file of scores required to pass each level.

Some implementations of the game allows for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical implementation, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some implementations, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In some implementations, players can be rewarded for playing the game on multiple platforms. For instance, players that active on a computer-based platform could get a bonus for also installing the game on a handheld device. Such bonus may for instance be in the form of in-game currency, a booster to be used in the game or other in-game valuable object.

Players can also be rewarded for playing multiple games that are related, for instance games from the same developer. When choosing to play a new game, the player can receive bonuses in another game. This can be triggered by using a link from one game to the other, or by games sharing information between one other so that it automatically detects a player that is playing more than one game and subsequently rewards them. One way of rewarding players that play multiple games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some implementations, a booster bought in one game can be used in another game that shares certain features with it.

One example of an implementation with synchronisation across platforms is as follows:

A first server, for instance one hosting a social network, with a first data store storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to not interfere with for instance the times of the day that players are as most active.

If trying to access the game online, as opposed to starting a local version that is saved on the device, while updates are being made, the player can be met by a message saying that the game cannot be accessed right at that moment.

Concepts

A computer implemented method of playing a card game, the method comprising;

At least one deck of 52 cards, with 16 cards having the value 1 and four cards of each of the values 2-10;

A number of cards being laid out in a formation;

A number of cards being in the player's deck; and

Upon combining cards, either from the formation and/or from the deck, that sum up to a specific sum, removing those combined cards; and Awarding the player points based on the cards used in the combination Any of the concepts above where the specific sum to be reached by combining cards is 11.

Any of the concepts above where the game consists of multiple rounds.

Any of the concepts above where the number of rounds is 3.

Any of the concepts above where the player has a pre-determined amount of time to complete the rounds.

Any of the concepts above where the player where the pre-determined amount of time is 3 minutes.

Any of the concepts above where the player cannot use cards that are covered by other cards.

Any of the concepts above where the player has two spots for cards from the deck.

Any of the concepts above where the player is given more points for using cards in a higher position in the formation.

Any of the concepts above where the player is awarded with special bonuses when achieving certain scores in one combination.

Any of the concepts above where multiple players can play simultaneously in a challenge mode.

Any of the concepts above where the player can compare his score with that of other players.

Further Concepts

A computer implemented game, comprising:

A game mode where the player is prompted to find items on a list within a certain picture; and A game mode where the player is prompted to compare two nearly identical images and find the differences;

A game mode where the player is promoted to find items on a list within a certain picture, wherein the picture is darkened and only a select section is lit up, the lit section being dependent on input given by a pointing device;

Any combination of the concepts above where the player is rewarded points for each found item.

Any combination of the concepts above where points are subtracted from the players score for each wrongly identified object.

Any combination of the concepts above where one or more of the game modes are mini-games playable only after completing a main game mode.

Any combination of the concepts above where the mini-game following the main game is randomly selected from a number of different mini-games.

Any combination of the concepts above where the mini-game following the main game is selected by the player from a list of different mini-games.

Any combination of the concepts above where the player has access to a number of hints Any combination of the concepts above where the hints showing the general area of a random object.

Any combination of the concepts above where the player is prompted to find 10 objects in the main game mode.

Any combination of the concepts above where the player is awarded bonus points for each unused hint.

Any combination of the concepts above where the multiple players can compete against each other.

Any combination of the concepts above where multiple players play the same level at the same time and can see other's progress in real time.

Further Concepts

A method for playing an online card game, comprising:

A game connected to a social network;

The game is played over a set of levels visually laid out on a map where a representation of the player travels on the map, Each level is unlocked after the previous level has been completed, A deck of cards, wherein only one card is usable at a time A layup of cards in such a way that cards can be partially covered by other cards;

Where cards are not removable when they are partially covered by other cards;

Wherein the player has a deck of cards and must use at least one card from the deck to match with cards in the layup;

Wherein cards from the layup can only be removed if they are valued one more or one less than the current usable card in the deck; and The goal of the game is to remove specific cards from the layup.

Any combination of the ideas above where the game is synchronisable across different platforms.

Any combination of the ideas above where there are seasonally dependent bonus levels.

Any combination of the ideas above where the player gets a reward for installing a game on multiple platforms.

Any combination of the ideas above where there are collaboration blocks that either require a purchase, the help of friends, a passing of a certain amount of time, or a combination of these.

Any combination of the ideas above where there are special offers directed at players not having made purchases before.

Further Concepts

A computer-implemented puzzle game, comprising:

a playing area containing at least four different types of game elements, the game elements characterised by behaving like viscous fluids;

ways for a player to interact with the game elements on the playing area to remove the game elements by performing moves;

wherein new game elements are added after each move made by the player;

wherein game elements of the same type that come into contact with each other merge into one cohesive mass and game elements that come into contact and are not of the same type will not merge; and wherein the player has limited amount of moves and time available to complete a level.

Any combination of the key ideas where the game is played in a, . . . ??????

Any combination of the key ideas where the game elements used are different ice cream flavours.

Any combination of the key ideas where the player is awarded bonus points for remaining moves and remaining time by the end of the game.

Any combination of the key ideas where the amount of game elements added after each move can have different sizes.

Any combination of the key ideas where playing area is in the shape of a bowl.

Any combination of the key ideas where the goal of the game is to remove a certain amount of a plurality of game elements.

Any combination of the key ideas where the goal of the game is to fill a cone with ice cream.

Any combination of the key ideas where the theme of the game is to feed children with ice cream.

Any combination of the key ideas where the larger the removed group of game elements is the higher the score awarded is.

Any combination of the key ideas where the levels reached are indicated by corresponding places on a path on a map.

Any combination of the key ideas where the game is implemented in a multiple interactive game server system comprising:

A first server including a first data store relating to states of a plurality of interactive games, the first server configured to communicate, using a first application programming interface, with a first plurality of devices of a first computing platform operable to participate in the plurality of interactive games;

A second server including a second data store relating to states of a plurality of interactive games, the second server configured to communicate, using a second application programming interface different to the first application programming interface, with a second plurality of devices of a second computing platform different to the first computing platform operable to participate in the plurality of interactive games, and A third server including a third data store relating to states of the plurality of interactive games, the third server arranged to communicate with the first server and with the second server, wherein the first, second and third servers are arranged to synchronize the first data store, the second data store and the third data store, such that when synchronized, the first data store, the second data store and the third data store all relate to synchronized states of the plurality of interactive games.

Further Concepts

Any combination of the key ideas where the game is implemented in a multiple interactive game server system comprising:

A first server including a first data store relating to states of a plurality of interactive games, the first server configured to communicate, using a first application programming interface, with a first plurality of devices of a first computing platform operable to participate in the plurality of interactive games;

A second server including a second data store relating to states of a plurality of interactive games, the second server configured to communicate, using a second application programming interface different to the first application programming interface, with a second plurality of devices of a second computing platform different to the first computing platform operable to participate in the plurality of interactive games, and A third server including a third data store relating to states of the plurality of interactive games, the third server arranged to communicate with the first server and with the second server, wherein the first, second and third servers are arranged to synchronize the first data store, the second data store and the third data store, such that when synchronized, the first data store, the second data store and the third data store all relate to synchronized states of the plurality of interactive games.

Any of the ideas where the game is a card game.

Any of the ideas where the game is a card game with a deck of 52 standard cards.

Further Concepts

A computer implemented game, comprising:

A character controllable by a player

A plurality of game objects circulating around the player-controlled character in at least one track, wherein the game objects are of one type among a multitude of types.

An extendable and retractable item, controllable by the player, which will destroy game objects when it collides with them Wherein game objects will automatically be attracted to each other if they are of the same type when an object between them is removed; and Where game objects are removed if at least three of the same type are adjacent after the removal of at least one game object Any combination of the ideas above where the game objects circulate in elliptical orbits.

Any combination of the ideas above where the game objects circulate in arbitrarily shaped orbits.

Any combination of the ideas above where there are two tracks of game objects circulating.

Any combination of the ideas above where the types of game objects are differentiated by colour.

Any combination of the ideas above where the character controlled by the player is female.

Any combination of the ideas above where the character controlled by the player is male.

Any combination of the ideas above where the game item is in the form of a yo-yo.

Any combination of the ideas above where the game objects are balls.

Any combination of the ideas above where the player receives a bonus for removing as few game objects as possible.

Any combination of the ideas above where the player has a time limit.

Any combination of the key ideas where the levels reached are indicated by corresponding places on a path on a map.

Any combination of the key ideas where the game is implemented in a multiple interactive game server system comprising:

a first server including a first data store relating to states of a plurality of interactive games, the first server configured to communicate, using a first application programming interface, with a first plurality of devices of a first computing platform operable to participate in the plurality of interactive games;

A second server including a second data store relating to states of a plurality of interactive games, the second server configured to communicate, using a second application programming interface different to the first application programming interface, with a second plurality of devices of a second computing platform different to the first computing platform operable to participate in the plurality of interactive games, and a third server including a third data store relating to states of the plurality of interactive games, the third server arranged to communicate with the first server and with the second server, wherein the first, second and third servers are arranged to synchronize the first data store, the second data store and the third data store, such that when synchronized, the first data store, the second data store and the third data store all relate to synchronized states of the plurality of interactive games.

Further Concepts

A computer implemented match-3 game, comprising:

At least four different types of match-able objects;

At least one type of game object that changes position each time the player makes a move;

A game board containing match-able objects, wherein the match-able objects transform into another type of game objects when combined with at least two other match-able objects of the same kind, wherein the transformations of game objects follow a pre-determined pattern;

A generator of match-able objects which provides the player with match-able objects to place on the game board;

Wherein the player is awarded points for matching objects; and

Wherein the goal of the game is to achieve a certain amount of points

Any combination of key ideas where the match-able objects contain water lilies, frogs, princes, love portals or castles.

Any combination of key ideas where the generator is in the form of a magic mirror.

Any combination of key ideas where 'Love' is released after each match.

Any combination of key ideas where the player receives bonus treasures after matching game objects.

Any combination of key ideas where the game objects that change positions are dragons.

Any combination of key ideas where the game objects that change position can be trapped by surrounding them with other game objects.

Any combination of key ideas where there is a booster that can transform all match-able game objects of one type to the next type of match-able objects in the pre-determined pattern.

Any combination of key ideas where the booster for transforming match-able game objects is a wand.

Any combination of key ideas where there is a time limit.

Any combination of key ideas where the player has a limited amount of moves.

Any combination of key ideas where the game is run on a skill-platform.

Any combination of key ideas where the game is connected to a social network.

Any combination of the key ideas where the game is implemented in a multiple interactive game server system comprising:

a first server including a first data store relating to states of a plurality of interactive games, the first server configured to communicate, using a first application programming interface, with a first plurality of devices of a first computing platform operable to participate in the plurality of interactive games;

a second server including a second data store relating to states of a plurality of interactive games, the second server configured to communicate, using a second application programming interface different to the first application programming interface, with a second plurality of devices of a second computing platform different to the first computing platform operable to participate in the plurality of interactive games, and a third server including a third data store relating to states of the plurality of interactive games, the third server arranged to communicate with the first server and with the second server, wherein the first, second and third servers are arranged to synchronize the first data store, the second data store and the third data store, such that when synchronized, the first data store, the second data store and the third data store all relate to synchronized states of the plurality of interactive games.

Further Concepts

A computer implemented word puzzle game, comprising:
  a playing area of at least 4*4 tiles, each tile representing at least one letter;
  at least three rounds to be played consecutively;
  a time limit for playing all rounds;
  wherein the goal in each round is to combine tiles to form at least one word;
  wherein each tile can only be used once per round;
  wherein the goal of the game is to achieve as high a score as possible from all rounds combined A method for performing the game described above.

Any combination of the ideas above where the player gets to play a bonus round if certain criteria are met.

Any combination of the ideas above where the criteria for playing a bonus round is to construct one word containing at least 5 tiles in each round.

Any combination of the ideas above where the criteria for playing a bonus round is to construct three words containing at least 4 tiles in each round.

Any combination of the ideas above where the player can visibly see after each round if the criteria has been met.

Any combination of the ideas above where there is a bonus tile that multiplies the score of a word if used, but reduces the score of other words if not used.

Any combination of the ideas above where the score for each word is shown in real time as the player adds or removes tiles.

Any combination of the ideas above where the player, at the end of the game, is shown detailed statistics regarding tiles used and words submitted.

Any combination of the key ideas where the levels reached are indicated by corresponding places on a path on a map.

Any combination of the key ideas where the game is implemented in a multiple interactive game server system comprising:

a first server including a first data store relating to states of a plurality of interactive games, the first server configured to communicate, using a first application programming interface, with a first plurality of devices of a first computing platform operable to participate in the plurality of interactive games;

a second server including a second data store relating to states of a plurality of interactive games, the second server configured to communicate, using a second application programming interface different to the first application programming interface, with a second plurality of devices of a second computing platform different to the first computing platform operable to participate in the plurality of interactive games, and a third server including a third data store relating to states of the plurality of interactive games, the third server arranged to communicate with the first server and with the second server, wherein the first, second and third servers are arranged to synchronize the first data store, the second data store and the third data store, such that when synchronized, the first data store, the second data store and the third data store all relate to synchronized states of the plurality of interactive games.

The invention claimed is:

1. A computer device adapted to play a computer game, the device including at least one processor, at least one memory, a display, a user interface, and computer code stored in one of said at least one memory and executable by at least one of said at least one processor to perform the steps of:
  controlling the display to show computer game graphics comprising a game board and game elements;
  receiving user input via the user interface which causes a movement of a first game element from a first position to a second position;
  determining in response to the user input if there is a match of three or more game elements sharing a common characteristic and a direction of the movement of the first game element, said direction of movement comprising one of a plurality of different directions of movement;
  controlling the display to remove the three or more of said game elements sharing the common characteristic when there is match to leave vacant positions on the game board; and
  causing one or more game elements to move into said vacant positions from the determined direction of the movement of the first game element from the first position to the second position.

2. A computing device as claimed in claim 1, wherein the movement of the first of said game elements from the first position to the second position provides a switch in position between the first game element and a second game element.

3. A computing device as claimed in claim 1, wherein the computer code is executable by the device and at least one processor to perform the further steps of:
  showing a third game element on the game board;
  in response to user input, moving the third game element along a path; and
  removing from the game board, game elements in said path and adjacent to said path.

4. A computing device as claimed in claim 3, wherein the length of said path is dependent upon a value stored in the memory of the computing device.

5. A computing device as claimed in claim 4, wherein the computer code is executable by the device processor to perform the further steps of:
  modifying the value stored in the memory in response to the removal from the game board of game elements in said path and adjacent to said path.

6. A computing device as claimed in claim 4, wherein the computer code is executable by the at least one processor to perform the further steps of:
  modifying the value stored in the memory in response to the match of said three or more game elements sharing a common characteristic.

7. A computing device as claimed in claim 1, wherein the computer code is executable by the at least one processor to perform the further steps of:
   in response to a match at a particular location of the game board of three or more of said game elements sharing a common characteristic, showing a plurality of icons; and
   in response to user input associated with one of said icons, loading a level of the game associated with said icon.

8. A computing device as claimed in claim 3, wherein the computer code is executable by the at least one processor to perform the further steps of:
   if a particular tile of said game board is located in the path or adjacent to the path, showing a plurality of icons; and
   in response to user input associated with one of said icons, loading a level of the game associated with said icon.

9. A computing device as claimed in claim 1, wherein the computer code is executable by the at least one processor to perform the further steps of:
   in response to a match of three or more of said game elements located at three or more tiles of the game board, showing a change in the visual characteristics of said three or more tiles.

10. A computing device as claimed in claim 1, wherein the computer code is executable by the at least one processor to show one or more new game elements entering the game board from the direction of movement of the first game element.

11. A computing device as claimed in claim 10, wherein the computer code is executable by the at least one processor to:
   if said one or game elements entering the game board form a match, remove from the game board, game elements of the match, leaving further vacant positions on the game board; and
   if the step of said one or more game elements entering the game board and forming a match occurs a predefined number of times, remove all of the game elements from the game board.

12. A computing device as claimed in claim 1, wherein the computer code is executable by the at least one processor to provide at least one game object on the game board, said game object obstructing the movement of the game elements on the game board.

13. A computing device as claimed in claim 1, wherein the step of causing one or more game elements to move into said vacant positions from a direction of the movement of the first game element from the first position to the second position comprises:
   if the first game element moves upwards on the game board, moving the one or more game elements upwards on the game board to occupy said vacant positions;
   if the first game element moves downwards on the game board, moving the one or more game elements downwards on the game board to occupy said vacant positions;
   if the first game element moves left on the game board, moving the one or more game elements left on the game board to occupy said vacant positions; and
   if the first game element moves right on the game board, moving the one or more game elements right on the game board to occupy said vacant positions.

14. A computing device as claimed in claim 1, wherein said method comprises receiving user input via the user interface to move a second game element from a third position to a fourth position, said second game element being moved in a different direction to said first game element;
   determining in response to the user input if there is a match of three or more game elements sharing a common characteristic and the direction of a movement of the second game element;
   controlling the display to remove the three or more of said game elements sharing the common characteristic when there is match to leave vacant positions on the game board; and
   causing one or more game elements to move into said vacant positions from the determined different direction.

15. A computer implemented method for controlling a display of a computer device adapted to play a computer game, the device including at least one processor, at least one memory, and a user interface, said method comprising executing on said at least one processor the steps of:
   controlling the display to show computer game graphics comprising a game board and game elements;
   receiving user input via the user interface which causes a movement of a first game element from a first position to a second position;
   determining in response to the user input if there is a match of three or more game elements sharing a common characteristic and a direction of the movement of the first game element, said direction of movement comprising one of a plurality of different directions of movement;
   controlling the display to remove the three or more of said game elements sharing the common characteristic when there is a match to leave vacant positions on the game board; and
   causing one or more game elements to move into said vacant positions from the determined direction of the movement of the first game element from the first position to the second position.

16. A non-transitory computer readable medium encoded with instructions which, when executed by at least one processor of a computer device adapted to play a computer game, perform a method for controlling a display of the computer device, said method comprising:
   controlling the display to show computer game graphics comprising a game board and game elements;
   receiving user input via a user interface of the computer device, said user input causing a movement of a first game element from a first position to a second position;
   determining in response to the user input if there is a match of three or more game elements sharing a common characteristic and a direction of the movement of the first game element, said direction of movement comprising one of a plurality of different directions of movement;
   controlling the display to remove the three or more of said game elements sharing the common characteristic when there is match to leave vacant positions on the game board; and
   causing one or more game elements to move into said vacant positions from the determined direction of the movement of the first game element from the first position to the second position.

17. A computer device adapted to play a computer game, the device including at least one processor, at least one memory, a display, a user interface, and computer code stored in one of said at least one memory and executable by at least one of said at least one processor to perform the steps of:
- controlling the display to show computer game graphics comprising a game board and game elements;
- receiving user input via the user interface which causes a movement of a first game element from a first position to a second position;
- determining in response to the user input if there is a match of three or more game elements sharing a common characteristic and a direction of the user input, said direction comprising one of a plurality of different directions;
- controlling the display to remove the three or more of said game elements sharing the common characteristic, when there is a match to leave vacant positions on the game board; and
- causing one or more game elements to move into said vacant positions from the determined direction of the user input.

18. A method for controlling a display of the computer device, said method comprising:
- controlling the display to show computer game graphics comprising a game board and game elements;
- receiving user input via the user interface which causes a movement of a first game element from a first position to a second position;
- determining in response to the user input if there is a match of three or more game elements sharing a common characteristic and a direction of the user input, said direction comprising one of a plurality of different directions;
- controlling the display to remove the three or more of said game elements sharing the common characteristic, when there is a match to leave vacant positions on the game board; and
- causing one or more game elements to move into said vacant positions from the determined direction of the user input.

* * * * *